United States Patent
Sehn

(10) Patent No.: US 11,803,345 B2
(45) Date of Patent: **\*Oct. 31, 2023**

(54) GALLERY OF MESSAGES FROM INDIVIDUALS WITH A SHARED INTEREST

(71) Applicant: Snap Inc., Santa Monica, CA (US)

(72) Inventor: Timothy Sehn, Marina Del Rey, CA (US)

(73) Assignee: Snap Inc., Santa Monica, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/663,739

(22) Filed: May 17, 2022

(65) Prior Publication Data

US 2022/0276817 A1    Sep. 1, 2022

Related U.S. Application Data

(63) Continuation of application No. 16/662,956, filed on Oct. 24, 2019, now Pat. No. 11,372,608, which is a
(Continued)

(51) Int. Cl.
*G06F 3/14*        (2006.01)
*H04L 51/10*       (2022.01)
(Continued)

(52) U.S. Cl.
CPC .............. *G06F 3/14* (2013.01); *G06F 3/0482* (2013.01); *G06F 3/0489* (2013.01);
(Continued)

(58) Field of Classification Search
CPC .. G06F 3/0482; G06F 3/0484; G06F 3/04883; G06F 3/04817; G06F 17/241;
(Continued)

(56) References Cited

U.S. PATENT DOCUMENTS 666,223 A     1/1901  Shedlock
4,581,634 A   4/1986  Williams
(Continued)

FOREIGN PATENT DOCUMENTS

CA    2887596 A1   7/2015
CA    2894332 C    8/2018
(Continued)

OTHER PUBLICATIONS

US 10,075,404 B1, 09/2018, Allen et al. (withdrawn)
(Continued)

*Primary Examiner* — David R Lazaro
(74) *Attorney, Agent, or Firm* — Schwegman Lundberg & Woessner, P.A.

(57) ABSTRACT

A machine includes a processor and a memory connected to the processor. The memory stores instructions executed by the processor to receive a message and a message parameter indicative of a characteristic of the message, where the message includes a photograph or a video. A determination is made that the message parameter corresponds to a selected gallery, where the selected gallery includes a sequence of photographs or videos. The message is posted to the selected gallery in response to the determination. The selected gallery is supplied in response to a request.

20 Claims, 6 Drawing Sheets

Related U.S. Application Data continuation of application No. 15/137,608, filed on Apr. 25, 2016, now Pat. No. 10,514,876, which is a continuation of application No. 14/578,258, filed on Dec. 19, 2014, now Pat. No. 9,385,983.

(51) Int. Cl.

| | | |
|---|---|---|
| *H04L 51/52* | (2022.01) | |
| *H04L 51/214* | (2022.01) | |
| *H04L 69/329* | (2022.01) | |
| *G11B 27/031* | (2006.01) | |
| *G11B 27/32* | (2006.01) | |
| *G06F 40/169* | (2020.01) | |
| *G06F 3/0482* | (2013.01) | |
| *G06F 3/04842* | (2022.01) | |
| *G06F 3/04883* | (2022.01) | |
| *G06F 3/0489* | (2022.01) | |
| *G06T 11/60* | (2006.01) | |

(52) U.S. Cl.
CPC ...... *G06F 3/04842* (2013.01); *G06F 3/04883* (2013.01); *G06F 40/169* (2020.01); *G06T 11/60* (2013.01); *G11B 27/031* (2013.01); *G11B 27/322* (2013.01); *H04L 51/10* (2013.01); *H04L 51/214* (2022.05); *H04L 51/52* (2022.05); *H04L 69/329* (2013.01)

(58) Field of Classification Search
CPC ............. G06F 17/248; G06F 17/30268; G06F 17/3028; G06F 17/30477; G06F 17/30598; G06F 17/30781; G06F 17/3089; G06F 17/30893; G06F 17/30905; G06F 19/00; G06F 21/31; G06F 21/6272; G06F 21/64; G06F 21/645; G06F 2216/15; G06F 3/017; G06F 3/0481; G06F 3/04842; G06F 3/0486; G06F 3/04886; G06F 3/0489; G06F 3/1296; G06F 3/14; G06F 3/167; G06F 9/44505; G06F 9/451; G06F 9/45512; G06T 11/60; H04L 51/32; H04L 51/10; H04L 12/1813; H04L 51/14; H04L 51/28; H04L 67/10; H04L 67/30; G06Q 50/01; G06Q 10/10; G06Q 30/00

See application file for complete search history.

(56) References Cited

U.S. PATENT DOCUMENTS

| | | | |
|---|---|---|---|
| 4,975,690 | A | 12/1990 | Torres |
| 5,072,412 | A | 12/1991 | Henderson, Jr. et al. |
| 5,493,692 | A | 2/1996 | Theimer et al. |
| 5,713,073 | A | 1/1998 | Warsta |
| 5,754,939 | A | 5/1998 | Herz et al. |
| 5,855,008 | A | 12/1998 | Goldhaber et al. |
| 5,883,639 | A | 3/1999 | Walton et al. |
| 5,999,932 | A | 12/1999 | Paul |
| 6,012,098 | A | 1/2000 | Bayeh et al. |
| 6,014,090 | A | 1/2000 | Rosen et al. |
| 6,029,141 | A | 2/2000 | Bezos et al. |
| 6,038,295 | A | 3/2000 | Mattes |
| 6,049,711 | A | 4/2000 | Yehezkel et al. |
| 6,075,535 | A | 6/2000 | Fitzhugh et al. |
| 6,154,764 | A | 11/2000 | Nitta et al. |
| 6,158,044 | A | 12/2000 | Tibbetts |
| 6,167,435 | A | 12/2000 | Druckenmiller et al. |
| 6,204,840 | B1 | 3/2001 | Petelycky et al. |
| 6,205,432 | B1 | 3/2001 | Gabbard et al. |
| 6,216,141 | B1 | 4/2001 | Straub et al. |
| 6,285,381 | B1 | 9/2001 | Sawano et al. |
| 6,285,987 | B1 | 9/2001 | Roth et al. |
| 6,290,504 | B1 | 9/2001 | Benitz et al. |
| 6,310,694 | B1 | 10/2001 | Okimoto et al. |
| 6,317,789 | B1 | 11/2001 | Rakavy et al. |
| 6,334,149 | B1 | 12/2001 | Davis, Jr. et al. |
| 6,349,203 | B1 | 2/2002 | Asaoka et al. |
| 6,353,170 | B1 | 3/2002 | Eyzaguirre et al. |
| 6,363,380 | B1 | 3/2002 | Dimitrova |
| 6,446,004 | B1 | 9/2002 | Cao et al. |
| 6,449,657 | B2 | 9/2002 | Stanbach et al. |
| 6,456,852 | B2 | 9/2002 | Bar et al. |
| 6,484,196 | B1 | 11/2002 | Maurille |
| 6,487,586 | B2 | 11/2002 | Ogilvie et al. |
| 6,487,601 | B1 | 11/2002 | Hubacher et al. |
| 6,499,016 | B1 * | 12/2002 | Anderson ............... G10L 15/26 704/235 |
| 6,523,008 | B1 | 2/2003 | Avrunin |
| 6,542,749 | B2 | 4/2003 | Tanaka et al. |
| 6,549,768 | B1 | 4/2003 | Fraccaroli |
| 6,587,118 | B1 | 7/2003 | Yoneda |
| 6,618,593 | B1 | 9/2003 | Drutman et al. |
| 6,622,174 | B1 | 9/2003 | Ukita et al. |
| 6,631,463 | B1 | 10/2003 | Floyd et al. |
| 6,636,247 | B1 | 10/2003 | Hamzy et al. |
| 6,636,855 | B2 | 10/2003 | Holloway et al. |
| 6,643,684 | B1 | 11/2003 | Malkin et al. |
| 6,658,095 | B1 | 12/2003 | Yoakum et al. |
| 6,665,531 | B1 | 12/2003 | Soderbacka et al. |
| 6,668,173 | B2 | 12/2003 | Greene |
| 6,684,238 | B1 | 1/2004 | Dutta |
| 6,684,257 | B1 | 1/2004 | Camut et al. |
| 6,698,020 | B1 | 2/2004 | Zigmond et al. |
| 6,700,506 | B1 | 3/2004 | Winkler |
| 6,701,347 | B1 | 3/2004 | Ogilvie |
| 6,711,608 | B1 | 3/2004 | Ogilvie |
| 6,720,860 | B1 | 4/2004 | Narayanaswami |
| 6,724,403 | B1 | 4/2004 | Santoro et al. |
| 6,757,713 | B1 | 6/2004 | Ogilvie et al. |
| 6,832,222 | B1 | 12/2004 | Zimowski |
| 6,834,195 | B2 | 12/2004 | Brandenberg et al. |
| 6,836,792 | B1 | 12/2004 | Chen |
| 6,898,626 | B2 | 5/2005 | Ohashi |
| 6,922,634 | B2 | 7/2005 | Odakura et al. |
| 6,959,324 | B1 | 10/2005 | Kubik et al. |
| 6,970,088 | B2 | 11/2005 | Kovach |
| 6,970,907 | B1 | 11/2005 | Ullmann et al. |
| 6,980,909 | B2 | 12/2005 | Root et al. |
| 6,981,040 | B1 | 12/2005 | Konig et al. |
| 7,004,394 | B2 | 2/2006 | Kim |
| 7,020,494 | B2 | 3/2006 | Spriestersbach et al. |
| 7,027,124 | B2 | 4/2006 | Foote et al. |
| 7,072,963 | B2 | 7/2006 | Anderson et al. |
| 7,085,571 | B2 | 8/2006 | Kalhan et al. |
| 7,110,744 | B2 | 9/2006 | Freeny, Jr. |
| 7,124,091 | B1 | 10/2006 | Khoo et al. |
| 7,124,164 | B1 | 10/2006 | Chemtob |
| 7,142,823 | B1 | 11/2006 | Logue et al. |
| 7,149,893 | B1 | 12/2006 | Leonard et al. |
| 7,173,651 | B1 | 2/2007 | Knowles |
| 7,188,143 | B2 | 3/2007 | Szeto |
| 7,203,380 | B2 | 4/2007 | Chiu et al. |
| 7,206,568 | B2 | 4/2007 | Sudit |
| 7,227,937 | B1 | 6/2007 | Yoakum et al. |
| 7,237,002 | B1 | 6/2007 | Estrada et al. |
| 7,240,025 | B2 | 7/2007 | Stone et al. |
| 7,240,089 | B2 | 7/2007 | Boudreau |
| 7,243,163 | B1 | 7/2007 | Friend et al. |
| 7,254,585 | B2 | 8/2007 | Frieden et al. |
| 7,269,426 | B2 | 9/2007 | Kokkonen et al. |
| 7,278,168 | B1 | 10/2007 | Chaudhury et al. |
| 7,280,658 | B2 | 10/2007 | Amini et al. |
| 7,315,823 | B2 | 1/2008 | Brondrup |
| 7,349,768 | B2 | 3/2008 | Bruce et al. |
| 7,356,564 | B2 | 4/2008 | Hartselle et al. |
| 7,376,715 | B2 | 5/2008 | Cunningham et al. |
| 7,394,345 | B1 | 7/2008 | Ehlinger et al. |
| 7,411,493 | B2 | 8/2008 | Smith |
| 7,423,580 | B2 | 9/2008 | Markhovsky et al. |
| 7,454,442 | B2 | 11/2008 | Cobleigh et al. |
| 7,478,402 | B2 | 1/2009 | Christensen et al. |

(56) References Cited

U.S. PATENT DOCUMENTS

| | | | |
|---|---|---|---|
| 7,496,347 B2 | 2/2009 | Puranik |
| 7,496,567 B1 | 2/2009 | Steichen |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,571,244 B2 | 8/2009 | Costanzo et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,703,140 B2 | 4/2010 | Nath et al. |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 7,856,449 B1 | 12/2010 | Martino et al. |
| 7,912,896 B2 | 3/2011 | Wolovitz et al. |
| 7,934,156 B2 * | 4/2011 | Forstall | H04M 1/2747 |
| | | | 345/169 |
| 7,971,156 B2 | 6/2011 | Albertson et al. |
| 7,991,638 B1 | 8/2011 | House et al. |
| 7,996,793 B2 | 8/2011 | Latta et al. |
| 8,001,204 B2 | 8/2011 | Burtner et al. |
| 8,014,762 B2 | 9/2011 | Chmaytelli et al. |
| 8,032,586 B2 | 10/2011 | Challenger et al. |
| 8,063,797 B1 * | 11/2011 | Sonnabend | G08G 1/0129 |
| | | | 340/932.2 |
| 8,073,947 B1 | 12/2011 | Yeh et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,127,035 B1 | 2/2012 | Hood et al. |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,170,957 B2 | 5/2012 | Richard |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,347,021 B1 | 1/2013 | Phillips et al. |
| 8,352,494 B1 * | 1/2013 | Badoiu | G06F 16/5838 |
| | | | 707/780 |
| 8,352,546 B1 | 1/2013 | Dollard |
| 8,369,866 B2 | 2/2013 | Ashley, Jr. et al. |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,428,453 B1 | 4/2013 | Spiegel et al. |
| 8,433,296 B2 | 4/2013 | Hardin et al. |
| 8,471,914 B2 | 6/2013 | Sakiyama et al. |
| 8,472,935 B1 | 6/2013 | Fujisaki |
| 8,487,938 B2 | 7/2013 | Latta et al. |
| 8,494,481 B2 | 7/2013 | Bacco et al. |
| 8,510,383 B2 | 8/2013 | Hurley et al. |
| 8,527,345 B2 | 9/2013 | Rothschild et al. |
| 8,542,685 B2 | 9/2013 | Forbes, Jr. et al. |
| 8,554,627 B2 | 10/2013 | Svendsen et al. |
| 8,559,980 B2 | 10/2013 | Pujol |
| 8,560,612 B2 | 10/2013 | Kilmer et al. |
| 8,570,907 B2 | 10/2013 | Garcia, Jr. et al. |
| 8,594,680 B2 | 11/2013 | Ledlie et al. |
| 8,613,089 B1 | 12/2013 | Holloway et al. |
| 8,626,187 B2 | 1/2014 | Grosman et al. |
| 8,639,648 B2 | 1/2014 | Koponen et al. |
| 8,649,803 B1 | 2/2014 | Hamill |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,661,466 B2 | 2/2014 | Stephens |
| 8,666,152 B1 * | 3/2014 | Ramanathan | G06V 20/46 |
| | | | 382/168 |
| 8,681,178 B1 | 3/2014 | Tseng |
| 8,682,350 B2 | 3/2014 | Altman et al. |
| 8,686,962 B2 * | 4/2014 | Christie | G11B 27/34 |
| | | | 345/173 |
| 8,687,021 B2 | 4/2014 | Bathiche et al. |
| 8,688,519 B1 | 4/2014 | Lin et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,751,310 B2 | 6/2014 | Van Datta et al. |
| 8,761,800 B2 | 6/2014 | Kuwahara |
| 8,762,201 B1 | 6/2014 | Noonan |
| 8,768,876 B2 | 7/2014 | Shim et al. |
| 8,775,401 B2 | 7/2014 | Zhou et al. |
| 8,775,972 B2 | 7/2014 | Spiegel |
| 8,788,680 B1 | 7/2014 | Naik |
| 8,788,947 B2 * | 7/2014 | Putz | G06F 3/0486 |
| | | | 715/863 |
| 8,790,187 B2 | 7/2014 | Walker et al. |
| 8,797,415 B2 | 8/2014 | Arnold |
| 8,798,646 B1 | 8/2014 | Wang et al. |
| 8,838,522 B2 | 9/2014 | Brundage |
| 8,856,349 B2 | 10/2014 | Jain et al. |
| 8,856,691 B2 | 10/2014 | Geisner et al. |
| 8,868,223 B1 | 10/2014 | Sharifi |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,923,823 B1 | 12/2014 | Wilde |
| 8,925,106 B1 * | 12/2014 | Steiner | G06F 21/6245 |
| | | | 726/28 |
| 8,943,140 B1 * | 1/2015 | Kothari | G06Q 10/1095 |
| | | | 709/219 |
| 8,965,271 B1 | 2/2015 | Vucurevich |
| 8,972,357 B2 | 3/2015 | Shim et al. |
| 8,977,296 B1 | 3/2015 | Briggs et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,026,943 B1 | 5/2015 | Spiegel |
| 9,037,577 B1 | 5/2015 | Saylor et al. |
| 9,040,574 B2 | 5/2015 | Wang et al. |
| 9,043,329 B1 | 5/2015 | Patton et al. |
| 9,055,416 B2 | 6/2015 | Rosen et al. |
| 9,063,638 B1 | 6/2015 | Schrock et al. |
| 9,083,770 B1 | 7/2015 | Drose et al. |
| 9,094,137 B1 | 7/2015 | Sehn et al. |
| 9,098,832 B1 | 8/2015 | Scardino |
| 9,100,806 B2 | 8/2015 | Rosen et al. |

(56) References Cited

U.S. PATENT DOCUMENTS

| | | | |
|---|---|---|---|
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,137,700 B2 | 9/2015 | Elefant et al. |
| 9,143,382 B2 | 9/2015 | Bhogal et al. |
| 9,143,681 B1 | 9/2015 | Ebsen et al. |
| 9,148,424 B1 | 9/2015 | Yang |
| 9,148,742 B1 | 9/2015 | Koulomzin et al. |
| 9,152,477 B1 | 10/2015 | Campbell et al. |
| 9,159,364 B1 | 10/2015 | Matias et al. |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,230,160 B1 | 1/2016 | Kanter |
| 9,237,202 B1 | 1/2016 | Sehn |
| 9,258,459 B2 | 2/2016 | Hartley |
| 9,264,463 B2 | 2/2016 | Rubinstein et al. |
| 9,269,011 B1 | 2/2016 | Sikka et al. |
| 9,276,886 B1 | 3/2016 | Samaranayake |
| 9,285,977 B1 | 3/2016 | Greenberg et al. |
| 9,294,425 B1 | 3/2016 | Son |
| 9,319,472 B2 | 4/2016 | Cathcart et al. |
| 9,344,606 B2 | 5/2016 | Hartley et al. |
| 9,385,983 B1 * | 7/2016 | Sehn .................. G06F 3/04842 |
| 9,396,354 B1 | 7/2016 | Murphy et al. |
| 9,407,712 B1 | 8/2016 | Sehn |
| 9,407,816 B1 | 8/2016 | Sehn |
| 9,417,754 B2 * | 8/2016 | Smith .................. G06F 1/1643 |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,477,391 B2 * | 10/2016 | Flynn, III ........... G06F 3/04883 |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,542,422 B2 * | 1/2017 | Duggal ............... G06F 16/5866 |
| 9,544,379 B2 | 1/2017 | Gauglitz et al. |
| 9,560,006 B2 | 1/2017 | Prado et al. |
| 9,591,445 B2 | 3/2017 | Zises |
| 9,628,950 B1 | 4/2017 | Noeth et al. |
| 9,641,572 B1 * | 5/2017 | Yeskel ................. G06Q 50/01 |
| 9,645,221 B1 | 5/2017 | Heizer |
| 9,648,581 B1 | 5/2017 | Vaynblat et al. |
| 9,652,896 B1 | 5/2017 | Jurgenson et al. |
| 9,659,244 B2 | 5/2017 | Anderton et al. |
| 9,672,538 B1 | 6/2017 | Vaynblat et al. |
| 9,674,660 B1 | 6/2017 | Vaynblat et al. |
| 9,693,191 B2 | 6/2017 | Sehn |
| 9,705,831 B2 | 7/2017 | Spiegel |
| 9,706,355 B1 | 7/2017 | Cali et al. |
| 9,710,821 B2 | 7/2017 | Heath |
| 9,742,713 B2 | 8/2017 | Spiegel et al. |
| 9,785,796 B1 | 10/2017 | Murphy et al. |
| 9,788,027 B1 | 10/2017 | Vucurevich |
| 9,802,121 B2 | 10/2017 | Ackley et al. |
| 9,825,898 B2 | 11/2017 | Sehn |
| 9,843,720 B1 | 12/2017 | Ebsen et al. |
| 9,854,219 B2 | 12/2017 | Sehn |
| 9,866,999 B1 | 1/2018 | Noeth |
| 9,881,094 B2 | 1/2018 | Pavlovskaia |
| 9,894,478 B1 | 2/2018 | DeLuca et al. |
| 9,961,520 B2 | 5/2018 | Brooks et al. |
| 10,026,226 B1 | 7/2018 | Lotto |
| 10,080,102 B1 | 9/2018 | Noeth et al. |
| 10,102,423 B2 | 10/2018 | Shaburov et al. |
| 10,133,705 B1 | 11/2018 | Allen et al. |
| 10,135,949 B1 | 11/2018 | Pavlovskaia et al. |
| 10,176,195 B2 | 1/2019 | Patel |
| 10,182,311 B2 | 1/2019 | Sehn |
| 10,186,299 B2 | 1/2019 | Wang et al. |
| 10,200,813 B1 | 2/2019 | Allen et al. |
| 10,250,683 B2 | 4/2019 | Karkkainen et al. |
| 10,282,753 B2 | 5/2019 | Cheung |
| 10,284,508 B1 | 5/2019 | Allen et al. |
| 10,285,002 B2 | 5/2019 | Colonna et al. |
| 10,285,006 B2 | 5/2019 | Colonna et al. |
| 10,289,287 B2 | 5/2019 | Rathod |
| 10,311,916 B2 | 6/2019 | Sehn |
| 10,349,209 B1 | 7/2019 | Noeth et al. |
| 10,354,425 B2 | 7/2019 | Yan et al. |
| 10,395,519 B2 | 8/2019 | Colonna et al. |
| 10,416,845 B1 | 9/2019 | Allen et al. |
| 10,438,094 B1 * | 10/2019 | Ko ........................ G06F 18/23 |
| 10,439,972 B1 | 10/2019 | Spiegel et al. |
| 10,440,420 B2 | 10/2019 | Hogeg et al. |
| 10,445,777 B2 | 10/2019 | McDevitt et al. |
| 10,448,201 B1 | 10/2019 | Sehn et al. |
| 10,475,079 B2 * | 11/2019 | Hagen .................... G06T 11/60 |
| 10,476,830 B2 | 11/2019 | Allen et al. |
| 10,509,466 B1 | 12/2019 | Miller et al. |
| 10,514,876 B2 * | 12/2019 | Sehn ..................... G06F 40/169 |
| 10,524,087 B1 | 12/2019 | Allen et al. |
| 10,572,681 B1 | 2/2020 | Murphy et al. |
| 10,579,869 B1 | 3/2020 | Xiong et al. |
| 10,580,458 B2 | 3/2020 | Sehn |
| 10,581,782 B2 | 3/2020 | Tang |
| 10,582,277 B2 | 3/2020 | Tang |
| 10,614,855 B2 | 4/2020 | Huang |
| 10,616,239 B2 | 4/2020 | Allen et al. |
| 10,616,476 B1 | 4/2020 | Ebsen et al. |
| 10,623,891 B2 | 4/2020 | Sehn et al. |
| 10,659,914 B1 | 5/2020 | Allen et al. |
| 10,694,317 B2 | 6/2020 | Cheung |
| 10,708,210 B1 | 7/2020 | Allen et al. |
| 10,748,347 B1 | 8/2020 | Li et al. |
| 10,779,113 B2 | 9/2020 | Sehn et al. |
| 10,811,053 B2 | 10/2020 | Sehn |
| 10,893,055 B2 | 1/2021 | Allen et al. |
| 10,911,575 B1 | 2/2021 | Pavlovskaia et al. |
| 10,944,710 B1 | 3/2021 | Allen et al. |
| 10,958,608 B1 | 3/2021 | Allen et al. |
| 10,962,809 B1 | 3/2021 | Castañeda |
| 10,990,697 B2 | 4/2021 | Murphy et al. |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,012,398 B1 | 5/2021 | Allen et al. |
| 11,030,454 B1 | 6/2021 | Xiong et al. |
| 11,036,368 B1 | 6/2021 | Al Majid et al. |
| 11,038,829 B1 | 6/2021 | Allen et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,166,121 B2 | 11/2021 | Sehn et al. |
| 11,169,600 B1 | 11/2021 | Canberk et al. |
| 11,216,869 B2 | 1/2022 | Allen et al. |
| 11,227,626 B1 | 1/2022 | Krishnan Gorumkonda et al. |
| 11,249,617 B1 | 2/2022 | Allen et al. |
| 11,250,887 B2 | 2/2022 | Sehn |
| 11,297,399 B1 | 4/2022 | Tang |
| 11,307,747 B2 | 4/2022 | Dancie et al. |
| 11,317,240 B2 | 4/2022 | Allen et al. |
| 11,372,608 B2 * | 6/2022 | Sehn ..................... G06F 3/04883 |
| 11,411,908 B1 | 8/2022 | Allen et al. |
| 11,522,822 B1 | 12/2022 | Allen et al. |
| 11,531,402 B1 | 12/2022 | Stolzenberg |
| 11,546,505 B2 | 1/2023 | Canberk |
| 11,627,141 B2 | 4/2023 | Allen et al. |
| 2001/0025316 A1 | 9/2001 | Oh |
| 2001/0028787 A1 | 10/2001 | Nomura et al. |
| 2002/0023101 A1 | 2/2002 | Kurihara et al. |
| 2002/0032771 A1 | 3/2002 | Gledje |
| 2002/0047686 A1 | 4/2002 | Kodama et al. |
| 2002/0047858 A1 | 4/2002 | Bayliss et al. |

(56) References Cited

U.S. PATENT DOCUMENTS

| | | |
|---|---|---|
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0098850 A1 | 7/2002 | Akhteruzzaman et al. |
| 2002/0122659 A1 | 9/2002 | Mcgrath et al. |
| 2002/0128047 A1 | 9/2002 | Gates |
| 2002/0131078 A1 | 9/2002 | Tsukinokizawa |
| 2002/0141378 A1 | 10/2002 | Bays et al. |
| 2002/0144154 A1 | 10/2002 | Tomkow |
| 2002/0146103 A1 | 10/2002 | Holt et al. |
| 2002/0171669 A1 | 11/2002 | Meron et al. |
| 2003/0001846 A1 | 1/2003 | Davis et al. |
| 2003/0016247 A1 | 1/2003 | Lai et al. |
| 2003/0016253 A1 | 1/2003 | Aoki et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0074404 A1 | 4/2003 | Parker et al. |
| 2003/0083929 A1 | 5/2003 | Springer et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0131362 A1 | 7/2003 | Jasinschi et al. |
| 2003/0148773 A1 | 8/2003 | Spriestersbach et al. |
| 2003/0163370 A1 | 8/2003 | Chen et al. |
| 2003/0164856 A1 | 9/2003 | Prager et al. |
| 2003/0210280 A1 | 11/2003 | Baker et al. |
| 2003/0217106 A1 | 11/2003 | Adar et al. |
| 2003/0217118 A1 | 11/2003 | Kobayashi et al. |
| 2003/0229607 A1 | 12/2003 | Zellweger et al. |
| 2003/0236823 A1 | 12/2003 | Patzer et al. |
| 2004/0027371 A1 | 2/2004 | Jaeger |
| 2004/0059796 A1 | 3/2004 | Mclintock |
| 2004/0064429 A1 | 4/2004 | Hirstius et al. |
| 2004/0078367 A1 | 4/2004 | Anderson et al. |
| 2004/0091116 A1 | 5/2004 | Staddon et al. |
| 2004/0111467 A1 | 6/2004 | Willis |
| 2004/0158739 A1 | 8/2004 | Wakai et al. |
| 2004/0185877 A1 | 9/2004 | Asthana et al. |
| 2004/0189465 A1 | 9/2004 | Capobianco et al. |
| 2004/0193488 A1 | 9/2004 | Khoo et al. |
| 2004/0199402 A1 | 10/2004 | Walker et al. |
| 2004/0203959 A1 | 10/2004 | Coombes |
| 2004/0205480 A1 | 10/2004 | Moore |
| 2004/0205514 A1 | 10/2004 | Sommerer et al. |
| 2004/0215625 A1 | 10/2004 | Svendsen et al. |
| 2004/0243531 A1 | 12/2004 | Dean |
| 2004/0243688 A1 | 12/2004 | Wugofski |
| 2004/0243704 A1 | 12/2004 | Botelho et al. |
| 2005/0019014 A1 | 1/2005 | Yoo et al. |
| 2005/0021444 A1 | 1/2005 | Bauer et al. |
| 2005/0022211 A1 | 1/2005 | Veselov et al. |
| 2005/0024941 A1 | 2/2005 | Lasser et al. |
| 2005/0032527 A1 | 2/2005 | Sheha et al. |
| 2005/0048989 A1 | 3/2005 | Jung |
| 2005/0071435 A1 | 3/2005 | Karstens |
| 2005/0078804 A1 | 4/2005 | Yomoda |
| 2005/0097176 A1 | 5/2005 | Schatz et al. |
| 2005/0102180 A1 | 5/2005 | Gailey et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0253699 A1 | 11/2005 | Madonia |
| 2005/0288954 A1 | 12/2005 | McCarthy et al. |
| 2006/0004630 A1 | 1/2006 | Criddle et al. |
| 2006/0026067 A1 | 2/2006 | Nicholas et al. |
| 2006/0107297 A1 | 5/2006 | Toyama et al. |
| 2006/0109238 A1 | 5/2006 | Lau et al. |
| 2006/0114338 A1 | 6/2006 | Rothschild |
| 2006/0119882 A1 | 6/2006 | Harris et al. |
| 2006/0127054 A1 | 6/2006 | Matsuyama |
| 2006/0136297 A1 | 6/2006 | Willis et al. |
| 2006/0242234 A1 | 10/2006 | Counts et al. |
| 2006/0242239 A1 | 10/2006 | Morishima et al. |
| 2006/0242550 A1 | 10/2006 | Rahman et al. |
| 2006/0242554 A1 | 10/2006 | Gerace et al. |
| 2006/0252438 A1 | 11/2006 | Ansamaa et al. |
| 2006/0259359 A1 | 11/2006 | Gogel |
| 2006/0265417 A1 | 11/2006 | Amato et al. |
| 2006/0270419 A1 | 11/2006 | Crowley et al. |
| 2006/0282819 A1 | 12/2006 | Graham et al. |
| 2006/0287878 A1 | 12/2006 | Wadhwa et al. |
| 2007/0003221 A1 | 1/2007 | Hamada et al. |
| 2007/0004426 A1 | 1/2007 | Pfleging et al. |
| 2007/0028183 A1 | 2/2007 | Ostojic et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0067317 A1 | 3/2007 | Stevenson |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0088832 A1 | 4/2007 | Tsang et al. |
| 2007/0106706 A1 | 5/2007 | Ahrens et al. |
| 2007/0118801 A1 | 5/2007 | Harshbarger et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0250791 A1 | 10/2007 | Halliday et al. |
| 2007/0255456 A1 | 11/2007 | Funayama |
| 2007/0268381 A1 | 11/2007 | Gastinger et al. |
| 2007/0268988 A1 | 11/2007 | Hedayat et al. |
| 2007/0281690 A1 | 12/2007 | Altman et al. |
| 2007/0294735 A1 | 12/2007 | Luo |
| 2007/0299807 A1 | 12/2007 | Lea et al. |
| 2008/0002776 A1 | 1/2008 | Borer et al. |
| 2008/0005240 A1 | 1/2008 | Knighton et al. |
| 2008/0012987 A1 | 1/2008 | Hirata et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033795 A1 | 2/2008 | Wishnow et al. |
| 2008/0033930 A1 | 2/2008 | Warren |
| 2008/0043041 A2 | 2/2008 | Hedenstroem et al. |
| 2008/0046476 A1 | 2/2008 | Anderson et al. |
| 2008/0046831 A1 | 2/2008 | Imai et al. |
| 2008/0046956 A1 | 2/2008 | Kulas |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0076505 A1 | 3/2008 | Ngyen et al. |
| 2008/0091723 A1* | 4/2008 | Zuckerberg ........... H04L 67/306 |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0133336 A1 | 6/2008 | Altman et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0160956 A1 | 7/2008 | Jackson et al. |
| 2008/0167106 A1 | 7/2008 | Lutnick |
| 2008/0168033 A1 | 7/2008 | Ott et al. |

(56) References Cited

U.S. PATENT DOCUMENTS

| | | |
|---|---|---|
| 2008/0168489 A1 | 7/2008 | Schraga |
| 2008/0172413 A1 | 7/2008 | Chiu |
| 2008/0183485 A1 | 7/2008 | Drabble et al. |
| 2008/0184117 A1 | 7/2008 | Alsbury et al. |
| 2008/0189177 A1 | 8/2008 | Anderton et al. |
| 2008/0193101 A1 | 8/2008 | Agnihotri et al. |
| 2008/0200189 A1 | 8/2008 | Lagerstedt et al. |
| 2008/0207176 A1 | 8/2008 | Brackbill et al. |
| 2008/0208692 A1 | 8/2008 | Garaventi et al. |
| 2008/0021421 A1 | 9/2008 | Rasanen et al. |
| 2008/0222158 A1 | 9/2008 | Saika |
| 2008/0222545 A1 | 9/2008 | Lemay |
| 2008/0244438 A1 | 10/2008 | Peters et al. |
| 2008/0255976 A1 | 10/2008 | Altberg et al. |
| 2008/0256430 A1 | 10/2008 | Gold |
| 2008/0256446 A1 | 10/2008 | Yamamoto |
| 2008/0256450 A1 | 10/2008 | Takakura et al. |
| 2008/0256577 A1 | 10/2008 | Funaki et al. |
| 2008/0263103 A1* | 10/2008 | McGregor ............ G06F 16/447 |
| 2008/0266421 A1 | 10/2008 | Takahata et al. |
| 2008/0270938 A1 | 10/2008 | Carlson |
| 2008/0284587 A1 | 11/2008 | Saigh et al. |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0316181 A1 | 12/2008 | Nurmi |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0012788 A1 | 1/2009 | Gilbert et al. |
| 2009/0015703 A1 | 1/2009 | Kim et al. |
| 2009/0019472 A1 | 1/2009 | Cleland et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0008971 A1 | 4/2009 | Wood et al. |
| 2009/0087161 A1 | 4/2009 | Roberts et al. |
| 2009/0089169 A1 | 4/2009 | Gupta et al. |
| 2009/0089378 A1 | 4/2009 | Maresh |
| 2009/0089678 A1 | 4/2009 | Sacco et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0132687 A1 | 5/2009 | Yue et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0158183 A1 | 6/2009 | Mccurdy et al. |
| 2009/0160970 A1 | 6/2009 | Fredlund et al. |
| 2009/0163182 A1 | 6/2009 | Gatti et al. |
| 2009/0169062 A1 | 7/2009 | Cheung et al. |
| 2009/0177299 A1 | 7/2009 | Van De Sluis |
| 2009/0177588 A1 | 7/2009 | Marchese |
| 2009/0177730 A1 | 7/2009 | Annamalai et al. |
| 2009/0187825 A1 | 7/2009 | Sandquist et al. |
| 2009/0192900 A1 | 7/2009 | Collision |
| 2009/0197582 A1 | 8/2009 | Lewis et al. |
| 2009/0197616 A1 | 8/2009 | Lewis et al. |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0235155 A1 | 9/2009 | Ueda |
| 2009/0239552 A1 | 9/2009 | Churchill et al. |
| 2009/0026001 A1 | 10/2009 | Burkhart et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0284658 A1 | 11/2009 | Cho |
| 2009/0288022 A1 | 11/2009 | Almstrand et al. |
| 2009/0291665 A1 | 11/2009 | Gaskarth et al. |
| 2009/0291672 A1 | 11/2009 | Treves et al. |
| 2009/0292608 A1 | 11/2009 | Polachek |
| 2009/0300139 A1 | 12/2009 | Shoemaker et al. |
| 2009/0319607 A1 | 12/2009 | Belz et al. |
| 2009/0327073 A1 | 12/2009 | Li |
| 2010/0001980 A1 | 1/2010 | Kim et al. |
| 2010/0011316 A1 | 1/2010 | Sar et al. |
| 2010/0014833 A1 | 1/2010 | Pjanovic et al. |
| 2010/0039505 A1 | 2/2010 | Inoue et al. |
| 2010/0041378 A1 | 2/2010 | Aceves et al. |
| 2010/0062794 A1 | 3/2010 | Han |
| 2010/0064324 A1 | 3/2010 | Jenkin et al. |
| 2010/0073509 A1 | 3/2010 | Shioji |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0100729 A1 | 4/2010 | Read et al. |
| 2010/0113065 A1 | 5/2010 | Narayan et al. |
| 2010/0113066 A1 | 5/2010 | Dingler et al. |
| 2010/0115281 A1 | 5/2010 | Camenisch et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0153197 A1 | 6/2010 | Byon |
| 2010/0156933 A1 | 6/2010 | Jones et al. |
| 2010/0159944 A1 | 6/2010 | Pascal et al. |
| 2010/0161635 A1 | 6/2010 | Dey |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0185750 A1 | 7/2010 | Nakayama |
| 2010/0185987 A1 | 7/2010 | Yang et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0199166 A1 | 8/2010 | Fisk, III |
| 2010/0199227 A1* | 8/2010 | Xiao ..................... G06F 3/0481 |
| | | 715/863 |
| 2010/0201482 A1 | 8/2010 | Robertson et al. |
| 2010/0201536 A1 | 8/2010 | Robertson et al. |
| 2010/0211431 A1 | 8/2010 | Lutnick et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0247064 A1 | 9/2010 | Yeh et al. |
| 2010/0250109 A1 | 9/2010 | Johnston et al. |
| 2010/0251143 A1 | 9/2010 | Thomas et al. |
| 2010/0257196 A1 | 10/2010 | Waters et al. |
| 2010/0259386 A1 | 10/2010 | Holley et al. |
| 2010/0262461 A1 | 10/2010 | Bohannon |
| 2010/0273463 A1 | 10/2010 | Bonnefoy |
| 2010/0273509 A1 | 10/2010 | Sweeney et al. |
| 2010/0281045 A1 | 11/2010 | Dean |
| 2010/0293105 A1 | 11/2010 | Blinn et al. |
| 2010/0299763 A1 | 11/2010 | Marcus et al. |
| 2010/0306669 A1 | 12/2010 | Della Pasqua |
| 2010/0332958 A1 | 12/2010 | Weinberger et al. |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0037605 A1 | 2/2011 | Robison, Jr. et al. |
| 2011/0040783 A1 | 2/2011 | Uemichi et al. |
| 2011/0040804 A1 | 2/2011 | Peirce et al. |
| 2011/0044549 A1 | 2/2011 | Bressan |
| 2011/0050909 A1 | 3/2011 | Ellenby et al. |

(56) References Cited

U.S. PATENT DOCUMENTS

| | | |
|---|---|---|
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0078023 A1 | 3/2011 | Aldrey et al. |
| 2011/0083101 A1 | 4/2011 | Sharon et al. |
| 2011/0085059 A1 | 4/2011 | Noh |
| 2011/0093444 A1 | 4/2011 | Rose et al. |
| 2011/0099507 A1 | 4/2011 | Nesladek et al. |
| 2011/0099519 A1 | 4/2011 | Ma et al. |
| 2011/0102630 A1 | 5/2011 | Rukes |
| 2011/0106882 A1 | 5/2011 | Takakura et al. |
| 2011/0119133 A1 | 5/2011 | Igelman et al. |
| 2011/0131633 A1 | 6/2011 | Macaskill et al. |
| 2011/0137782 A1 | 6/2011 | Fang |
| 2011/0137881 A1 | 6/2011 | Cheng et al. |
| 2011/0141025 A1 | 6/2011 | Tsai |
| 2011/0145564 A1 | 6/2011 | Moshir et al. |
| 2011/0159890 A1 | 6/2011 | Fortescue et al. |
| 2011/0161423 A1* | 6/2011 | Pratt .................. G06Q 10/06 709/205 |
| 2011/0164163 A1 | 7/2011 | Bilbrey et al. |
| 2011/0170838 A1 | 7/2011 | Rosengart et al. |
| 2011/0184980 A1 | 7/2011 | Jeong et al. |
| 2011/0191368 A1 | 8/2011 | Muzatko |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238300 A1 | 9/2011 | Schenken |
| 2011/0238762 A1 | 9/2011 | Soni et al. |
| 2011/0238763 A1 | 9/2011 | Shin et al. |
| 2011/0249551 A1 | 10/2011 | Rollins |
| 2011/0251790 A1 | 10/2011 | Liotopoulos et al. |
| 2011/0255736 A1 | 10/2011 | Thompson et al. |
| 2011/0256881 A1 | 10/2011 | Huang et al. |
| 2011/0258260 A1 | 10/2011 | Isaacson |
| 2011/0269479 A1 | 11/2011 | Ledlie |
| 2011/0273575 A1 | 11/2011 | Lee |
| 2011/0276637 A1 | 11/2011 | Thornton et al. |
| 2011/0282799 A1 | 11/2011 | Huston |
| 2011/0283172 A1 | 11/2011 | Berger et al. |
| 2011/0283188 A1 | 11/2011 | Farrenkopf |
| 2011/0286586 A1 | 11/2011 | Saylor et al. |
| 2011/0294541 A1 | 12/2011 | Zheng et al. |
| 2011/0295577 A1 | 12/2011 | Ramachandran |
| 2011/0295677 A1 | 12/2011 | Dhingra et al. |
| 2011/0295719 A1 | 12/2011 | Chen |
| 2011/0296474 A1 | 12/2011 | Babic |
| 2011/0301934 A1 | 12/2011 | Tardif |
| 2011/0302525 A1 | 12/2011 | Jeon |
| 2011/0306387 A1 | 12/2011 | Moon |
| 2011/0314084 A1 | 12/2011 | Saretto et al. |
| 2011/0314419 A1 | 12/2011 | Dunn et al. |
| 2011/0320373 A1 | 12/2011 | Lee et al. |
| 2012/0004956 A1 | 1/2012 | Hustan |
| 2012/0019722 A1 | 1/2012 | Kwisthout et al. |
| 2012/0023522 A1 | 1/2012 | Anderson et al. |
| 2012/0028659 A1 | 2/2012 | Whitney et al. |
| 2012/0030194 A1 | 2/2012 | Jain |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054001 A1 | 3/2012 | Zivkovic et al. |
| 2012/0054797 A1 | 3/2012 | Skog et al. |
| 2012/0054811 A1 | 3/2012 | Spears |
| 2012/0059722 A1 | 3/2012 | Rao |
| 2012/0062805 A1 | 3/2012 | Candelore |
| 2012/0070045 A1 | 3/2012 | Vesper et al. |
| 2012/0084731 A1 | 4/2012 | Filman et al. |
| 2012/0084835 A1 | 4/2012 | Thomas et al. |
| 2012/0098836 A1 | 4/2012 | Kim et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0117456 A1* | 5/2012 | Koskimies .......... G06F 9/44505 715/224 |
| 2012/0123830 A1 | 5/2012 | Svendsen et al. |
| 2012/0123867 A1 | 5/2012 | Hannan |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124147 A1 | 5/2012 | Hamlin et al. |
| 2012/0124176 A1 | 5/2012 | Curtis et al. |
| 2012/0124458 A1 | 5/2012 | Cruzada |
| 2012/0127196 A1 | 5/2012 | Landry |
| 2012/0129548 A1 | 5/2012 | Rao et al. |
| 2012/0131507 A1 | 5/2012 | Sparandara et al. |
| 2012/0131512 A1 | 5/2012 | Takeuchi et al. |
| 2012/0136998 A1 | 5/2012 | Hough et al. |
| 2012/0001651 A1 | 6/2012 | Lalancette et al. |
| 2012/0141088 A1 | 6/2012 | Isozu et al. |
| 2012/0143760 A1 | 6/2012 | Abulafia et al. |
| 2012/0150978 A1 | 6/2012 | Monaco |
| 2012/0158532 A1 | 6/2012 | Fitzsimmons |
| 2012/0158814 A1 | 6/2012 | Sabiwalsky |
| 2012/0163664 A1 | 6/2012 | Zhu |
| 2012/0166462 A1 | 6/2012 | Pathak et al. |
| 2012/0166468 A1 | 6/2012 | Gupta et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197690 A1 | 8/2012 | Agulnek |
| 2012/0197724 A1 | 8/2012 | Kendall |
| 2012/0200743 A1 | 8/2012 | Blanchflower et al. |
| 2012/0201362 A1* | 8/2012 | Crossan .................. G10L 15/26 704/226 |
| 2012/0203849 A1 | 8/2012 | Collins et al. |
| 2012/0208564 A1 | 8/2012 | Clark et al. |
| 2012/0209892 A1 | 8/2012 | Macaskill et al. |
| 2012/0209921 A1 | 8/2012 | Adafin et al. |
| 2012/0209924 A1 | 8/2012 | Evans et al. |
| 2012/0210244 A1 | 8/2012 | De et al. |
| 2012/0212632 A1 | 8/2012 | Mate et al. |
| 2012/0220219 A1 | 8/2012 | Hill et al. |
| 2012/0220264 A1 | 8/2012 | Kawabata |
| 2012/0226663 A1 | 9/2012 | Valdez et al. |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254324 A1 | 10/2012 | Majeti et al. |
| 2012/0254325 A1 | 10/2012 | Majeti et al. |
| 2012/0259815 A1 | 10/2012 | Olson |
| 2012/0263439 A1 | 10/2012 | Lassman et al. |
| 2012/0271684 A1 | 10/2012 | Shutter |
| 2012/0278387 A1 | 11/2012 | Garcia et al. |
| 2012/0278692 A1 | 11/2012 | Shi |
| 2012/0281129 A1 | 11/2012 | Wang et al. |
| 2012/0288147 A1 | 11/2012 | Fujitani |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormaid et al. |
| 2012/0307096 A1 | 12/2012 | Ford et al. |
| 2012/0307112 A1 | 12/2012 | Kunishige et al. |
| 2012/0311465 A1 | 12/2012 | Nealer et al. |
| 2012/0311623 A1* | 12/2012 | Davis .................. H04N 9/8205 725/18 |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0004014 A1 | 1/2013 | Hickman |
| 2013/0006759 A1 | 1/2013 | Srivastava et al. |
| 2013/0006777 A1 | 1/2013 | Krishnareddy et al. |

(56) References Cited

U.S. PATENT DOCUMENTS

| | | |
|---|---|---|
| 2013/0017802 A1 | 1/2013 | Adibi et al. |
| 2013/0018960 A1 | 1/2013 | Knysz et al. |
| 2013/0024292 A1* | 1/2013 | David .................... G06Q 30/02 |
| | | 705/14.67 |
| 2013/0024757 A1 | 1/2013 | Doll et al. |
| 2013/0036364 A1* | 2/2013 | Johnson .................. G06F 21/16 |
| | | 715/738 |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057489 A1 | 3/2013 | Morton |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0076758 A1 | 3/2013 | Li et al. |
| 2013/0080254 A1 | 3/2013 | Thramann |
| 2013/0082959 A1 | 4/2013 | Shimazu et al. |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1* | 4/2013 | Thornton ................. H04L 51/08 |
| | | 715/752 |
| 2013/0110885 A1 | 5/2013 | Brundrett, III |
| 2013/0111514 A1 | 5/2013 | Slavin et al. |
| 2013/0115872 A1 | 5/2013 | Huang et al. |
| 2013/0117261 A1 | 5/2013 | Sambrani |
| 2013/0117365 A1 | 5/2013 | Padmanabhan et al. |
| 2013/0122862 A1 | 5/2013 | Horn et al. |
| 2013/0122929 A1 | 5/2013 | Al-mufti et al. |
| 2013/0124297 A1 | 5/2013 | Hegeman et al. |
| 2013/0128059 A1 | 5/2013 | Kristensson |
| 2013/0129252 A1 | 5/2013 | Lauper |
| 2013/0132194 A1 | 5/2013 | Rajaram |
| 2013/0132477 A1 | 5/2013 | Bosworth et al. |
| 2013/0132836 A1 | 5/2013 | Ortiz |
| 2013/0132908 A1 | 5/2013 | Lee et al. |
| 2013/0144979 A1 | 6/2013 | Kansal et al. |
| 2013/0145286 A1 | 6/2013 | Feng et al. |
| 2013/0147837 A1 | 6/2013 | Stroila |
| 2013/0157684 A1 | 6/2013 | Moser |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173380 A1 | 7/2013 | Akbari et al. |
| 2013/0173467 A1 | 7/2013 | Nuzzi et al. |
| 2013/0173531 A1 | 7/2013 | Rinearson et al. |
| 2013/0173729 A1 | 7/2013 | Starenky et al. |
| 2013/0176438 A1 | 7/2013 | Mate et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0203373 A1 | 8/2013 | Edge |
| 2013/0210518 A1 | 8/2013 | Barclay et al. |
| 2013/0217366 A1 | 8/2013 | Kolodziej |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0254227 A1 | 9/2013 | Shim et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0283167 A1 | 10/2013 | Xu |
| 2013/0290337 A1* | 10/2013 | Lansford ................. G06Q 50/01 |
| | | 707/738 |
| 2013/0290443 A1 | 10/2013 | Collins et al. |
| 2013/0304243 A1 | 11/2013 | Iseli |
| 2013/0304527 A1 | 11/2013 | Santos, III |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0003739 A1* | 1/2014 | S V ......................... G06T 11/60 |
| | | 382/284 |
| 2014/0006129 A1 | 1/2014 | Heath |
| 2014/0011538 A1 | 1/2014 | Mulcahy et al. |
| 2014/0013243 A1 | 1/2014 | Flynn, III et al. |
| 2014/0019264 A1 | 1/2014 | Wachman et al. |
| 2014/0028589 A1 | 1/2014 | Reilly |
| 2014/0029034 A1 | 1/2014 | Toriyama |
| 2014/0032682 A1 | 1/2014 | Prado et al. |
| 2014/0040712 A1 | 2/2014 | Chang et al. |
| 2014/0043204 A1 | 2/2014 | Basnayake et al. |
| 2014/0043355 A1 | 2/2014 | Kim et al. |
| 2014/0045433 A1 | 2/2014 | Kim |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047074 A1 | 2/2014 | Chung et al. |
| 2014/0047335 A1 | 2/2014 | Lewis et al. |
| 2014/0049652 A1 | 2/2014 | Moon et al. |
| 2014/0052281 A1 | 2/2014 | Eronen et al. |
| 2014/0052485 A1 | 2/2014 | Shidfar |
| 2014/0052633 A1 | 2/2014 | Gandhi |
| 2014/0057648 A1 | 2/2014 | Lyman et al. |
| 2014/0057660 A1 | 2/2014 | Wager |
| 2014/0059479 A1 | 2/2014 | Hamburg et al. |
| 2014/0066106 A1 | 3/2014 | Ngo et al. |
| 2014/0068692 A1 | 3/2014 | Archibong et al. |
| 2014/0082651 A1 | 3/2014 | Sharifi |
| 2014/0086562 A1 | 3/2014 | Lassman et al. |
| 2014/0089264 A1 | 3/2014 | Talagala et al. |
| 2014/0089314 A1 | 3/2014 | Iizuka et al. |
| 2014/0089801 A1 | 3/2014 | Agrawal |
| 2014/0092130 A1 | 4/2014 | Anderson et al. |
| 2014/0095296 A1 | 4/2014 | Angell et al. |
| 2014/0096029 A1 | 4/2014 | Schultz |
| 2014/0114565 A1 | 4/2014 | Aziz et al. |
| 2014/0118390 A1 | 5/2014 | Ioffe et al. |
| 2014/0122502 A1 | 5/2014 | Kalmes et al. |
| 2014/0122658 A1 | 5/2014 | Haeger et al. |
| 2014/0122787 A1 | 5/2014 | Shalvi et al. |
| 2014/0129627 A1 | 5/2014 | Baldwin et al. |
| 2014/0129953 A1 | 5/2014 | Spiegel |
| 2014/0129981 A1* | 5/2014 | Soderberg ........... G06F 16/5866 |
| | | 715/810 |
| 2014/0136985 A1 | 5/2014 | Albir et al. |
| 2014/0143143 A1 | 5/2014 | Fasoli et al. |
| 2014/0149519 A1 | 5/2014 | Redfern et al. |
| 2014/0015641 A1 | 6/2014 | Wuersch et al. |
| 2014/0153837 A1 | 6/2014 | Steiner |
| 2014/0153902 A1 | 6/2014 | Pearson et al. |
| 2014/0155102 A1 | 6/2014 | Cooper et al. |
| 2014/0164118 A1 | 6/2014 | Polachi |
| 2014/0164979 A1 | 6/2014 | Deeter et al. |
| 2014/0171036 A1 | 6/2014 | Simmons |
| 2014/0172542 A1 | 6/2014 | Poncz et al. |
| 2014/0172877 A1 | 6/2014 | Rubinstein et al. |
| 2014/0173025 A1 | 6/2014 | Killick |
| 2014/0173424 A1 | 6/2014 | Hogeg et al. |
| 2014/0173457 A1 | 6/2014 | Wang et al. |
| 2014/0180829 A1 | 6/2014 | Umeda |
| 2014/0188815 A1 | 7/2014 | Mentz et al. |
| 2014/0189592 A1 | 7/2014 | Benchenaa et al. |
| 2014/0189937 A1 | 7/2014 | Pietrzak et al. |
| 2014/0201527 A1 | 7/2014 | Krivorot |
| 2014/0207679 A1 | 7/2014 | Cho |
| 2014/0207860 A1 | 7/2014 | Wang et al. |
| 2014/0214471 A1 | 7/2014 | Schreiner, III |
| 2014/0222564 A1 | 8/2014 | Kranendonk et al. |
| 2014/0222913 A1 | 8/2014 | Cathcart et al. |
| 2014/0250465 A1 | 9/2014 | Mulholland et al. |
| 2014/0255001 A1 | 9/2014 | Malagn et al. |
| 2014/0258405 A1 | 9/2014 | Perkin |

(56) References Cited

U.S. PATENT DOCUMENTS

| | | |
|---|---|---|
| 2014/0265359 A1 | 9/2014 | Cheng et al. |
| 2014/0266703 A1 | 9/2014 | Dalley, Jr. et al. |
| 2014/0279040 A1 | 9/2014 | Kuboyama |
| 2014/0279061 A1 | 9/2014 | Elimeliah et al. |
| 2014/0279128 A1 | 9/2014 | Sagebin |
| 2014/0279436 A1 | 9/2014 | Dorsey et al. |
| 2014/0279540 A1 | 9/2014 | Jackson |
| 2014/0280140 A1 | 9/2014 | Ling et al. |
| 2014/0280537 A1 | 9/2014 | Pridmore et al. |
| 2014/0281847 A1* | 9/2014 | Marra .................... G06T 11/60 715/202 |
| 2014/0282096 A1 | 9/2014 | Rubinstein et al. |
| 2014/0286566 A1 | 9/2014 | Rhoads |
| 2014/0287779 A1 | 9/2014 | O'keefe et al. |
| 2014/0289157 A1 | 9/2014 | Kenna, III et al. |
| 2014/0289597 A1 | 9/2014 | Kim |
| 2014/0289603 A1 | 9/2014 | Subrahmanya et al. |
| 2014/0289833 A1 | 9/2014 | Briceno |
| 2014/0029821 A1 | 10/2014 | Park et al. |
| 2014/0292375 A1 | 10/2014 | Angelini et al. |
| 2014/0304622 A1* | 10/2014 | Jorasch .............. H04L 12/1813 715/753 |
| 2014/0306986 A1 | 10/2014 | Gottesman et al. |
| 2014/0317302 A1 | 10/2014 | Naik |
| 2014/0320662 A1 | 10/2014 | Mcnamee et al. |
| 2014/0324627 A1 | 10/2014 | Haver et al. |
| 2014/0324629 A1* | 10/2014 | Jacobs ............... G06Q 30/0276 705/26.5 |
| 2014/0325383 A1 | 10/2014 | Brown et al. |
| 2014/0325569 A1 | 10/2014 | Suzuki et al. |
| 2014/0331188 A1 | 11/2014 | Sandstrom et al. |
| 2014/0337123 A1 | 11/2014 | Nuernberg et al. |
| 2014/0344698 A1 | 11/2014 | Hohteri et al. |
| 2014/0355905 A1* | 12/2014 | Lipton .................... G06T 11/60 382/284 |
| 2014/0359024 A1 | 12/2014 | Spiegel |
| 2014/0359032 A1 | 12/2014 | Spiegel et al. |
| 2014/0359656 A1 | 12/2014 | Banica et al. |
| 2014/0372844 A1 | 12/2014 | Zumkhawala |
| 2014/0372850 A1 | 12/2014 | Campbell et al. |
| 2014/0379683 A1 | 12/2014 | Bazaz |
| 2015/0012603 A1 | 1/2015 | Saito |
| 2015/0013016 A1* | 1/2015 | Kanter ................. G06F 21/6245 726/28 |
| 2015/0015680 A1 | 1/2015 | Wang et al. |
| 2015/0020086 A1 | 1/2015 | Chen et al. |
| 2015/0040011 A1 | 2/2015 | Chun |
| 2015/0042572 A1 | 2/2015 | Lombardi et al. |
| 2015/0043033 A1 | 2/2015 | Sugimoto |
| 2015/0046278 A1 | 2/2015 | Pei et al. |
| 2015/0055197 A1 | 2/2015 | Romanoff et al. |
| 2015/0058916 A1* | 2/2015 | Rostami-Hesarsorkh .................. H04L 63/168 726/1 |
| 2015/0058957 A1 | 2/2015 | Halliday et al. |
| 2015/0063724 A1 | 3/2015 | Ikeda et al. |
| 2015/0071619 A1 | 3/2015 | Brough |
| 2015/0081630 A1 | 3/2015 | Linsalata et al. |
| 2015/0087263 A1 | 3/2015 | Branscomb et al. |
| 2015/0088622 A1 | 3/2015 | Ganschow et al. |
| 2015/0094106 A1 | 4/2015 | Grossman et al. |
| 2015/0095020 A1 | 4/2015 | Leydon |
| 2015/0096042 A1 | 4/2015 | Mizrachi |
| 2015/0103097 A1 | 4/2015 | Li |
| 2015/0116529 A1 | 4/2015 | Wu et al. |
| 2015/0120293 A1 | 4/2015 | Wohlert et al. |
| 2015/0127643 A1 | 5/2015 | Cohen et al. |
| 2015/0127754 A1* | 5/2015 | Clark .................... H04L 51/10 709/206 |
| 2015/0130178 A1 | 5/2015 | Clements |
| 2015/0134318 A1* | 5/2015 | Cuthbert ................ G06F 40/58 715/231 |
| 2015/0142753 A1 | 5/2015 | Soon-Shiong |
| 2015/0154650 A1 | 6/2015 | Umeda |
| 2015/0161178 A1* | 6/2015 | Bdoiu ................... G06F 16/532 707/723 |
| 2015/0161822 A1 | 6/2015 | Basu |
| 2015/0163629 A1 | 6/2015 | Cheung |
| 2015/0169827 A1 | 6/2015 | Laborde |
| 2015/0172534 A1 | 6/2015 | Miyakawa et al. |
| 2015/0177937 A1* | 6/2015 | Poletto .................... G06F 3/167 715/739 |
| 2015/0178260 A1 | 6/2015 | Brunson |
| 2015/0185990 A1 | 7/2015 | Thompson |
| 2015/0186217 A1 | 7/2015 | Eslami Sarab |
| 2015/0186497 A1 | 7/2015 | Patton et al. |
| 2015/0186511 A1 | 7/2015 | Trollope et al. |
| 2015/0188869 A1 | 7/2015 | Gilad et al. |
| 2015/0193685 A1 | 7/2015 | Srinivasan et al. |
| 2015/0199082 A1 | 7/2015 | Scholler et al. |
| 2015/0206349 A1 | 7/2015 | Rosenthal et al. |
| 2015/0220606 A1 | 8/2015 | Ito et al. |
| 2015/0222814 A1 | 8/2015 | Li et al. |
| 2015/0227602 A1 | 8/2015 | Ramu et al. |
| 2015/0237472 A1 | 8/2015 | Alsina et al. |
| 2015/0237473 A1 | 8/2015 | Koepke |
| 2015/0242525 A1* | 8/2015 | Perlegos ............... G06F 16/972 707/782 |
| 2015/0248683 A1 | 9/2015 | Walkingshaw |
| 2015/0249710 A1 | 9/2015 | Stefansson et al. |
| 2015/0254704 A1 | 9/2015 | Kothe et al. |
| 2015/0261917 A1 | 9/2015 | Smith |
| 2015/0262208 A1 | 9/2015 | Bjontegard |
| 2015/0269624 A1 | 9/2015 | Cheng et al. |
| 2015/0271779 A1 | 9/2015 | Alavudin |
| 2015/0287072 A1 | 10/2015 | Golden et al. |
| 2015/0294367 A1 | 10/2015 | Oberbrunner et al. |
| 2015/0312184 A1 | 10/2015 | Langholz et al. |
| 2015/0032651 A1 | 11/2015 | Tomlinson et al. |
| 2015/0033231 A1 | 11/2015 | Cui et al. |
| 2015/0325268 A1 | 11/2015 | Berger et al. |
| 2015/0332317 A1 | 11/2015 | Cui et al. |
| 2015/0332325 A1 | 11/2015 | Sharma et al. |
| 2015/0332329 A1 | 11/2015 | Luo et al. |
| 2015/0334347 A1 | 11/2015 | Kang et al. |
| 2015/0339303 A1* | 11/2015 | Perlegos ............. G06F 16/7867 707/756 |
| 2015/0341447 A1 | 11/2015 | Patil |
| 2015/0341747 A1 | 11/2015 | Barrand et al. |
| 2015/0350136 A1 | 12/2015 | Flynn, III et al. |
| 2015/0356190 A1 | 12/2015 | Rotem et al. |
| 2015/0356615 A1* | 12/2015 | Hagen ................. G06Q 30/0267 705/14.64 |
| 2015/0358806 A1 | 12/2015 | Salqvist |
| 2015/0365795 A1 | 12/2015 | Allen et al. |
| 2015/0367233 A1 | 12/2015 | Hicks et al. |
| 2015/0370320 A1 | 12/2015 | Connor |
| 2015/0378502 A1 | 12/2015 | Hu et al. |
| 2015/0381682 A1 | 12/2015 | Rao et al. |
| 2015/0381688 A1* | 12/2015 | Jenkins ................ G06F 16/58 709/219 |
| 2016/0006927 A1 | 1/2016 | Sehn |
| 2016/0014063 A1 | 1/2016 | Hogeg et al. |
| 2016/0019592 A1 | 1/2016 | Muttineni et al. |
| 2016/0034253 A1* | 2/2016 | Bang .................... G06F 3/04883 715/728 |
| 2016/0034712 A1 | 2/2016 | Patton et al. |
| 2016/0034786 A1 | 2/2016 | Suri et al. |
| 2016/0048369 A1* | 2/2016 | Zenoff ................ H04N 9/3173 345/2.1 |
| 2016/0050704 A1 | 2/2016 | von Sneidern et al. |
| 2016/0085773 A1 | 3/2016 | Chang et al. |
| 2016/0085863 A1 | 3/2016 | Allen et al. |
| 2016/0085994 A1* | 3/2016 | Pereira .................... G06F 21/31 726/26 |
| 2016/0086670 A1 | 3/2016 | Gross et al. |
| 2016/0092561 A1 | 3/2016 | Liu et al. |
| 2016/0092962 A1 | 3/2016 | Wasserman et al. |
| 2016/0098742 A1 | 4/2016 | Minicucci et al. |
| 2016/0099901 A1 | 4/2016 | Allen et al. |
| 2016/0105387 A1 | 4/2016 | Jackson |
| 2016/0119272 A1 | 4/2016 | Rubinstein et al. |

(56) References Cited

U.S. PATENT DOCUMENTS

| | | | |
|---|---|---|---|
| 2016/0134941 A1 | 5/2016 | Selvaraj | |
| 2016/0139748 A1 | 5/2016 | Iwaizumi et al. | |
| 2016/0149843 A1* | 5/2016 | Spicer | G06Q 10/101 709/206 |
| 2016/0180887 A1* | 6/2016 | Sehn | G11B 27/34 386/285 |
| 2016/0182422 A1* | 6/2016 | Sehn | H04L 51/52 709/206 |
| 2016/0182875 A1* | 6/2016 | Sehn | G11B 27/00 348/515 |
| 2016/0196584 A1 | 7/2016 | Franklin et al. | |
| 2016/0210657 A1 | 7/2016 | Chittilappilly et al. | |
| 2016/0219402 A1 | 7/2016 | Zimerman et al. | |
| 2016/0234023 A1* | 8/2016 | Mozer | G06V 40/173 |
| 2016/0234556 A1 | 8/2016 | Berridge | |
| 2016/0239248 A1 | 8/2016 | Sehn | |
| 2016/0239457 A1 | 8/2016 | Gross et al. | |
| 2016/0247537 A1 | 8/2016 | Ricciardi | |
| 2016/0253833 A1* | 9/2016 | Lew | H04N 1/00196 715/202 |
| 2016/0253912 A1 | 9/2016 | Heilman et al. | |
| 2016/0274705 A1 | 9/2016 | Kapadia et al. | |
| 2016/0277419 A1 | 9/2016 | Allen et al. | |
| 2016/0286244 A1 | 9/2016 | Chang et al. | |
| 2016/0292735 A1 | 10/2016 | Kim | |
| 2016/0314120 A1 | 10/2016 | Dauderman | |
| 2016/0321708 A1 | 11/2016 | Sehn | |
| 2016/0345035 A1 | 11/2016 | Han et al. | |
| 2016/0352659 A1 | 12/2016 | Krishnamoorth | |
| 2016/0359957 A1 | 12/2016 | Laliberte | |
| 2016/0359987 A1 | 12/2016 | Laliberte | |
| 2016/0364668 A1 | 12/2016 | Young et al. | |
| 2017/0006094 A1 | 1/2017 | Abou Mahmoud et al. | |
| 2017/0026786 A1 | 1/2017 | Barron et al. | |
| 2017/0061308 A1 | 3/2017 | Chen et al. | |
| 2017/0078760 A1 | 3/2017 | Christoph et al. | |
| 2017/0091795 A1 | 3/2017 | Mansour et al. | |
| 2017/0111617 A1 | 4/2017 | Kuwahara et al. | |
| 2017/0123487 A1 | 5/2017 | Hazra et al. | |
| 2017/0127233 A1 | 5/2017 | Liang et al. | |
| 2017/0132647 A1 | 5/2017 | Bostick et al. | |
| 2017/0134821 A1 | 5/2017 | D'amelio et al. | |
| 2017/0149717 A1 | 5/2017 | Sehn | |
| 2017/0161382 A1 | 6/2017 | Ouimet et al. | |
| 2017/0164161 A1 | 6/2017 | Gupta et al. | |
| 2017/0185256 A1 | 6/2017 | Bennett | |
| 2017/0186038 A1 | 6/2017 | Glover et al. | |
| 2017/0222962 A1 | 8/2017 | Gauglitz et al. | |
| 2017/0230315 A1 | 8/2017 | Zubas et al. | |
| 2017/0263029 A1 | 9/2017 | Yan et al. | |
| 2017/0277684 A1 | 9/2017 | Dharmarajan Mary | |
| 2017/0277685 A1 | 9/2017 | Takumi | |
| 2017/0287006 A1 | 10/2017 | Azmoodeh et al. | |
| 2017/0295250 A1 | 10/2017 | Samaranayake et al. | |
| 2017/0310888 A1* | 10/2017 | Wright | H04N 23/80 |
| 2017/0329481 A1* | 11/2017 | Stoop | G06Q 50/01 |
| 2017/0339521 A1 | 11/2017 | Colonna et al. | |
| 2017/0351910 A1 | 12/2017 | Elwazer et al. | |
| 2017/0359686 A1 | 12/2017 | Colonna et al. | |
| 2017/0374003 A1 | 12/2017 | Allen et al. | |
| 2017/0374508 A1 | 12/2017 | Davis et al. | |
| 2018/0013975 A1 | 1/2018 | Tang | |
| 2018/0103002 A1 | 4/2018 | Sehn | |
| 2018/0121957 A1 | 5/2018 | Cornwall et al. | |
| 2018/0131663 A1 | 5/2018 | Halliday et al. | |
| 2018/0139241 A1* | 5/2018 | Jacobsen | H05K 999/99 |
| 2018/0158370 A1 | 6/2018 | Pryor | |
| 2018/0189835 A1 | 7/2018 | Deluca et al. | |
| 2018/0225687 A1 | 8/2018 | Ahmed et al. | |
| 2018/0278562 A1 | 9/2018 | Tang | |
| 2018/0279016 A1 | 9/2018 | Tang | |
| 2018/0301169 A1 | 10/2018 | Ricciardi | |
| 2018/0316575 A1 | 11/2018 | Son et al. | |
| 2019/0097812 A1 | 3/2019 | Toth | |
| 2019/0237106 A1 | 8/2019 | Sehn | |
| 2019/0267041 A1 | 8/2019 | Ricciardi et al. | |
| 2019/0342699 A1 | 11/2019 | Sehn et al. | |
| 2019/0372991 A1 | 12/2019 | Allen et al. | |
| 2020/0057590 A1* | 2/2020 | Sehn | G06F 3/0489 |
| 2020/0105304 A1 | 4/2020 | Sehn | |
| 2020/0112531 A1 | 4/2020 | Tang | |
| 2020/0193053 A1 | 6/2020 | Murphy et al. | |
| 2020/0204726 A1 | 6/2020 | Ebsen et al. | |
| 2020/0213804 A1 | 7/2020 | Sehn et al. | |
| 2020/0288270 A1 | 9/2020 | Allen et al. | |
| 2020/0329336 A1 | 10/2020 | Sehn et al. | |
| 2020/0411058 A1 | 12/2020 | Sehn | |
| 2021/0006526 A1 | 1/2021 | Allen et al. | |
| 2021/0006527 A1 | 1/2021 | Allen et al. | |
| 2021/0006528 A1 | 1/2021 | Allen et al. | |
| 2021/0011612 A1 | 1/2021 | Dancie et al. | |
| 2021/0014238 A1 | 1/2021 | Allen et al. | |
| 2021/0074016 A1 | 3/2021 | Li et al. | |
| 2021/0166456 A1 | 6/2021 | Yan et al. | |
| 2021/0166732 A1 | 6/2021 | Shaburova et al. | |
| 2021/0174034 A1 | 6/2021 | Retek et al. | |
| 2021/0227016 A1 | 7/2021 | Pavlovskaia et al. | |
| 2021/0241529 A1 | 8/2021 | Cowburn et al. | |
| 2021/0273903 A1 | 9/2021 | Allen et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0342473 A1 | 11/2021 | Murphy et al. | |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2022/0121332 A1 | 4/2022 | Allen et al. | |
| 2022/0130425 A1 | 4/2022 | Sehn | |
| 2022/0141552 A1 | 5/2022 | Tang | |
| 2022/0188539 A1 | 6/2022 | Chan et al. | |
| 2022/0206588 A1 | 6/2022 | Canberk et al. | |
| 2022/0300730 A1 | 9/2022 | Eirinberg et al. | |
| 2022/0300731 A1 | 9/2022 | Eirinberg et al. | |
| 2022/0326781 A1 | 10/2022 | Hwang et al. | |
| 2022/0334649 A1 | 10/2022 | Hwang et al. | |
| 2023/0171261 A1 | 6/2023 | Allen et al. | |

FOREIGN PATENT DOCUMENTS

| | | |
|---|---|---|
| CA | 2910158 C | 6/2019 |
| CA | 3027981 | 3/2023 |
| CN | 1879071 A | 12/2006 |
| CN | 101635763 A | 1/2010 |
| CN | 101981987 A | 2/2011 |
| CN | 102118419 A | 7/2011 |
| CN | 102236848 A | 11/2011 |
| CN | 102238107 A | 11/2011 |
| CN | 102572575 A | 7/2012 |
| CN | 102930107 A | 2/2013 |
| CN | 102945276 A | 2/2013 |
| CN | 103020303 A | 4/2013 |
| CN | 103095768 A | 5/2013 |
| CN | 103200238 A | 7/2013 |
| CN | 103248761 A | 8/2013 |
| CN | 103297936 A | 9/2013 |
| CN | 103391368 A | 11/2013 |
| CN | 103699662 A | 4/2014 |
| CN | 104951479 A | 9/2015 |
| CN | 105760466 A | 7/2016 |
| CN | 103049761 B | 8/2016 |
| CN | 106663264 A | 5/2017 |
| CN | 107004225 A | 8/2017 |
| CN | 107111828 A | 8/2017 |
| CN | 107251006 A | 10/2017 |
| CN | 107637099 A | 1/2018 |
| CN | 107710772 A | 2/2018 |
| CN | 106663264 B | 5/2019 |
| CN | 110163663 A | 8/2019 |
| CN | 110249359 A | 9/2019 |
| CN | 110462616 A | 11/2019 |
| CN | 107637099 B | 10/2020 |
| CN | 112040410 A | 12/2020 |
| CN | 107004225 B | 1/2021 |

(56) References Cited

FOREIGN PATENT DOCUMENTS

| | | |
|---|---|---|
| CN | 112669166 A | 4/2021 |
| CN | 107111828 B | 5/2021 |
| CN | 107251006 B | 5/2021 |
| CN | 113111026 A | 7/2021 |
| CN | 113112306 A | 7/2021 |
| DE | 202015009885 U1 | 1/2021 |
| EP | 2051480 A1 | 4/2009 |
| EP | 2151797 A1 | 2/2010 |
| EP | 2916241 A1 | 9/2015 |
| EP | 3234794 B1 | 5/2020 |
| EP | 3707693 A1 | 9/2020 |
| EP | 3272078 B1 | 1/2022 |
| GB | 2399928 A | 9/2004 |
| JP | 2012104106 A | 5/2012 |
| KR | 19990073076 A | 10/1999 |
| KR | 20010078417 A | 8/2001 |
| KR | 20050001466 A | 1/2005 |
| KR | 20060008469 A | 1/2006 |
| KR | 20060043137 A | 5/2006 |
| KR | 1020060038872 A | 5/2006 |
| KR | 20060102677 A | 9/2006 |
| KR | 20070121728 A | 12/2007 |
| KR | 1020080006729 A | 1/2008 |
| KR | 20080017854 A | 2/2008 |
| KR | 1020080017854 A | 2/2008 |
| KR | 20080028962 A | 4/2008 |
| KR | 20100006371 A | 1/2010 |
| KR | 20110094208 A | 8/2011 |
| KR | 20120097478 A | 9/2012 |
| KR | 20120121452 A | 11/2012 |
| KR | 20120125381 A | 11/2012 |
| KR | 20120140404 A | 12/2012 |
| KR | 1020120140404 A | 12/2012 |
| KR | 20130061724 A | 6/2013 |
| KR | 20130095769 A | 8/2013 |
| KR | 20140066278 A | 6/2014 |
| KR | 1020140066795 A | 6/2014 |
| KR | 1020140115413 A | 10/2014 |
| KR | 10-1822920 | 1/2018 |
| KR | 101869473 | 6/2018 |
| KR | 101933840 B1 | 12/2018 |
| KR | 101983523 B1 | 5/2019 |
| KR | 102017508 B1 | 8/2019 |
| KR | 102021727 B1 | 9/2019 |
| KR | 102035405 B1 | 10/2019 |
| KR | 102051788 B1 | 12/2019 |
| KR | 102057592 B1 | 12/2019 |
| KR | 102077441 B1 | 2/2020 |
| KR | 102094065 B1 | 3/2020 |
| KR | 20177014135 A | 3/2020 |
| KR | 102111446 B1 | 5/2020 |
| KR | 102163528 B1 | 9/2020 |
| KR | 102173536 B1 | 10/2020 |
| KR | 102207784 B1 | 1/2021 |
| KR | 102217723 B1 | 2/2021 |
| KR | 102222325 B1 | 3/2021 |
| KR | 102264613 B1 | 6/2021 |
| KR | 10227074381 | 6/2021 |
| KR | 10228779881 | 8/2021 |
| KR | 102301618 B1 | 9/2021 |
| KR | 10-2444777 B1 | 9/2022 |
| KR | 20220158824 A | 12/2022 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2012000107 A1 | 1/2012 |
| WO | WO-2013006584 A1 | 1/2013 |
| WO | WO-2013008238 A1 | 1/2013 |
| WO | WO-2013008251 A2 | 1/2013 |
| WO | WO-2013045753 A1 | 4/2013 |
| WO | WO-2013058897 A1 | 4/2013 |
| WO | WO-2013126784 A2 | 8/2013 |
| WO | WO-2014006129 A1 | 1/2014 |
| WO | WO-2014031562 A1 | 2/2014 |
| WO | WO-2014031899 A1 | 2/2014 |
| WO | WO-2014068573 A1 | 5/2014 |
| WO | WO-2014093668 A1 | 6/2014 |
| WO | WO-2014115136 A1 | 7/2014 |
| WO | WO-2014172388 A1 | 10/2014 |
| WO | WO-2014194262 A2 | 12/2014 |
| WO | WO-2015192026 A1 | 12/2015 |
| WO | WO-2016007285 A1 | 1/2016 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016/112299 A1 | 7/2016 |
| WO | WO-2016123381 A1 | 8/2016 |
| WO | WO-2016149594 A1 | 9/2016 |
| WO | WO-2016168591 A1 | 10/2016 |
| WO | WO-2016179166 A1 | 11/2016 |
| WO | WO-2016179235 A1 | 11/2016 |
| WO | WO-2016202890 A1 | 12/2016 |
| WO | WO-2017106529 A1 | 6/2017 |
| WO | WO-2017176739 A1 | 10/2017 |
| WO | WO-2017176992 A1 | 10/2017 |
| WO | WO-2018005644 A1 | 1/2018 |
| WO | WO-2018144931 A1 | 8/2018 |
| WO | WO-2018183119 A1 | 10/2018 |
| WO | WO-2019094618 A1 | 5/2019 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |

OTHER PUBLICATIONS

US 10,425,370 B2, 09/2019, Allen et al. (withdrawn)
US 10,484,394 B2, 11/2019, Allen et al. (withdrawn)
US 10,503,924 B1, 12/2019, Murphy et al. (withdrawn)
US 10,542,011 B2, 01/2020, Allen et al. (withdrawn)
U.S. Appl. No. 14/612,692, U.S. Pat. No. 10,133,705, filed Feb. 3, 2015, Multichannel System.
U.S. Appl. No. 15/152,975, U.S. Pat. No. 10,416,845, filed May 12, 2016, Multichannel System.
U.S. Appl. No. 16/529,461, U.S. Pat. No. 11,249,617, filed Aug. 1, 2019, Multichannel System.
U.S. Appl. No. 17/567,397, filed Jan. 3, 2022, Multichannel System.
U.S. Appl. No. 15/074,029, U.S. Pat. No. 10,616,239, filed Mar. 18, 2016, Geo-Fence Authorization Provisioning.
U.S. Appl. No. 16/541,919, U.S. Pat. No. 10,893,055, filed Aug. 15, 2019, Geo-Fence Authorization Provisioning.
U.S. Appl. No. 17/035,575, filed Sep. 28, 2020, Geo-Fence Authorization Provisioning.
U.S. Appl. No. 15/702,511, U.S. Pat. No. 10,476,830, filed Sep. 12, 2017, Ephemeral Gallery of Ephemeral Messages.
U.S. Appl. No. 15/947,350, filed Apr. 6, 2018, Automated Chronological Display of Ephemeral Message Gallery.
U.S. Appl. No. 16/933,205, filed July 20, 2020, Ephemeral Message Collection UI Indicia.
U.S. Appl. No. 16/933,366, filed Jul. 20, 2020, Automated Management of Ephemeral Message Collections.
U.S. Appl. No. 16/933,279, filed July 20, 2020, Display Duration Assignment for Ephemeral Messages.
U.S. Appl. No. 14/505,478, U.S. Pat. No. 9,537,811, filed Oct. 2, 2014, Ephemeral Gallery of Ephemeral Messages.

(56) References Cited

OTHER PUBLICATIONS

U.S. Appl. No. 15/224,312, filed Jul. 29, 2016, Gallery of Ephemeral Messages.
U.S. Appl. No. 15/224,343, U.S. Pat. No. 10,958,608, filed Jul. 29, 2016, Ephemeral Gallery of Visual Media Messages.
U.S. Appl. No. 15/224,355, filed Jul. 29, 2016, Ephemeral Gallery Elimination Based on Gallery and Message Timers.
U.S. Appl. No. 15/224,359, U.S. Pat. No. 10,944,710, filed Jul. 29, 2016, Ephemeral Gallery User Interface With Remaining Gallery Time Indication.
U.S. Appl. No. 15/224,365, filed Jul. 29, 2016, Gallery User Interface With Last Posted Message Indication (as amended).
U.S. Appl. No. 15/224,372, U.S. Pat. No. 11,012,398, filed Jul. 29, 2016, Ephemeral Message Gallery User Interface With Screenshot Messages.
U.S. Appl. No. 15/224,377, filed Jul. 29, 2016, Ephemeral Message Gallery User Interface With Online Viewing History Indicia.
U.S. Appl. No. 15/224,383, U.S. Pat. No. 10,708,210, filed Jul. 29, 2016, Multi-User Ephemeral Message Gallery.
U.S. Appl. No. 14/578,271, U.S. Pat. No. 9,854,219, filed Dec. 19, 2014, Gallery of Videos Set to an Audio Time Line.
U.S. Appl. No. 14/967,472, U.S. Pat. No. 10,311,916, filed Dec. 14, 2015, Gallery of Videos Set to an Audio Time Line.
U.S. Appl. No. 16/376,598, U.S. Pat. No. 10,580,458, filed Apr. 5, 2019, Gallery of Videos Set to an Audio Time Line.
U.S. Appl. No. 16/703,526, U.S. Pat. No. 10,811,053, filed Dec. 4, 2019, Routing Messages by Message Parameter.
U.S. Appl. No. 17/023,175, U.S. Pat. No. 11,250,887, filed Sep. 16, 2020, Routing Messages by Message Parameter.
U.S. Appl. No. 17/647,511, filed Jan. 10, 2022, Routing Messages by Message Parameter.
U.S. Appl. No. 14/634,417, U.S. Pat. No. 10,284,508, filed Feb. 27, 2015, Ephemeral Gallery of Ephemeral Messages With Opt-In Permanence.
U.S. Appl. No. 16/000,657, U.S. Pat. No. 11,038,829, filed Jun. 5, 2018, Ephemeral Gallery of Ephemeral Messages With Opt-In Permanence.
U.S. Appl. No. 17/323,702, filed May 18, 2021, Ephemeral Gallery of Ephemeral Messages With Opt-In Permanence.
U.S. Appl. No. 14/304,855, U.S. Pat. No. 9,113,301, filed Jun. 13, 2014, Geo-Location Based Event Gallery.
U.S. Appl. No. 14/738,069, U.S. Pat. No. 9,532,171, filed Jun. 12, 2015, Geo-Location Based Event Gallery.
U.S. Appl. No. 15/298,806, U.S. Pat. No. 10,200,813, filed Oct. 20, 2016, Geo-Location Based Event Gallery.
U.S. Appl. No. 15/946,990, U.S. Pat. No. 10,524,087, filed Apr. 6, 2018, Message Destination List Mechanism (as amended).
U.S. Appl. No. 16/219,577, U.S. Pat. No. 10,659,914, filed Dec. 13, 2018, Geo-Location Based Event Gallery.
U.S. Appl. No. 16/841,817, U.S. Pat. No. 11,317,240, filed Apr. 7, 2020, Geo-Location Based Event Gallery.
U.S. Appl. No. 14/578,258, U.S. Pat. No. 9,385,983, filed Dec. 19, 2014, Gallery of Messages From Individuals With a Shared Interest.
U.S. Appl. No. 15/137,608, U.S. Pat. No. 10,514,876, filed Apr. 25, 2016, Gallery of Messages From Individuals With a Shared Interest.
U.S. Appl. No. 16/662,956, filed Oct. 24, 2019, Gallery of Messages From Individuals With a Shared Interest.
U.S. Appl. No. 14/523,728, U.S. Pat. No. 9,094,137, filed Oct. 24, 2014, Priority Based Placement of Messages in a Geo-Location Based Event Gallery.
U.S. Appl. No. 14/808,283, U.S. Pat. No. 9,430,783, filed Jul. 24, 2015, Prioritization of Messages Within Gallery.
U.S. Appl. No. 15/208,460, U.S. Pat. No. 9,693,191, filed Jul. 12, 2016, Prioritization of Messages Within Gallery.
U.S. Appl. No. 15/416,846, U.S. Pat. No. 9,825,898, filed Jan. 26, 2017, Prioritization of Messages Within a Message Collection.
U.S. Appl. No. 15/787,467, U.S. Pat. No. 10,182,311, filed Oct. 18, 2017, Prioritization of Messages Within a Message Collection.
U.S. Appl. No. 16/204,886, U.S. Pat. No. 10,448,201, filed Nov. 29, 2018, Prioritization of Messages Within a Message Collection.
U.S. Appl. No. 16/511,834, U.S. Pat. No. 10,623,891, filed Jul. 15, 2019, Prioritization of Messages Within a Message Collection.
U.S. Appl. No. 16/709,092, U.S. Pat. No. 10,779,113, filed Dec. 10, 2019, Prioritization of Messages Within a Message Collection.
U.S. Appl. No. 16/911,854, U.S. Pat. No. 11,166,121, filed Jun. 25, 2020, Prioritization of Messages Within a Message Collection.
U.S. Appl. No. 14/723,400, U.S. Pat. No. 9,396,354, filed May 27, 2015, Apparatus and Method for Automated Privacy Protection in Distributed Images.
U.S. Appl. No. 15/212,095, U.S. Pat. No. 9,785,796, filed Jul. 15, 2016, Apparatus and Method for Automated Privacy Protection in Distributed Images.
U.S. Appl. No. 15/729,582, U.S. Pat. No. 10,572,681, filed Oct. 10, 2017, Apparatus and Method for Automated Privacy Protection in Distributed Images.
U.S. Appl. No. 16/667,814, U.S. Pat. No. 10,990,697, filed Oct. 29, 2019, Apparatus and Method for Automated Privacy Protection in Distributed Images.
U.S. Appl. No. 17/234,012, filed April 19, 2021, Apparatus and Method for Automated Privacy Protection in Distributed Images.
"U.S. Appl. No. 14/494,226, Appeal Decision mailed Feb. 26, 2021", 8 pgs.
"U.S. Appl. No. 14/494,226, Corrected Notice of Allowability dated Sep. 28, 2021", 2 pgs.
"U.S. Appl. No. 14/494,226, Corrected Notice of Allowability dated Dec. 6, 2021", 2 pgs.
"U.S. Appl. No. 14/494,226, Notice of Allowance dated Jun. 9, 2021", 7 pgs.
"U.S. Appl. No. 14/494,226, Notice of Allowance dated Aug. 25, 2021", 5 pgs.
"U.S. Appl. No. 14/548,590, Appeal Decision mailed Mar. 26, 2020", 13 pgs.
"U.S. Appl. No. 14/548,590, Notice of Allowance dated Jun. 17, 2020", 9 pgs.
"U.S. Appl. No. 15/224,312, Examiner's Answer to Appeal Brief mailed May 27, 2022", 12 pgs.
"U.S. Appl. No. 15/224,355, Corrected Notice of Allowance dated Jun. 27, 2022", 3 pgs.
"U.S. Appl. No. 15/224,355, Notice of Allowance dated Jun. 15, 2022", 9 pgs.
"U.S. Appl. No. 15/224,377, Corrected Notice of Allowability dated May 17, 2022", 2 pgs.
"U.S. Appl. No. 15/424,184, Advisory Action dated May 26, 2020", 6 pgs.
"U.S. Appl. No. 15/424,184, Advisory Action dated Aug. 25, 2020", 5 pgs.
"U.S. Appl. No. 15/424,184, Final Office Action dated Mar. 9, 2020", 19 pgs.
"U.S. Appl. No. 15/424,184, Final Office Action dated Jul. 27, 2020", 18 pgs.
"U.S. Appl. No. 15/424,184, Final Office Action dated Sep. 9, 2019", 13 pgs.
"U.S. Appl. No. 15/424,184, Non Final Office Action dated Jun. 29, 2020", 19 pgs.
"U.S. Appl. No. 15/424,184, Non Final Office Action dated Dec. 2, 2019", 16 pgs.
"U.S. Appl. No. 15/424,184, Notice of Allowance dated Sep. 25, 2020", 10 pgs.
"U.S. Appl. No. 15/424,184, Response filed Mar. 2, 2020 to Non Final Office Action dated Dec. 2, 2019", 11 pgs.
"U.S. Appl. No. 15/424,184, Response filed May 11, 2020 to Final Office Action dated Mar. 9, 2020", 14 pgs.
"U.S. Appl. No. 15/424,184, Response filed Jul. 13, 2020 to Non Final Office Action dated May 5, 2020", 11 pgs.
"U.S. Appl. No. 15/424,184, Response filed Aug. 5, 2020 to Final Office Action dated Jul. 27, 2020", 12 pgs.
"U.S. Appl. No. 15/424,184, Response filed Aug. 21, 2019 to Non Final Office Action dated May 21, 2019", 12 pgs.
"U.S. Appl. No. 15/424,184, Response filed Sep. 1, 2020 to Advisory Action dated Aug. 25, 2020", 9 pgs.
"U.S. Appl. No. 15/424,184, Response filed Nov. 11, 2019 to Final Office Action dated Sep. 9, 2019", 12 pgs.

(56) References Cited

OTHER PUBLICATIONS

"U.S. Appl. No. 15/474,821, Advisory Action dated Dec. 19, 2019", 3 pgs.
"U.S. Appl. No. 15/474,821, Final Office Action dated Sep. 3, 2019", 19 pgs.
"U.S. Appl. No. 15/474,821, Notice of Non-Compliant Amendment dated Sep. 8, 2020", 6 pgs.
"U.S. Appl. No. 15/474,821, Response filed on Dec. 2, 2019 to Final Office Action dated Sep. 3, 2019", 10 pgs.
"U.S. Appl. No. 15/673,137, Corrected Notice of Allowability dated Apr. 7, 2021", 2 pgs.
"U.S. Appl. No. 15/673,137, Final Office Action dated Jan. 27, 2020", 11 pgs.
"U.S. Appl. No. 15/673,137, Non Final Office Action dated May 12, 2020", 14 pgs.
"U.S. Appl. No. 15/673,137, Notice of Allowance dated Dec. 7, 2020", 8 pgs.
"U.S. Appl. No. 15/673,137, Response filed Apr. 6, 2020 to Final Office Action dated Jan. 27, 2020", 14 pgs.
"U.S. Appl. No. 15/673,137, Response filed Jul. 8, 2020 to Non Final Office Action dated May 12, 2020", 15 pgs.
"U.S. Appl. No. 15/729,582, Corrected Notice of Allowability dated Dec. 18, 2019", 3 pgs.
"U.S. Appl. No. 15/837,935, Notice of Allowance dated Nov. 25, 2019", 18 pgs.
"U.S. Appl. No. 16/155,782, Corrected Notice of Allowability dated Jan. 6, 2021", 2 pgs.
"U.S. Appl. No. 16/155,782, Final Office Action dated Jan. 3, 2020", 14 pgs.
"U.S. Appl. No. 16/155,782, Non Final Office Action dated May 14, 2020", 14 pgs.
"U.S. Appl. No. 16/155,782, Notice of Allowance dated Sep. 21, 2020", 5 pgs.
"U.S. Appl. No. 16/155,782, Response filed Apr. 3, 2020 to Final Office Action dated Jan. 3, 2020", 10 pgs.
"U.S. Appl. No. 16/155,782, Response filed Aug. 14, 2020 to Non Final Office Action dated May 14, 2020", 9 pgs.
"U.S. Appl. No. 16/212,313, Final Office Action dated Feb. 10, 2022", 22 pgs.
"U.S. Appl. No. 16/212,313, Final Office Action dated May 27, 2021", 19 pgs.
"U.S. Appl. No. 16/212,313, Final Office Action dated Jun. 22, 2020", 20 pgs.
"U.S. Appl. No. 16/212,313, Final Office Action dated Sep. 3, 2021", 22 pgs.
"U.S. Appl. No. 16/212,313, Non Final Office Action dated Feb. 4, 2020", 20 pgs.
"U.S. Appl. No. 16/212,313, Non Final Office Action dated Dec. 8, 2020", 18 pgs.
"U.S. Appl. No. 16/212,313, Response filed Feb. 3, 2022 to Final Office Action dated Sep. 3, 2021", 14 pgs.
"U.S. Appl. No. 16/212,313, Response filed May 4, 2020 to Non Final Office Action dated Feb. 4, 2020", 12 pgs.
"U.S. Appl. No. 16/212,313, Response filed May 10, 2021 to Non Final Office Action dated Dec. 8, 2020", 9 pgs.
"U.S. Appl. No. 16/212,313, Response filed Aug. 27, 2021 to Final Office Action dated May 27, 2021", 13 pgs.
"U.S. Appl. No. 16/212,313, Response filed Dec. 2, 2019 to Non Final Office Action dated Aug. 30, 2019", 11 pgs.
"U.S. Appl. No. 16/219,577, Notice of Allowance dated Jan. 15, 2020", 7 pgs.
"U.S. Appl. No. 16/428,210, Advisory Action dated Sep. 9, 2020", 3 pgs.
"U.S. Appl. No. 16/428,210, Examiner Interview Summary dated Aug. 28, 2020", 3 pgs.
"U.S. Appl. No. 16/428,210, Final Office Action dated Jun. 29, 2020", 16 pgs.
"U.S. Appl. No. 16/428,210, Non Final Office Action dated Apr. 6, 2020", 16 pgs.
"U.S. Appl. No. 16/428,210, Response filed Jun. 3, 2020 to Non Final Office Action dated Apr. 6, 2020", 10 pgs.
"U.S. Appl. No. 16/428,210, Response filed Aug. 27, 2020 to Final Office Action dated Jun. 29, 2020", 12 pgs.
"U.S. Appl. No. 16/662,956, Supplemental Notice of Allowability dated May 31, 2022", 5 pgs.
"U.S. Appl. No. 16/704,601, Non Final Office Action dated Sep. 10, 2021", 9 pgs.
"U.S. Appl. No. 16/704,601, Notice of Allowance dated Nov. 23, 2021", 10 pgs.
"U.S. Appl. No. 16/704,601, Response filed Nov. 3, 2021 to Non Final Office Action dated Sep. 10, 2021", 11 pgs.
"U.S. Appl. No. 16/704,714, Corrected Notice of Allowability dated Apr. 28, 2022", 2 pgs.
"U.S. Appl. No. 16/704,714, Non Final Office Action dated Oct. 7, 2021", 11 pgs.
"U.S. Appl. No. 16/704,714, Notice of Allowance dated Jan. 26, 2022", 5 pgs.
"U.S. Appl. No. 16/704,714, Response filed Jan. 4, 2022 to Non Final Office Action dated Oct. 7, 2021", 11 pgs.
"U.S. Appl. No. 16/808,101, Preliminary Amendment filed Mar. 10, 2020", 8 pgs.
"U.S. Appl. No. 16/933,366, Non Final Office Action dated Jul. 25, 2022", 19 pgs.
"U.S. Appl. No. 16/943,706, Non Final Office Action dated Sep. 8, 2020", 16 pgs.
"U.S. Appl. No. 16/943,804, Non Final Office Action dated Sep. 8, 2020", 14 pgs.
"U.S. Appl. No. 17/035,575, Non Final Office Action dated May 26, 2022", 31 pgs.
"U.S. Appl. No. 17/035,575, Response filed Aug. 25, 2022 to Non Final Office Action dated May 26, 2022", 12 pgs.
"U.S. Appl. No. 17/135,422, Final Office Action dated Mar. 2, 2022", 19 pgs.
"U.S. Appl. No. 17/135,422, Non Final Office Action dated Aug. 19, 2021", 11 pgs.
"U.S. Appl. No. 17/135,422, Response filed Nov. 19, 2021 to Non Final Office Action dated Aug. 19, 2021", 9 pgs.
"U.S. Appl. No. 17/248,956, Non Final Office Action dated Nov. 26, 2021", 10 pgs.
"U.S. Appl. No. 17/248,956, Response filed Feb. 3, 2022 to Non Final Office Action dated Nov. 26, 2021", 11 pgs.
"U.S. Appl. No. 17/567,397, Non Final Office Action dated Aug. 22, 2022", 32 pgs.
"U.S. Appl. No. 17/683,725, Non Final Office Action dated Aug. 26, 2022", 19 pgs.
"Canadian Application Serial No. 2,962,822, Office Action dated Feb. 18, 2021", 6 pgs.
"Canadian Application Serial No. 2,962,822, Office Action dated Jul. 20, 2020", 5 pgs.
"Canadian Application Serial No. 2,962,822, Office Action dated Jul. 22, 2021", 4 pgs.
"Canadian Application Serial No. 2,962,822, Office Action dated Dec. 23, 2021", 4 pgs.
"Canadian Application Serial No. 2,962,822, Response filed Jan. 14, 2021 to Office Action dated Jul. 20, 2020", 3 pgs.
"Canadian Application Serial No. 2,962,822, Response filed Jun. 16, 2021 to Office Action dated Feb. 18, 2021", 11 pgs.
"Canadian Application Serial No. 2,962,822, Response Filed Apr. 22, 2022 to Office Action dated Dec. 23, 2021", 6 pgs.
"Canadian Application Serial No. 3,027,981, Response filed May 16, 2022 to Office Action dated Jan. 28, 2022", 18 pgs.
"Chinese Application Serial No. 201580065266.7, Office Action dated Mar. 19, 2020", w/ English translation, 15 pgs.
"Chinese Application Serial No. 201580065266.7, Response filed Jul. 17, 2020 Office Action dated Mar. 19, 2020", w/ English Claims, 11 pgs.
"Chinese Application Serial No. 201580070593.1, Office Action dated Apr. 8, 2020", w/ English Translation, 11 pgs.
"Chinese Application Serial No. 201580070593.1, Office Action dated Oct. 23, 2020", w/ English Translation, 9 pgs.

(56) References Cited

OTHER PUBLICATIONS

"Chinese Application Serial No. 2015800/0593.1, Response filed Aug. 13, 2020 to Office Action dated Apr. 8, 2020", w/ English Claims, 18 pgs.
"Chinese Application Serial No. 201580070593.1, Response filed Dec. 29, 2020 to Office Action dated Oct. 23, 2020", 11 pgs.
"Chinese Application Serial No. 201680027177.8, Office Action dated Oct. 28, 2019", w/ English Translation, 15 pgs.
"Chinese Application Serial No. 201680027177.8, Response filed Mar. 5, 2020 to Office Action dated Oct. 28, 2019", w/ English Claims, 11 pgs.
"Chinese Application Serial No. 201680035076.5, Decision of Rejection dated Jun. 2, 2021", w/ English translation, 25 pgs.
"Chinese Application Serial No. 201680035076.5, Notice of Reexamination dated Feb. 28, 2022", w/ English translation, 9 pgs.
"Chinese Application Serial No. 201680035076.5, Notice of Reexamination dated Apr. 29, 2022", w/ English Translation, 8 pgs.
"Chinese Application Serial No. 201680035076.5, Office Action dated May 27, 2020", w/ English Translation, 28 pgs.
"Chinese Application Serial No. 201680035076.5, Office Action dated Sep. 4, 2019", w/ English Translation, 16 pgs.
"Chinese Application Serial No. 201680035076.5, Office Action dated Nov. 18, 2020", w/ English translation, 29 pgs.
"Chinese Application Serial No. 201680035076.5, Response filed Jan. 12, 2021 to Office Action dated Nov. 18, 2020", w/ English Claims, 18 pgs.
"Chinese Application Serial No. 201680035076.5, Response filed Jul. 9, 2020 to Office Action dated May 27, 2020", w/ English Claims, 18 pgs.
"Chinese Application Serial No. 201680035076.5, Response filed Dec. 26, 2019 to Office Action dated Sep. 4, 2019", w/ English Claims, 15 pgs.
"Chinese Application Serial No. 202010978249.5, Office Action dated Mar. 11, 2022", w/ English translation, 8 pgs.
"European Application Serial No. 15733026.7, Decision to Refuse a European Patent Application dated Nov. 18, 2019", 20 pgs.
"European Application Serial No. 15782165.3, Decision to Refuse a European Patent Application dated Mar. 19, 2020", 23 pgs.
"European Application Serial No. 15782165.3, Response filed Jan. 10, 2020 to Summons to Attend Oral Proceedings mailed Sep. 18, 2019", 18 pgs.
"European Application Serial No. 15787854.7, Communication Pursuant to Article 94(3) EPC dated Feb. 12, 2020", 7 pgs.
"European Application Serial No. 16716090.2, Communication Pursuant to Article 94(3) EPC dated Jan. 15, 2020", 6 pgs.
"European Application Serial No. 16716090.2, Response filed Apr. 15, 2020 to Communication Pursuant to Article 94(3) EPC dated Jan. 15, 2020", 10 pgs.
"European Application Serial No. 16829020.3, Communication Pursuant to Article 94(3) EPC dated Sep. 9, 2020", 3 pgs.
"European Application Serial No. 18747246.9, Communication Pursuant to Article 94(3) EPC dated Jun. 25, 2020", 10 pgs.
"European Application Serial No. 18747246.9, Extended European Search Report dated Nov. 7, 2019", 7 pgs.
"European Application Serial No. 18747246.9, Response Filed Jun. 3, 2020 to Extended European Search Report dated Nov. 7, 2019", 15 pgs.
"European Application Serial No. 20215107.2, Extended European Search Report dated Apr. 6, 2021", 9 pgs.
"European Application Serial No. 21195813.7, Extended European Search Report dated Dec. 20, 2021", 8 pgs.
"International Application Serial No. PCT/US2018/016723, International Preliminary Report on Patentability dated Aug. 15, 2019", 19 pgs.
"Korean Application Serial No. 10-2017-7012120, Notice of Preliminary Rejection dated Jun. 17, 2020", w/ English Translation, 8 pgs.
"Korean Application Serial No. 10-2017-7012120, Notice of Preliminary Rejection dated Dec. 8, 2020", w/ English Translation, 5 pgs.
"Korean Application Serial No. 10-2017-7012120, Response filed Feb. 8, 2021 to Notice of Preliminary Rejection dated Dec. 8, 2020", w/ English Claims, 18 pgs.
"Korean Application Serial No. 10-2017-7012120, Response filed Sep. 3, 2020 to Notice of Preliminary Rejection dated Jun. 17, 2020", w/ English Claims, 22 pgs.
"Korean Application Serial No. 10-2018-7037070, Notice of Final Rejection dated Nov. 25, 2019", w/ English Translation, 5 pgs.
"Korean Application Serial No. 10-2018-7037070, Response filed Oct. 23, 2019 to Notice of Final Rejection dated Sep. 30, 2019", w/ English Claims, 16 pgs.
"Korean Application Serial No. 10-2019-7030235, Final Office Action dated May 20, 2020", w/ English Translation, 5 pgs.
"Korean Application Serial No. 10-2019-7030235, Notice of Preliminary Rejection dated Nov. 28, 2019", w/ English Translation, 10 pgs.
"Korean Application Serial No. 10-2019-7030235, Response filed Jan. 28, 2020 to Notice of Preliminary Rejection dated Nov. 28, 2019", w/ English Claims, 12 pgs.
"Korean Application Serial No. 10-2019-7030235, Response filed Jun. 22, 2020 to Final Office Action dated May 20, 2020", w/ English Claims, 16 pgs.
"Korean Application Serial No. 10-2019-7031595, Notice of Preliminary Rejection dated Mar. 10, 2021", w/ English Translation, 9 pgs.
"Korean Application Serial No. 10-2019-7031595, Notice of Preliminary Rejection dated Sep. 1, 2020", w/ English translation, 11 pgs.
"Korean Application Serial No. 10-2019-7031595, Response filed May 7, 2021 to Notice of Preliminary Rejection dated Mar. 10, 2021", w/ English Claims, 15 pgs.
"Korean Application Serial No. 10-2019-7031595, Response filed Nov. 2, 2020 to Notice of Preliminary Rejection dated Sep. 1, 2020", w/ English Claims, 34 pgs.
"Korean Application Serial No. 10-2019-7038483, Notice of Preliminary Rejection dated Jan. 31, 2020", w/ English translation, 4 pgs.
"Korean Application Serial No. 10-2019-7038483, Response filed Mar. 10, 2020 to Notice of Preliminary Rejection dated Jan. 31, 2020", w/ English Claims, 19 pgs.
"Korean Application Serial No. 10-2020-7008140, Notice of Preliminary Rejection dated Jun. 16, 2020", w/ English Translation, 7 pgs.
"Korean Application Serial No. 10-2020-7008140, Office Action dated Dec. 30, 2020", w/ English Translation, 7 pgs.
"Korean Application Serial No. 10-2020-7008140, Response filed Jan. 28, 2021 to Office Action dated Dec. 30, 2020", w/ English Claims, 16 pgs.
"Korean Application Serial No. 10-2020-7008140, Response filed Aug. 14, 2020 to Notice of Preliminary Rejection dated Jun. 16, 2020", w/ English Claims, 21 pgs.
"Korean Application Serial No. 10-2020-7024025, Notice of Preliminary Rejection dated Sep. 1, 2020", w/ English Translation, 4 pgs.
"Korean Application Serial No. 10-2020-7024025, Response filed Nov. 2, 2020 to Notice of Preliminary Rejection dated Sep. 1, 2020", w/ English Claims, 12 pgs.
"Korean Application Serial No. 10-2021-7001942, Final Office Action dated Apr. 28, 2022", W/English Translation, 5 pgs.
"Korean Application Serial No. 10-2021-7001942, Notice of Preliminary Rejection dated Apr. 20, 2021", w/ English translation, 11 pgs.
"Korean Application Serial No. 10-2021-7001942, Notice of Preliminary Rejection dated Oct. 28, 2021", w/ English Translation, 11 pgs.
"Korean Application Serial No. 10-2021-7001942, Response filed Jun. 15, 2021 to Notice of Preliminary Rejection dated Apr. 20, 2021", w/ English Claims, 22 pgs.
"Korean Application Serial No. 10-2021-7004376, Notice of Preliminary Rejection dated May 31, 2021", w/ English translation, 9 pgs.

(56) References Cited

OTHER PUBLICATIONS

"Korean Application Serial No. 10-2021-7004376, Response filed Aug. 12, 2021 to Notice of Preliminary Rejection dated May 31, 2021", w/ English Translation, 47 pgs.
"Korean Application Serial No. 10-2021-7013085, Notice of Preliminary Rejection dated Jul. 30, 2021", w/ English translation, 8 pgs.
"Korean Application Serial No. 10-2021-7013085, Response filed Sep. 30, 2021 to Notice of Preliminary Rejection dated Jul. 30, 2021", w/ English Claims, 17 pgs.
"Korean Application Serial No. 10-2021-7019496, Notice of Preliminary Rejection dated Jul. 4, 2021", w/ English translation, 10 pgs.
"Korean Application Serial No. 10-2021-7019496, Response filed Sep. 3, 2021 to Notice of Preliminary Rejection dated Jul. 4, 2021", w/ English Claims, 16 pgs.
"Korean Application Serial No. 10-2021-7024579, Notice of Preliminary Rejection dated Aug. 17, 2021", w/ English Translation, 10 pgs.
"Korean Application Serial No. 10-2021-7024579, Response filed Oct. 5, 2021 to Office Action dated Aug. 17, 2021", w/ English Translation, 15 pgs.
"Korean Application Serial No. 10-2021-7028720, Notice of Preliminary Rejection dated Nov. 12, 2021", w/ English Translation, 10 pgs.
Rossignol, Joe, "How to screenshot Snapchat without sending notification", [Online] Retrieved from the Internet: <URL: https://www.idownloadblog.com/author/joerossignol/>, (May 3, 2014), 16 pgs.
"A Whole New Story", Snap, Inc., [Online] Retrieved from the Internet: <URL: https://www.snap.com/en-US/news/>, (2017), 13 pgs.
"Adding photos to your listing", eBay, [Online] Retrieved from the Internet: <URL: http://pages.ebay.com/help/sell/pictures.html>, (accessed May 24, 2017), 4 pgs.
"Android Getting Started Guide", Voxer Business, [Online] Retrieved from the Internet: <URL: https://voxer.com/assets/AndroidGuide.pdf>, (Feb. 1, 2014), 18 pgs.
"U.S. Appl. No. 14/304,855, Corrected Notice of Allowance dated Jun. 26, 2015", 8 pgs.
"U.S. Appl. No. 14/304,855, Final Office Action dated Feb. 18, 2015", 10 pgs.
"U.S. Appl. No. 14/304,855, Non Final Office Action dated Mar. 18, 2015", 9 pgs.
"U.S. Appl. No. 14/304,855, Non Final Office Action dated Oct. 22, 2014", 11 pgs.
"U.S. Appl. No. 14/304,855, Notice of Allowance dated Jun. 1, 2015", 11 pgs.
"U.S. Appl. No. 14/304,855, Response filed Feb. 25, 2015 to Final Office Action dated Feb. 18, 2015", 5 pgs.
"U.S. Appl. No. 14/304,855, Response filed Apr. 1, 2015 to Non Final Office Action dated Mar. 18, 2015", 4 pgs.
"U.S. Appl. No. 14/304,855, Response filed Nov. 7, 2014 to Non Final Office Action dated Oct. 22, 2014", 5 pgs.
"U.S. Appl. No. 14/494,226, Appeal Brief filed Mar. 1, 2019 in response to Final Office Action dated Jun. 1, 2018", 29 pgs.
"U.S. Appl. No. 14/494,226, Examiner Interview Summary dated Oct. 27, 2016", 3 pgs.
"U.S. Appl. No. 14/494,226, Examiner Interview Summary dated Dec. 20, 2017", 2 pgs.
"U.S. Appl. No. 14/494,226, Final Office Action dated Mar. 7, 2017", 34 pgs.
"U.S. Appl. No. 14/494,226, Final Office Action dated Jun. 1, 2018", 33 pgs.
"U.S. Appl. No. 14/494,226, Non Final Office Action dated Sep. 7, 2017", 36 pgs.
"U.S. Appl. No. 14/494,226, Non Final Office Action dated Sep. 12, 2016", 32 pgs.
"U.S. Appl. No. 14/494,226, Response filed Jan. 8, 2018 to Non Final Office Action dated Sep. 7, 2017", 15 pgs.
"U.S. Appl. No. 14/494,226, Response filed Jul. 7, 2017 to Final Office Action dated Mar. 7, 2017", 13 pgs.
"U.S. Appl. No. 14/494,226, Response filed Dec. 12, 2016 to Non Final Office Action dated Sep. 12, 2016", 16 pgs.
"U.S. Appl. No. 14/505,478, Advisory Action dated Apr. 14, 2015", 3 pgs.
"U.S. Appl. No. 14/505,478, Corrected Notice of Allowance dated May 18, 2016", 2 pgs.
"U.S. Appl. No. 14/505,478, Corrected Notice of Allowance dated Jul. 22, 2016", 2 pgs.
"U.S. Appl. No. 14/505,478, Final Office Action dated Mar. 17, 2015", 16 pgs.
"U.S. Appl. No. 14/505,478, Non Final Office Action dated Jan. 27, 2015", 13 pgs.
"U.S. Appl. No. 14/505,478, Non Final Office Action dated Sep. 4, 2015", 19 pgs.
"U.S. Appl. No. 14/505,478, Notice of Allowance dated Apr. 28, 2016", 11 pgs.
"U.S. Appl. No. 14/505,478, Notice of Allowance dated Aug. 26, 2016", 11 pgs.
"U.S. Appl. No. 14/505,478, Response filed Jan. 30, 2015 to Non Final Office Action dated Jan. 27, 2015", 10 pgs.
"U.S. Appl. No. 14/505,478, Response filed Mar. 4, 2016 to Non Final Office Action dated Sep. 4, 2015", 12 pgs.
"U.S. Appl. No. 14/505,478, Response filed Apr. 1, 2015 to Final Office Action dated Mar. 17, 2015", 6 pgs.
"U.S. Appl. No. 14/506,478, Response filed Aug. 17, 2015 to Advisory Action dated Apr. 14, 2015", 10 pgs.
"U.S. Appl. No. 14/510,016, Advisory Action dated Nov. 30, 2017", 7 pgs.
"U.S. Appl. No. 14/510,016, Final Office Action dated May 22, 2018", 36 pgs.
"U.S. Appl. No. 14/510,016, Final Office Action dated Sep. 7, 2018", 34 pgs.
"U.S. Appl. No. 14/510,016, Final Office Action dated Sep. 8, 2017", 21 pgs.
"U.S. Appl. No. 14/510,016, Non Final Office Action dated Feb. 7, 2018", 36 pgs.
"U.S. Appl. No. 14/510,016, Non Final Office Action dated Apr. 21, 2017", 55 pgs.
"U.S. Appl. No. 14/510,016, Response filed Jan. 8, 2017 to Final Office Action dated Sep. 8, 2017", 22 pgs.
"U.S. Appl. No. 14/510,016, Response Filed May 7, 2018 to Non Final Office Action dated Feb. 7, 2018", 13 pgs.
"U.S. Appl. No. 14/510,016, Response Filed Jul. 21, 2017 to Non Final Office Action dated Apr. 21, 2017", 21 pgs.
"U.S. Appl. No. 14/510,016, Response filed Aug. 23, 2018 to Final Office Action dated May 22, 2018", 16 pgs.
"U.S. Appl. No. 14/510,016, Response filed Nov. 8, 2017 to Final Office Action dated Sep. 8, 2017", 24 pgs.
"U.S. Appl. No. 14/523,728, Non Final Office Action dated Dec. 12, 2014", 10 pgs.
"U.S. Appl. No. 14/523,728, Notice of Allowance dated Mar. 24, 2015", 8 pgs.
"U.S. Appl. No. 14/523,728, Notice of Allowance dated Apr. 15, 2015", 8 pgs.
"U.S. Appl. No. 14/523,728, Notice of Allowance dated Jun. 5, 2015", 8 pgs.
"U.S. Appl. No. 14/523,728, Response filed Aug. 25, 2014 to Non Final Office Action dated Jan. 16, 2015", 5 pgs.
"U.S. Appl. No. 14/529,064, Examiner Interview Summary dated May 23, 2016", 3 pgs.
"U.S. Appl. No. 14/529,064, Examiner Interview Summary dated Nov. 17, 2016", 3 pgs.
"U.S. Appl. No. 14/529,064, Final Office Action dated Jan. 25, 2018", 39 pgs.
"U.S. Appl. No. 14/529,064, Final Office Action dated Aug. 11, 2015", 23 pgs.
"U.S. Appl. No. 14/529,064, Final Office Action dated Aug. 24, 2016", 23 pgs.
"U.S. Appl. No. 14/529,064, Non Final Office Action dated Mar. 12, 2015", 20 pgs.

(56) References Cited

OTHER PUBLICATIONS

"U.S. Appl. No. 14/529,064, Non Final Office Action dated Apr. 6, 2017", 25 pgs.
"U.S. Appl. No. 14/529,064, Non Final Office Action dated Apr. 18, 2016", 21 pgs.
"U.S. Appl. No. 14/529,064, Non Final Office Action dated Jul. 13, 2018", 38 pgs.
"U.S. Appl. No. 14/529,064, Response filed Feb. 5, 2015 to Restriction Requirement dated Feb. 2, 2015", 6 pgs.
"U.S. Appl. No. 14/529,064, Response filed Mar. 26, 2015 to Non Final Office Action dated Mar. 12, 2015", 8 pgs.
"U.S. Appl. No. 14/529,064, Response filed May 25, 2018 to Final Office Action dated Jan. 25, 2018", 20 pgs.
"U.S. Appl. No. 14/529,064, Response filed Jul. 18, 2016 to Non Final Office Action dated Apr. 18, 2016", 20 pgs.
"U.S. Appl. No. 14/529,064, Response filed Sep. 6, 2017 to Non Final Office Action dated Apr. 6, 2017", 24 pgs.
"U.S. Appl. No. 14/529,064, Response filed Sep. 6, 2017 to Non Final Office Action dated Apr. 6, 2017", 19 pgs.
"U.S. Appl. No. 14/529,064, Response filed Oct. 12, 2015 to Final Office Action dated Aug. 11, 2015", 19 pgs.
"U.S. Appl. No. 14/529,064, Response filed Dec. 21, 2016 to Final Office Action dated Aug. 24, 2016", 17 pgs.
"U.S. Appl. No. 14/529,064, Restriction Requirement dated Feb. 2, 2015", 5 pgs.
"U.S. Appl. No. 14/539,391, Notice of Allowance dated Mar. 5, 2015", 17 pgs.
"U.S. Appl. No. 14/548,590, Advisory Action dated Apr. 19, 2018", 2 pgs.
"U.S. Appl. No. 14/548,590, Advisory Action dated Nov. 18, 2016", 3 pgs.
"U.S. Appl. No. 14/548,590, Appeal Brief Filed Apr. 20, 2018", 28 pgs.
"U.S. Appl. No. 14/548,590, Final Office Action dated Jul. 5, 2016", 16 pgs.
"U.S. Appl. No. 14/548,590, Final Office Action dated Jul. 18, 2017", 20 pgs.
"U.S. Appl. No. 14/548,590, Final Office Action dated Sep. 16, 2015", 15 pgs.
"U.S. Appl. No. 14/548,590, Non Final Office Action dated Jan. 9, 2017", 14 pgs.
"U.S. Appl. No. 14/548,590, Non Final Office Action dated Feb. 11, 2016", 16 pgs.
"U.S. Appl. No. 14/548,590, Non Final Office Action dated Apr. 20, 2015", 14 pgs.
"U.S. Appl. No. 14/548,590, Response filed May 9, 2017 to Non Final Office Action dated Jan. 9, 2017", 17 pgs.
"U.S. Appl. No. 14/548,590, Response filed May 10, 2016 to Non Final Office Action dated Feb. 11, 2016", 14 pgs.
"U.S. Appl. No. 14/548,590, Response filed Nov. 7, 2016 to Final Office Action dated Jul. 5, 2016", 14 pgs.
"U.S. Appl. No. 14/548,590, Response filed Dec. 16, 2015 to Final Office Action dated Sep. 16, 2015", 13 pgs.
"U.S. Appl. No. 14/548,590, Response filed Jun. 16, 2015 to Non Final Office Action dated Apr. 20, 2015", 19 pgs.
"U.S. Appl. No. 14/578,258, Examiner Interview Summary dated Nov. 25, 2015", 3 pgs.
"U.S. Appl. No. 14/578,258, Non Final Office Action dated Jun. 10, 2015", 12 pgs.
"U.S. Appl. No. 14/578,258, Notice of Allowance dated Feb. 26, 2016", 5 pgs.
"U.S. Appl. No. 14/578,258, Response filed Dec. 10, 2015 to Non Final Office Action dated Jun. 10, 2015", 11 pgs.
"U.S. Appl. No. 14/578,271, Corrected Notice of Allowance dated Oct. 30, 2017", 2 pgs.
"U.S. Appl. No. 14/578,271, Final Office Action dated Dec. 3, 2015", 15 pgs.
"U.S. Appl. No. 14/578,271, Non Final Office Action dated Aug. 7, 2015", 12 pgs.
"U.S. Appl. No. 14/578,271, Notice of Allowability dated Nov. 29, 2017", 3 pgs.
"U.S. Appl. No. 14/578,271, Notice of Allowance dated Aug. 1, 2017", 5 pgs.
"U.S. Appl. No. 14/578,271, Notice of Allowance dated Dec. 7, 2016", 7 pgs.
"U.S. Appl. No. 14/578,271, Response filed Feb. 9, 2016 to Final Office Action dated Dec. 3, 2015", 10 pgs.
"U.S. Appl. No. 14/578,271, Response filed Jun. 19, 2015 to Restriction Requirement dated Apr. 23, 2015", 6 pgs.
"U.S. Appl. No. 14/578,271, Response filed Oct. 28, 2015 to Non Final Office Action dated Aug. 7, 2015", 9 pgs.
"U.S. Appl. No. 14/578,271, Restriction Requirement dated Apr. 23, 2015", 8 pgs.
"U.S. Appl. No. 14/594,410, Non Final Office Action dated Jan. 4, 2016", 10 pgs.
"U.S. Appl. No. 14/594,410, Notice of Allowance dated Aug. 2, 2016", 5 pgs.
"U.S. Appl. No. 14/594,410, Notice of Allowance dated Dec. 15, 2016", 6 pgs.
"U.S. Appl. No. 14/594,410, Response filed Jul. 1, 2016 to Non Final Office Action dated Jan. 4, 2016", 10 pgs.
"U.S. Appl. No. 14/612,692, Examiner Interview Summary dated Jan. 29, 2016", 5 pgs.
"U.S. Appl. No. 14/612,692, Examiner Interview Summary dated May 14, 2018", 3 pgs.
"U.S. Appl. No. 14/612,692, Examiner Interview Summary dated Jul. 6, 2016", 4 pgs.
"U.S. Appl. No. 14/612,692, Examiner Interview Summary dated Aug. 14, 2015", 3 pgs.
"U.S. Appl. No. 14/612,692, Examiner Interview Summary dated Sep. 8, 2016", 3 pgs.
"U.S. Appl. No. 14/612,692, Examiner Interview Summary dated Nov. 13, 2017", 13 pgs.
"U.S. Appl. No. 14/612,692, Final Office Action dated Aug. 15, 2016", 18 pgs.
"U.S. Appl. No. 14/612,692, Final Office Action dated Aug. 25, 2017", 18 pgs.
"U.S. Appl. No. 14/612,692, Final Office Action dated Nov. 23, 2015", 15 pgs.
"U.S. Appl. No. 14/612,692, Non Final Office Action dated Jan. 3, 2017", 17 pgs.
"U.S. Appl. No. 14/612,692, Non Final Office Action dated Jan. 9, 2018", 19 pgs.
"U.S. Appl. No. 14/612,692, Non Final Office Action dated Mar. 28, 2016", 15 pgs.
"U.S. Appl. No. 14/612,692, Non Final Office Action dated Jul. 20, 2015", 25 pgs.
"U.S. Appl. No. 14/612,692, Notice of Allowance dated Jul. 5, 2018", 11 pgs.
"U.S. Appl. No. 14/612,692, Response filed Feb. 23, 2016 to Final Office Action dated Nov. 23, 2015", 10 pgs.
"U.S. Appl. No. 14/612,692, Response filed May 3, 2017 to Non Final Office Action dated Jan. 3, 2017", 18 pgs.
"U.S. Appl. No. 14/612,692, Response Filed May 9, 2018 to Non Final Office Action dated Jan. 9, 2018", 15 pgs.
"U.S. Appl. No. 14/612,692, Response filed Nov. 14, 2016 to Final Office Action dated Aug. 15, 2016", 15 pgs.
"U.S. Appl. No. 14/612,692, Response Filed Nov. 22, 2017 to Final Office Action dated Aug. 25, 2017", 11 pgs.
"U.S. Appl. No. 14/612,692, Response filed Jun. 28, 2016 to Non Final Office Action dated Mar. 28, 2016", 14 pgs.
"U.S. Appl. No. 14/612,692. Response filed Oct. 19, 2015 to Non Final Office Action dated Jul. 20, 2015", 11 pgs.
"U.S. Appl. No. 14/634,417, Advisory Action dated Mar. 14, 2017", 3 pgs.
"U.S. Appl. No. 14/634,417, Corrected Notice of Allowability dated Mar. 11, 2019", 3 pgs.
"U.S. Appl. No. 14/634,417, Corrected Notice of Allowability dated Mar. 20, 2019", 3 pgs.
"U.S. Appl. No. 14/634,417, Examiner Interview Summary dated Aug. 7, 2017", 3 pgs.

(56) References Cited

OTHER PUBLICATIONS

"U.S. Appl. No. 14/634,417, Final Office Action dated Jan. 31, 2017", 27 pgs.
"U.S. Appl. No. 14/634,417, Non Final Office Action dated Jun. 8, 2017", 17 pgs.
"U.S. Appl. No. 14/634,417, Non Final Office Action dated Aug. 30, 2016", 23 pgs.
"U.S. Appl. No. 14/634,417, Notice of Allowance dated May 22, 2018", 9 pgs.
"U.S. Appl. No. 14/634,417, Notice of Allowance dated Oct. 25, 2017", 9 pgs.
"U.S. Appl. No. 14/634,417, Response filed Mar. 2, 2017 to Final Office Action dated Jan. 31, 2017", 23 pgs.
"U.S. Appl. No. 14/634,417, Response filed Sep. 21, 2017 to Non Final Office Action dated Jun. 8, 2017", 16 pgs.
"U.S. Appl. No. 14/634,417, Response filed Nov. 30, 2016 to Non Final Office Action dated Aug. 30, 2016", 18 pgs.
"U.S. Appl. No. 14/682,259, Notice of Allowance dated Jul. 27, 2015", 17 pgs.
"U.S. Appl. No. 14/704,212, Final Office Action dated Jun. 17, 2016", 12 pgs.
"U.S. Appl. No. 14/704,212, Non Final Office Action dated Mar. 12, 2018", 7 pgs.
"U.S. Appl. No. 14/704,212, Non Final Office Action dated Jun. 16, 2017", 13 pgs.
"U.S. Appl. No. 14/704,212, Non Final Office Action dated Nov. 25, 2016", 13 pgs.
"U.S. Appl. No. 14/704,212, Non Final Office Action dated Dec. 4, 2015", 17 pgs.
"U.S. Appl. No. 14/704,212, Notice of Allowance dated Jul. 2, 2018", 7 pgs.
"U.S. Appl. No. 14/704,212, Response filed Feb. 27, 2017 to Non Final Office Action dated Nov. 25, 2016", 14 pgs.
"U.S. Appl. No. 14/704,212, Response filed Mar. 4, 2016 to Non Final Office Action dated Dec. 4, 2015", 11 pgs.
"U.S. Appl. No. 14/704,212, Response Filed Jun. 12, 2018 to Non Final Office Action dated Mar. 12, 2018", 9 pgs.
"U.S. Appl. No. 14/704,212, Response filed Oct. 17, 2016 to Final Office Action dated Jun. 17, 2016", 12 pgs.
"U.S. Appl. No. 14/723,400, Final Office Action dated Jan. 4, 2016", 14 pgs.
"U.S. Appl. No. 14/723,400, Non Final Office Action dated Jul. 20, 2015", 14 pgs.
"U.S. Appl. No. 14/723,400, Notice of Allowance dated Mar. 28, 2016", 12 pgs.
"U.S. Appl. No. 14/723,400, Notice of Non Compliant Amendment dated Sep. 21, 2015", 2 pgs.
"U.S. Appl. No. 14/723,400, Notice of Non Compliant Amendment dated Nov. 10, 2015", 2 pgs.
"U.S. Appl. No. 14/723,400, Response filed Jan. 29, 2016 to Final Office Action dated Jan. 4, 2016", 8 pgs.
"U.S. Appl. No. 14/723,400, Response filed Aug. 13, 2015 to Non Final Office Action dated Jul. 20, 2015", 7 pgs.
"U.S. Appl. No. 14/723,400, Response filed Sep. 23, 2015 to Notice of Non Compliant Amendment dated Sep. 21, 2015", 5 pgs.
"U.S. Appl. No. 14/723,400, Response filed Nov. 19, 2015 to Notice of Non Compliant Amendment dated Nov. 10, 2015", 5 pgs.
"U.S. Appl. No. 14/738,069, Non Final Office Action dated Mar. 21, 2016", 12 pgs.
"U.S. Appl. No. 14/738,069, Notice of Allowance dated Aug. 17, 2016", 6 pgs.
"U.S. Appl. No. 14/738,069, Response filed Jun. 10, 2016 to Non Final Office Action dated Mar. 21, 2016", 10 pgs.
"U.S. Appl. No. 14/808,283, Notice of Allowance dated Apr. 12, 2016", 9 pgs.
"U.S. Appl. No. 14/808,283, Notice of Allowance dated Jul. 14, 2016", 8 pgs.
"U.S. Appl. No. 14/808,283, Preliminary Amendment filed Jul. 24, 2015", 8 pgs.
"U.S. Appl. No. 14/841,987, Notice of Allowance dated Mar. 29, 2017", 17 pgs.
"U.S. Appl. No. 14/841,987, Notice of Allowance dated Aug. 7, 2017", 8 pgs.
"U.S. Appl. No. 14/967,472, Corrected Notice of Allowability dated Mar. 18, 2019", 3 pgs.
"U.S. Appl. No. 14/967,472, Corrected Notice of Allowability dated Apr. 24, 2019", 3 pgs.
"U.S. Appl. No. 14/967,472, Final Office Action dated Mar. 10, 2017", 15 pgs.
"U.S. Appl. No. 14/967,472, Final Office Action dated Jun. 25, 2018", 14 pgs.
"U.S. Appl. No. 14/967,472, Non Final Office Action dated Jan. 12, 2018", 17 pgs.
"U.S. Appl. No. 14/967,472, Non Final Office Action dated Sep. 8, 2016", 11 pgs.
"U.S. Appl. No. 14/967,472, Notice of Allowance dated Jan. 24, 2019", 6 pgs.
"U.S. Appl. No. 14/967,472, Preliminary Amendment filed Dec. 15, 2015", 6 pgs.
"U.S. Appl. No. 14/967,472, Response filed Mar. 16, 2018 Non Final Office Action dated Jan. 12, 2018", 13 pgs.
"U.S. Appl. No. 14/967,472, Response filed Jun. 7, 2017 to Final Office Action dated Mar. 10, 2017", 12 pgs.
"U.S. Appl. No. 14/967,472, Response filed Sep. 21, 2018 to Final Office Action dated Jun. 25, 2018", 11 pgs.
"U.S. Appl. No. 14/967,472, Response filed Dec. 5, 2016 to Non Final Office Action dated Sep. 8, 2016", 11 pgs.
"U.S. Appl. No. 14/974,321, Corrected Notice of Allowability dated Feb. 13, 2019", 6 pgs.
"U.S. Appl. No. 14/974,321, Corrected Notice of Allowability dated Apr. 19, 2019", 6 pgs.
"U.S. Appl. No. 14/974,321, Corrected Notice of Allowability dated Jun. 12, 2019", 6 pgs.
"U.S. Appl. No. 14/974,321, Examiner Interview Summary dated Dec. 5, 2017", 3 pgs.
"U.S. Appl. No. 14/974,321, Final Office Action dated Oct. 26, 2017", 16 pgs.
"U.S. Appl. No. 14/974,321, Non Final Office Action dated May 31, 2018", 14 pgs.
"U.S. Appl. No. 14/974,321, Non Final Office Action dated Jun. 29, 2017", 36 pgs.
"U.S. Appl. No. 14/974,321, Notice of Allowance dated Jan. 3, 2019", 9 pgs.
"U.S. Appl. No. 14/974,321, Response filed Aug. 30, 2018 to Non Final Office Action dated May 31, 2018", 14 pgs.
"U.S. Appl. No. 14/974,321, Response filed Sep. 27, 2017 to Non Final Office Action dated Jun. 29, 2017", 13 pgs.
"U.S. Appl. No. 15/074,029, Advisory Action dated Oct. 11, 2018", 3 pgs.
"U.S. Appl. No. 15/074,029, Corrected Notice of Allowability dated Feb. 5, 2020", 4 pgs.
"U.S. Appl. No. 15/074,029, Corrected Notice of Allowability dated Aug. 20, 2019", 10 pgs.
"U.S. Appl. No. 15/074,029, Final Office Action dated Jun. 28, 2018", 22 pgs.
"U.S. Appl. No. 15/074,029, Non Final Office Action dated Jan. 23, 2019", 19 pgs.
"U.S. Appl. No. 15/074,029, Non Final Office Action dated Nov. 30, 2017", 16 pgs.
"U.S. Appl. No. 15/074,029, Notice of Allowance dated Jun. 19, 2019", 14 pgs.
"U.S. Appl. No. 15/074,029, Response filed Feb. 28, 2018 to Non Final Office Action dated Nov. 30, 2017", 12 pgs.
"U.S. Appl. No. 15/074,029, Response filed Aug. 28, 2018 to Final Office Action dated Jun. 28, 2018", 21 pgs.
"U.S. Appl. No. 15/074,029, Response filed Apr. 23, 2019 to Non Final Office Action dated Jan. 23, 2019", 15 pgs.
"U.S. Appl. No. 15/137,608, Amendment and Response filed Jan. 25, 2019 to Non Final Office Action dated Nov. 2, 2018", 13 pgs.
"U.S. Appl. No. 15/137,608, Corrected Notice of Allowability dated Oct. 2, 2019", 3 pgs.

(56) References Cited

OTHER PUBLICATIONS

"U.S. Appl. No. 15/137,608, Final Office Action dated May 13, 2019", 10 pgs.
"U.S. Appl. No. 15/137,608, Non Final Office Action dated Nov. 2, 2018", 10 pgs.
"U.S. Appl. No. 15/137,608, Notice of Allowance dated Aug. 8, 2019", 7 pgs.
"U.S. Appl. No. 15/137,608, Preliminary Amendment filed Apr. 26, 2016", 6 pgs.
"U.S. Appl. No. 15/137,608, Response filed Jul. 12, 2019 to Final Office Action dated May 13, 2019", 10 pgs.
"U.S. Appl. No. 15/152,975, Examiner Interview Summary dated Feb. 4, 2019", 7 pgs.
"U.S. Appl. No. 15/152,975, Examiner Interview Summary dated May 14, 2018", 3 pgs.
"U.S. Appl. No. 15/152,975, Examiner Interview Summary dated Nov. 13, 2017", 13 pgs.
"U.S. Appl. No. 15/152,975, Final Office Action dated Jun. 30, 2017", 17 pgs.
"U.S. Appl. No. 15/152,975, Final Office Action dated Jul. 2, 2018", 19 pgs.
"U.S. Appl. No. 15/152,975, Non Final Office Action dated Jan. 10, 2018", 18 pgs.
"U.S. Appl. No. 15/152,975, Non Final Office Action dated Jan. 12, 2017", 36 pgs.
"U.S. Appl. No. 15/152,975, Non Final Office Action dated Sep. 28, 2018", 28 pgs.
"U.S. Appl. No. 15/152,975, Notice of Allowance dated May 17, 2019", 13 pgs.
"U.S. Appl. No. 15/152,975, Preliminary Amendment filed May 19, 2016", 8 pgs.
"U.S. Appl. No. 15/152,975, Response filed Jan. 28, 2019 to Non Final Office Action dated Sep. 28, 2018", 17 pgs.
"U.S. Appl. No. 15/152,975, Response Filed May 10, 2018 to Non Final Office Action dated Jan. 10, 2018", 13 pgs.
"U.S. Appl. No. 15/152,975, Response filed Jun. 12, 2017 to Non Final Office Action dated Jan. 12, 2017", 13 pgs.
"U.S. Appl. No. 15/152,975, Response filed Sep. 19, 2018 to Final Office Action dated Jul. 2, 2018", 14 pgs.
"U.S. Appl. No. 15/152,975, Response filed Nov. 30, 2017 to Final Office Action dated Jun. 30, 2017", 9 pgs.
"U.S. Appl. No. 15/208,460, Notice of Allowance dated Feb. 27, 2017", 8 pgs.
"U.S. Appl. No. 15/208,460, Notice of Allowance dated Dec. 30, 2016", 9 pgs.
"U.S. Appl. No. 15/208,460, Supplemental Preliminary Amendment filed Jul. 18, 2016", 8 pgs.
"U.S. Appl. No. 15/212,095, Final Office Action dated Mar. 14, 2017", 9 pgs.
"U.S. Appl. No. 15/212,095, Non Final Office Action dated Feb. 2, 2017", 8 pgs.
"U.S. Appl. No. 15/212,095, Notice of Allowance dated Jun. 1, 2017", 8 pgs.
"U.S. Appl. No. 15/212,095, Notice of Allowance dated Sep. 8, 2017", 2 pgs.
"U.S. Appl. No. 15/212,095, Response filed Feb. 28, 2017 to Non Final Office Action dated Feb. 2, 2017", 2 pgs.
"U.S. Appl. No. 15/212,095, Response filed May 15, 2017 to Final Office Action dated Mar. 14, 2017", 2 pgs.
"U.S. Appl. No. 15/224,312, Advisory Action dated Aug. 27, 2019", 3 pgs.
"U.S. Appl. No. 15/224,312, Appeal Brief filed Feb. 14, 2022", 23 pgs.
"U.S. Appl. No. 15/224,312, Final Office Action dated Apr. 11, 2019", 15 pgs.
"U.S. Appl. No. 15/224,312, Final Office Action dated Apr. 20, 2018", 22 pgs.
"U.S. Appl. No. 15/224,312, Final Office Action dated May 1, 2020", 18 pgs.
"U.S. Appl. No. 15/224,312, Final Office Action dated May 12, 2021", 21 pgs.
"U.S. Appl. No. 15/224,312, Non Final Office Action dated Oct. 11, 2017", 29 pgs.
"U.S. Appl. No. 15/224,312, Non Final Office Action dated Oct. 22, 2018", 15 pgs.
"U.S. Appl. No. 15/224,312, Non Final Office Action dated Nov. 9, 2020", 18 pgs.
"U.S. Appl. No. 15/224,312, Non Final Office Action dated Dec. 16, 2019", 14 pgs.
"U.S. Appl. No. 15/224,312, Preliminary Amendment filed Feb. 1, 2017", 11 pgs.
"U.S. Appl. No. 15/224,312, Response filed Feb. 22, 2019 to Non Final Office Action dated Oct. 22, 2018", 14 pgs.
"U.S. Appl. No. 15/224,312, Response filed Apr. 9, 2021 to Non Final Office Action dated Nov. 9, 2020", 17 pgs.
"U.S. Appl. No. 15/224,312, Response filed Apr. 16, 2020 to Non Final Office Action dated Dec. 16, 2019", 14 pgs.
"U.S. Appl. No. 15/224,312, Response filed Aug. 20, 2018 to Final Office Action dated Apr. 20, 2018", 16 pgs.
"U.S. Appl. No. 15/224,312, Response filed Oct. 1, 2020 to Final Office Action dated May 1, 2020", 18 pgs.
"U.S. Appl. No. 15/224,312, Response filed Oct. 11, 2019 to Advisory Action dated Aug. 27, 2019", 17 pgs.
"U.S. Appl. No. 15/224,312, Response filed Aug. 12, 2019 to Final Office Action dated Apr. 11, 2019", 14 pgs.
"U.S. Appl. No. 15/224,343, Amendment and Response filed Feb. 4, 2019 to Non Final Office Action dated Sep. 4, 2018", 18 pgs.
"U.S. Appl. No. 15/224,343, Final Office Action dated Mar. 22, 2019", 17 pgs.
"U.S. Appl. No. 15/224,343, Final Office Action dated Apr. 7, 2020", 16 pgs.
"U.S. Appl. No. 15/224,343, Final Office Action dated Apr. 19, 2018", 20 pgs.
"U.S. Appl. No. 15/224,343, Non Final Office Action dated Sep. 4, 2018", 20 pgs.
"U.S. Appl. No. 15/224,343, Non Final Office Action dated Oct. 4, 2017", 26 pgs.
"U.S. Appl. No. 15/224,343, Non Final Office Action dated Nov. 12, 2019", 16 pgs.
"U.S. Appl. No. 15/224,343, Notice of Allowance dated Jul. 29, 2020", 7 pgs.
"U.S. Appl. No. 15/224,343, Notice of Allowance dated Nov. 16, 2020", 7 pgs.
"U.S. Appl. No. 15/224,343, Preliminary Amendment filed Jan. 31, 2017", 10 pgs.
"U.S. Appl. No. 15/224,343, Response filed Mar. 2, 2020 to Non Final Office Action dated Nov. 12, 2019", 17 pgs.
"U.S. Appl. No. 15/224,343, Response filed Jun. 3, 2020 to Final Office Action dated Apr. 7, 2020", 12 pgs.
"U.S. Appl. No. 15/224,343, Response filed Jul. 19, 2018 to Final Office Action dated Apr. 19, 2018", 16 pgs.
"U.S. Appl. No. 15/224,343, Response filed Mar. 5, 2018 to Non Final Office Action dated Oct. 4, 2017", 23 pgs.
"U.S. Appl. No. 15/224,343, Response filed Aug. 22, 2019 to Final Office Action dated Mar. 22, 2019", 16 pgs.
"U.S. Appl. No. 15/224,355, Corrected Notice of Allowability dated Feb. 9, 2022", 3 pgs.
"U.S. Appl. No. 15/224,355, Corrected Notice of Allowability dated Nov. 18, 2021", 3 pgs.
"U.S. Appl. No. 15/224,355, Examiner Interview Summary dated Oct. 25, 2017", 3 pgs.
"U.S. Appl. No. 15/224,355, Final Office Action dated Apr. 24, 2018", 20 pgs.
"U.S. Appl. No. 15/224,355, Final Office Action dated May 1, 2020", 15 pgs.
"U.S. Appl. No. 15/224,355, Final Office Action dated Aug. 9, 2019", 15 pgs.
"U.S. Appl. No. 15/224,355, Non Final Office Action dated Jan. 22, 2020", 13 pgs.
"U.S. Appl. No. 15/224,355, Non Final Office Action dated Sep. 6, 2017", 30 pgs.

(56) References Cited

OTHER PUBLICATIONS

"U.S. Appl. No. 15/224,355, Non Final Office Action dated Dec. 20, 2018", 14 pgs.
"U.S. Appl. No. 15/224,355, Notice of Allowability dated Jul. 21, 2021", 13 pgs.
"U.S. Appl. No. 15/224,355, Notice of Allowance dated Jul. 13, 2021", 16 pgs.
"U.S. Appl. No. 15/224,355, Notice of Allowance dated Nov. 3, 2021", 10 pgs.
"U.S. Appl. No. 15/224,355, Preliminary Amendment filed Apr. 3, 2017", 12 pgs.
"U.S. Appl. No. 15/224,355, Response filed Mar. 6, 2018 to Non Final Office Action dated Sep. 6, 2017", 25 pgs.
"U.S. Appl. No. 15/224,355, Response filed Apr. 22, 2020 to Non Final Office Action dated Jan. 22, 2020", 13 pgs.
"U.S. Appl. No. 15/224,355, Response filed May 20, 2019 to Non Final Office Action dated Dec. 20, 2018", 13 pgs.
"U.S. Appl. No. 15/224,355, Response filed Sep. 1, 2020 to Final Office Action dated May 1, 2020", 16 pgs.
"U.S. Appl. No. 15/224,355, Response filed Sep. 24, 2018 to Final Office Action dated Apr. 24, 2018", 19 pgs.
"U.S. Appl. No. 15/224,355, Response filed Nov. 11, 2019 to Final Office Action dated Aug. 9, 2019", 14 pgs.
"U.S. Appl. No. 15/224,359, Final Office Action dated Apr. 2, 2018", 18 pgs.
"U.S. Appl. No. 15/224,359, Final Office Action dated Apr. 11, 2019", 15 pgs.
"U.S. Appl. No. 15/224,359, Final Office Action dated May 1, 2020", 13 pgs.
"U.S. Appl. No. 15/224,359, Non Final Office Action dated Jul. 20, 2017", 33 pgs.
"U.S. Appl. No. 15/224,359, Non Final Office Action dated Sep. 28, 2018", 15 pgs.
"U.S. Appl. No. 15/224,359, Non Final Office Action dated Dec. 10, 2019", 12 pgs.
"U.S. Appl. No. 15/224,359, Notice of Allowance dated Nov. 3, 2020", 15 pgs.
"U.S. Appl. No. 15/224,359, Response filed Jan. 22, 2018 to Non Final Office Action dated Jul. 20, 2017", 13 pgs.
"U.S. Appl. No. 15/224,359, Response filed Feb. 28, 2019 to Non Final Office Action dated Aug. 28, 2018", 16 pgs.
"U.S. Appl. No. 15/224,359, Response filed Apr. 10, 2020 to Non Final Office Action dated Dec. 10, 2019", 11 pgs.
"U.S. Appl. No. 15/224,359, Response filed Sep. 1, 2020 to Final Office Action dated May 1, 2020", 13 pgs.
"U.S. Appl. No. 15/224,359, Response filed Sep. 4, 2018 to Final Office Action dated Apr. 2, 2018", 14 pgs.
"U.S. Appl. No. 15/224,359, Response filed Sep. 11, 2019 to Final Office Action dated Apr. 11, 2019", 18 pgs.
"U.S. Appl. No. 15/224,365, Appeal Brief filed Nov. 10, 2021", 15 pgs.
"U.S. Appl. No. 15/224,365, Examiner's Answer to Appeal Brief mailed Dec. 15, 2021", 2 pgs.
"U.S. Appl. No. 15/224,365, Final Office Action dated Apr. 2, 2018", 19 pgs.
"U.S. Appl. No. 15/224,365, Final Office Action dated Jul. 2, 2020", 11 pgs.
"U.S. Appl. No. 15/224,365, Final Office Action dated Aug. 23, 2019", 12 pgs.
"U.S. Appl. No. 15/224,365, Non Final Office Action dated Jan. 3, 2019", 11 pgs.
"U.S. Appl. No. 15/224,365, Non Final Office Action dated Mar. 13, 2020", 9 pgs.
"U.S. Appl. No. 15/224,365, Non Final Office Action dated Aug. 8, 2017", 41 pgs.
"U.S. Appl. No. 15/224,365, Non Final Office Action dated Dec. 10, 2020", 16 pgs.
"U.S. Appl. No. 15/224,365, Response filed Jan. 23, 2020 to Final Office Action dated Aug. 23, 2019", 13 pgs.
"U.S. Appl. No. 15/224,365, Response filed Feb. 8, 2018 to Non Final Office Action dated Aug. 8, 2017", 14 pgs.
"U.S. Appl. No. 15/224,365, Response filed Jun. 15, 2020 to Non Final Office Action dated Mar. 13, 2020", 12 pgs.
"U.S. Appl. No. 15/224,365, Response filed Oct. 2, 2018 to Final Office Action dated Apr. 2, 2018", 15 pgs.
"U.S. Appl. No. 15/224,365, Response filed Oct. 2, 2020 to Final Office Action dated Jul. 2, 2020", 13 pgs.
"U.S. Appl. No. 15/224,365, Response filed Jun. 3, 2019 to Non-Final Office Action dated Jan. 3, 2019", 12 pgs.
"U.S. Appl. No. 15/224,372, Final Office Action dated Mar. 6, 2019", 17 pgs.
"U.S. Appl. No. 15/224,372, Final Office Action dated Apr. 3, 2018", 18 pgs.
"U.S. Appl. No. 15/224,372, Final Office Action dated May 4, 2020", 15 pgs.
"U.S. Appl. No. 15/224,372, Non Final Office Action dated Aug. 7, 2017", 40 pgs.
"U.S. Appl. No. 15/224,372, Non Final Office Action dated Sep. 14, 2018", 20 pgs.
"U.S. Appl. No. 15/224,372, Non Final Office Action dated Oct. 16, 2019", 14 pgs.
"U.S. Appl. No. 15/224,372, Notice of Allowance dated Jan. 12, 2021", 8 pgs.
"U.S. Appl. No. 15/224,372, Preliminary Amendment filed May 5, 2017", 10 pgs.
"U.S. Appl. No. 15/224,372, Response filed Jan. 8, 2017 to Non Final Office Action dated Aug. 7, 2017", 22 pgs.
"U.S. Appl. No. 15/224,372, Response filed Jan. 16, 2019 to Non Final Office Action dated Sep. 14, 2018", 18 pgs.
"U.S. Appl. No. 15/224,372, Response filed Apr. 16, 2020 to Non Final Office Action dated Oct. 16, 2019", 14 pgs.
"U.S. Appl. No. 15/224,372, Response filed Jul. 8, 2019 to Final Office Action dated Mar. 6, 2019", 14 pgs.
"U.S. Appl. No. 15/224,372, Response filed Aug. 3, 2018 to Final Office Action dated Apr. 3, 2018", 14 pgs.
"U.S. Appl. No. 15/224,372, Response filed Oct. 5, 2020 to Final Office Action dated May 4, 2020", 17 pgs.
"U.S. Appl. No. 15/224,377, 312 Amendment filed Jan. 7, 2022", 8 pgs.
"U.S. Appl. No. 15/224,377, Corrected Notice of Allowability dated Jan. 18, 2022", 2 pgs.
"U.S. Appl. No. 15/224,377, Corrected Notice of Allowability dated Apr. 14, 2022", 2 pgs.
"U.S. Appl. No. 15/224,377, Corrected Notice of Allowability dated Oct. 26, 2021", 2 pgs.
"U.S. Appl. No. 15/224,377, Examiner Interview Summary dated Mar. 4, 2019", 5 pgs.
"U.S. Appl. No. 15/224,377, Final Office Action dated Jan. 2, 2018", 29 pgs.
"U.S. Appl. No. 15/224,377, Final Office Action dated Feb. 6, 2019", 14 pgs.
"U.S. Appl. No. 15/224,377, Final Office Action dated Apr. 14, 2021", 14 pgs.
"U.S. Appl. No. 15/224,377, Final Office Action dated May 5, 2020", 15 pgs.
"U.S. Appl. No. 15/224,377, Non Final Office Action dated Jun. 15, 2018", 19 pgs.
"U.S. Appl. No. 15/224,377, Non Final Office Action dated Aug. 4, 2017", 41 pgs.
"U.S. Appl. No. 15/224,377, Non Final Office Action dated Oct. 15, 2019", 12 pgs.
"U.S. Appl. No. 15/224,377, Non Final Office Action dated Oct. 30, 2020", 15 pgs.
"U.S. Appl. No. 15/224,377, Notice of Allowance dated Mar. 30, 2022", 8 pgs.
"U.S. Appl. No. 15/224,377, Notice of Allowance dated Oct. 13, 2021", 14 pgs.
"U.S. Appl. No. 15/224,377, PTO Response to Rule 312 Communication dated Jan. 18, 2022", 1 pg.
"U.S. Appl. No. 15/224,377, Response filed Mar. 30, 2021 to Non Final Office Action dated Oct. 30, 2020", 14 pgs.

(56) References Cited

OTHER PUBLICATIONS

"U.S. Appl. No. 15/224,377, Response filed Apr. 15, 2020 to Non Final Office Action dated Oct. 15, 2019", 13 pgs.
"U.S. Appl. No. 15/224,377, Response filed Jun. 6, 2019 to Final Office Action dated Feb. 6, 2019", 10 pgs.
"U.S. Appl. No. 15/224,377, Response filed Sep. 8, 2020 to Final Office Action dated May 5, 2020", 15 pgs.
"U.S. Appl. No. 15/224,377, Response filed Sep. 14, 2021 to Final Office Action dated Apr. 14, 2021", 13 pgs.
"U.S. Appl. No. 15/224,377, Response filed Dec. 17, 2018 to Non Final Office Action dated Jun. 15, 2018", 13 pgs.
"U.S. Appl. No. 15/224,377, Response filed Dec. 6, 2017 to Non Final Office Action dated Aug. 4, 2017", 22 pgs.
"U.S. Appl. No. 15/224,383, Examiner Interview Summary dated Aug. 15, 2018", 4 pgs.
"U.S. Appl. No. 15/224,383, Examiner Interview Summary dated Oct. 25, 2017", 3 pgs.
"U.S. Appl. No. 15/224,383, Final Office Action dated Jan. 14, 2019", 15 pgs.
"U.S. Appl. No. 15/224,383, Final Office Action dated Feb. 14, 2018", 25 pgs.
"U.S. Appl. No. 15/224,383, Non Final Office Action dated Jul. 5, 2018", 19 pgs.
"U.S. Appl. No. 15/224,383, Non Final Office Action dated Aug. 30, 2017", 26 pgs.
"U.S. Appl. No. 15/224,383, Non-Final Office Action dated Sep. 23, 2019", 13 pgs.
"U.S. Appl. No. 15/224,383, Notice of Allowance dated Feb. 27, 2020", 7 pgs.
"U.S. Appl. No. 15/224,383, Preliminary Amendment filed May 9, 2017", 13 pgs.
"U.S. Appl. No. 15/224,383, Response filed Jan. 3, 2018 to Non Final Office Action dated Aug. 30, 2017", 25 pgs.
"U.S. Appl. No. 15/224,383, Response filed Jan. 23, 2020 to Non Final Office Action dated Sep. 23, 2019", 14 pgs.
"U.S. Appl. No. 15/224,383, Response filed May 14, 2019 to Final Office Action dated Jan. 14, 2019", 15 pgs.
"U.S. Appl. No. 15/224,383, Response filed Jun. 14, 2018 to Final Office Action dated Feb. 14, 2018", 14 pgs.
"U.S. Appl. No. 15/224,383, Response Filed Dec. 5, 2018 to Non Final Office Action dated Jul. 5, 2018", 16 pgs.
"U.S. Appl. No. 15/224,359, Preliminary Amendment filed Apr. 19, 2017", 8 pgs.
"U.S. Appl. No. 15/298,806, Advisory Action dated Jan. 29, 2018", 4 pgs.
"U.S. Appl. No. 15/298,806, Examiner Interview Summary dated Jan. 12, 2018", 3 pgs.
"U.S. Appl. No. 15/298,806, Examiner Interview Summary dated Aug. 13, 2018", 3 pgs.
"U.S. Appl. No. 15/298,806, Final Office Action dated Oct. 24, 2017", 15 pgs.
"U.S. Appl. No. 15/298,806, Non Final Office Action dated May 17, 2018", 16 pgs.
"U.S. Appl. No. 15/298,806, Non Final Office Action dated Jun. 12, 2017", 26 pgs.
"U.S. Appl. No. 15/298,806, Notice of Allowance dated Sep. 19, 2018", 5 pgs.
"U.S. Appl. No. 15/298,806, Preliminary Amendment filed Oct. 21, 2016", 8 pgs.
"U.S. Appl. No. 15/298,806, Response filed Jan. 9, 2018 to Final Office Action dated Oct. 24, 2017", 17 pgs.
"U.S. Appl. No. 15/298,806, Response filed Aug. 10, 2018 to Non Final Office Action dated May 17, 2018", 15 pgs.
"U.S. Appl. No. 15/298,806, Response filed Sep. 12, 2017 to Non Final Office Action dated Jun. 12, 2017", 12 pgs.
"U.S. Appl. No. 15/416,846, Notice of Allowance dated Jul. 19, 2017", 9 pgs.
"U.S. Appl. No. 15/416,846, Preliminary Amendment filed Feb. 18, 2017", 10 pgs.
"U.S. Appl. No. 15/424,184, Examiner Interview Summary dated Jan. 10, 2019", 3 pgs.
"U.S. Appl. No. 15/424,184, Examiner Interview Summary dated Jul. 30, 2019", 2 pgs.
"U.S. Appl. No. 15/424,184, Final Office Action dated Jan. 29, 2019", 14 pgs.
"U.S. Appl. No. 15/424,184, Non Final Office Action dated May 21, 2019", 16 pgs.
"U.S. Appl. No. 15/424,184, Non Final Office Action dated Nov. 30, 2018", 22 pgs.
"U.S. Appl. No. 15/424,184, Response filed Apr. 29, 2019 to Final Office Action dated Jan. 29, 2019", 11 pgs.
"U.S. Appl. No. 15/424,184, Response filed Jan. 4, 2019 to Non Final Office Action dated Nov. 30, 2018", 17 pgsl.
"U.S. Appl. No. 15/470,004, Examiner Interview Summary dated Sep. 12, 2019", 3 pgs.
"U.S. Appl. No. 15/470,004, Final Office Action dated May 20, 2019", 9 pgs.
"U.S. Appl. No. 15/470,004, Non Final Office Action dated Jan. 31, 2019", 9 pgs.
"U.S. Appl. No. 15/470,004, Notice of Allowance dated Oct. 22, 2019", 10 pgs.
"U.S. Appl. No. 15/470,004, Response filed Apr. 29, 2019 to Non Final Office Action dated Jan. 31, 2019", 12 pgs.
"U.S. Appl. No. 15/470,004, Response filed Sep. 9, 2019 to Final Office Action dated May 20, 2019", 13 pgs.
"U.S. Appl. No. 15/470,025, Final Office Action dated May 20, 2019", 10 pgs.
"U.S. Appl. No. 15/470,025, Non Final Office Action dated Jan. 30, 2019", 10 pgs.
"U.S. Appl. No. 15/470,025, Notice of Allowance dated Oct. 22, 2019", 10 pgs.
"U.S. Appl. No. 15/470,025, Response filed Apr. 24, 2019 to Non Final Office Action dated Jan. 30, 2019", 13 pgs.
"U.S. Appl. No. 15/470,025, Response filed Sep. 12, 2019 to Final Office Action dated May 20, 2019", 14 pgs.
"U.S. Appl. No. 15/474,821, Non Final Office Action dated Jan. 25, 2019", 17 pgs.
"U.S. Appl. No. 15/474,821, Response filed Apr. 25, 2019 to Non Final Office Action dated Jan. 25, 2019", 16 pgs.
"U.S. Appl. No. 15/486,111, Corrected Notice of Allowance dated Sep. 7, 2017", 3 pgs.
"U.S. Appl. No. 15/486,111, Non Final Office Action dated May 9, 2017", 17 pgs.
"U.S. Appl. No. 15/486,111, Notice of Allowance dated Aug. 30, 2017", 5 pgs.
"U.S. Appl. No. 15/486,111, Response filed Aug. 9, 2017 to Non Final Office Action dated May 9, 2017", 11 pgs.
"U.S. Appl. No. 15/673,137, Final Office Action dated May 16, 2019", 8 pgs.
"U.S. Appl. No. 15/673,137, Non Final Office Action dated Aug. 30, 2019", 10 pgs.
"U.S. Appl. No. 15/673,137, Non Final Office Action dated Oct. 5, 2018", 7 pgs.
"U.S. Appl. No. 15/673,137, Response filed Jan. 31, 2019 to Non Final Office Action dated Oct. 5, 2018", 10 pgs.
"U.S. Appl. No. 15/673,137, Response filed Oct. 18, 2019 to Non-Final Office Action dated Aug. 30, 2019", 12 pgs.
"U.S. Appl. No. 15/673,137, Response filed Aug. 1, 2019 to Final Office Action dated May 16, 2019", 10 pgs.
"U.S. Appl. No. 15/702,511, 312 Amendment filed Jun. 26, 2019", 11 pgs.
"U.S. Appl. No. 15/702,511, Notice of Allowability dated Sep. 30, 2019", 2 pgs.
"U.S. Appl. No. 15/702,511, Notice of Allowance dated Mar. 26, 2019", 7 pgs.
"U.S. Appl. No. 15/702,511, Notice of Allowance dated Oct. 26, 2018", 7 pgs.
"U.S. Appl. No. 15/702,511, Preliminary Amendment filed Sep. 15, 2017", 13 pgs.
"U.S. Appl. No. 15/702,511, PTO Response to Rule 312 Communication dated Aug. 13, 2019", 2 pgs.

(56) References Cited

OTHER PUBLICATIONS

"U.S. Appl. No. 15/729,582, Corrected Notice of Allowability dated Oct. 2, 2019", 3 pgs.
"U.S. Appl. No. 15/729,582, Corrected Notice of Allowability dated Oct. 30, 2019", 3 pgs.
"U.S. Appl. No. 15/729,582, Final Office Action dated Dec. 13, 2018", 14 pgs.
"U.S. Appl. No. 15/729,582, Non Final Office Action dated May 25, 2018", 14 pgs.
"U.S. Appl. No. 15/729,582, Notice of Allowance dated Jul. 22, 2019", 9 pgs.
"U.S. Appl. No. 15/729,582, Response filed May 13, 19 to Final Office Action dated Dec. 13, 2018", 9 pgs.
"U.S. Appl. No. 15/787,467, Corrected Notice of Allowability dated Sep. 24, 2018", 2 pgs.
"U.S. Appl. No. 15/787,467, Non Final Office Action dated Apr. 18, 2018", 17 pgs.
"U.S. Appl. No. 15/787,467, Notice of Allowance dated Aug. 31, 2018", 8 pgs.
"U.S. Appl. No. 15/787,467, Preliminary Amendment filed Oct. 26, 2017", 11 pgs.
"U.S. Appl. No. 15/787,467, Response filed Jul. 18, 2018 to Non Final Office Action dated Apr. 18, 2018", 12 pgs.
"U.S. Appl. No. 15/835,100, Non Final Office Action dated Jan. 23, 2018", 18 pgs.
"U.S. Appl. No. 15/835,100, Notice of Allowance dated May 22, 2018", 5 pgs.
"U.S. Appl. No. 15/835,100, Response Filed Apr. 23, 2018 to Non Final Office Action dated Jan. 23, 2018", 11 pgs.
"U.S. Appl. No. 15/946,990, Final Office Action dated May 9, 2019", 11 pgs.
"U.S. Appl. No. 15/946,990, Non Final Office Action dated Dec. 3, 2018", 10 pgs.
"U.S. Appl. No. 15/946,990, Notice of Allowance dated Sep. 24, 2019", 5 pgs.
"U.S. Appl. No. 15/946,990, Response filed Feb. 20, 2019 to Non Final Office Action dated Dec. 3, 2018", 11 pgs.
"U.S. Appl. No. 15/946,990, Response filed Jul. 9, 2019 to Final Office Action dated May 9, 2019", 12 pgs.
"U.S. Appl. No. 15/947,350, Appeal Brief filed Dec. 8, 2021", 23 pgs.
"U.S. Appl. No. 15/947,350, Examiner Interview Summary dated Jul. 20, 2020", 4 pgs.
"U.S. Appl. No. 15/947,350, Examiner's Answer dated Feb. 4, 2022", 8 pgs.
"U.S. Appl. No. 15/947,350, Examiner's Answer dated Feb. 8, 2022", 8 pgs.
"U.S. Appl. No. 15/947,350, Final Office Action dated Apr. 8, 2021", 13 pgs.
"U.S. Appl. No. 15/947,350, Final Office Action dated May 4, 2020", 12 pgs.
"U.S. Appl. No. 15/947,350, Non Final Office Action dated Sep. 28, 2020", 13 pgs.
"U.S. Appl. No. 15/947,350, Non Final Office Action dated Dec. 13, 2019", 20 pgs.
"U.S. Appl. No. 15/947,350, Response filed Mar. 1, 2021 to Non Final Office Action dated Sep. 28, 2020", 12 pgs.
"U.S. Appl. No. 15/947,350, Response filed Apr. 13, 2020 to Non Final Office Action dated Dec. 13, 2019", 12 pgs.
"U.S. Appl. No. 15/947,350, Response filed Sep. 4, 2020 to Final Office Action dated May 4, 2020", 12 pgs.
"U.S. Appl. No. 16/000,657, 312 Amendment filed Apr. 30, 2021", 8 pgs.
"U.S. Appl. No. 16/000,657, Advisory Action dated Oct. 19, 2020", 3 pgs.
"U.S. Appl. No. 16/000,657, Examiner Interview Summary dated Jun. 12, 2020", 4 pgs.
"U.S. Appl. No. 16/000,657, Examiner Interview Summary dated Sep. 25, 2020", 3 pgs.
"U.S. Appl. No. 16/000,657, Final Office Action dated Jul. 27, 2020", 17 pgs.
"U.S. Appl. No. 16/000,657, Non Final Office Action dated Mar. 6, 2020", 30 pgs.
"U.S. Appl. No. 16/000,657, Notice of Allowance dated Feb. 4, 2021", 8 pgs.
"U.S. Appl. No. 16/000,657, Preliminary Amendment filed Jun. 6, 2018", 8 pgs.
"U.S. Appl. No. 16/000,657, PTO Response to Rule 312 Communication dated May 11, 2021", 3 pgs.
"U.S. Appl. No. 16/000,657, Response filed Jul. 6, 2020 to Non Final Office Action dated Mar. 6, 2020", 13 pgs.
"U.S. Appl. No. 16/000,657, Response filed Sep. 28, 2020 to Final Office Action dated Jul. 27, 2020", 12 pgs.
"U.S. Appl. No. 16/105,687, Non Final Office Action dated Sep. 14, 2018", 11 pgs.
"U.S. Appl. No. 16/105,687, Notice of Allowance dated Feb. 25, 2019", 8 pgs.
"U.S. Appl. No. 16/105,687, Response filed Dec. 14, 2018 to Non Final Office Action dated Sep. 14, 2018", 12 pgs.
"U.S. Appl. No. 16/155,782, Non Final Office Action dated Jul. 10, 2019", 7 pgs.
"U.S. Appl. No. 16/155,782, Response filed Oct. 8, 2019 to Non-Final Office Action dated Jul. 10, 2019", 10 pgs.
"U.S. Appl. No. 16/204,886, Corrected Notice of Allowability dated Jul. 15, 2019", 2 pgs.
"U.S. Appl. No. 16/204,886, Corrected Notice of Allowability dated Aug. 6, 2019", 2 pgs.
"U.S. Appl. No. 16/204,886, Corrected Notice of Allowability dated Sep. 10, 2019", 2 pgs.
"U.S. Appl. No. 16/204,886, Non Final Office Action dated Jan. 4, 2019", 8 pgs.
"U.S. Appl. No. 16/204,886, Notice of Allowance dated May 15, 2019", 9 pgs.
"U.S. Appl. No. 16/204,886, Response filed Apr. 2, 2019 to Non Final Office Action dated Jan. 4, 2019", 8 pgs.
"U.S. Appl. No. 16/212,313, Non Final Office Action dated Aug. 30, 2019", 18 pgs.
"U.S. Appl. No. 16/212,313, Preliminary Amendment filed Dec. 12, 2018", 6 pgs.
"U.S. Appl. No. 16/219,577, Non Final Office Action dated Oct. 29, 2019", 7 pgs.
"U.S. Appl. No. 16/219,577, Response filed Oct. 3, 2019 to Restriction Requirement dated Aug. 7, 2019", 6 pgs.
"U.S. Appl. No. 16/219,577, Response filed Dec. 5, 2019 to Non Final Office Action dated Oct. 29, 2019", 6 pgs.
"U.S. Appl. No. 16/219,577, Restriction Requirement dated Aug. 7, 2019", 6 pgs.
"U.S. Appl. No. 16/376,598, Non Final Office Action dated Jul. 25, 2019", 7 pgs.
"U.S. Appl. No. 16/376,598, Notice of Allowability dated Jan. 23, 2020", 2 pgs.
"U.S. Appl. No. 16/376,598, Notice of Allowance dated Oct. 18, 2019", 5 pgs.
"U.S. Appl. No. 16/376,598, Response filed Oct. 7, 2019 to Non-Final Office Action dated Jul. 25, 2019", 2 pgs.
"U.S. Appl. No. 16/428,210, Preliminary Amendment filed Aug. 8, 2019", 8 pgs.
"U.S. Appl. No. 16/511,834, Corrected Notice of Allowability dated Jan. 27, 2020", 2 pgs.
"U.S. Appl. No. 16/511,834, Non-Final Office Action dated Aug. 20, 2019", 11 pgs.
"U.S. Appl. No. 16/511,834, Notice of Allowance dated Oct. 23, 2019", 8 pgs.
"U.S. Appl. No. 16/511,834, Response filed Oct. 7, 2019 to Non-Final Office Action dated Aug. 20, 2019", 3 pgs.
"U.S. Appl. No. 16/529,461, Advisory Action dated Jan. 8, 2021", 4 pgs.
"U.S. Appl. No. 16/529,461, Examiner Interview Summary dated Jul. 31, 2020", 3 pgs.
"U.S. Appl. No. 16/529,461, Final Office Action dated Oct. 20, 2020", 24 pgs.

(56) References Cited

OTHER PUBLICATIONS

"U.S. Appl. No. 16/529,461, Non Final Office Action dated Feb. 22, 2021", 27 pgs.
"U.S. Appl. No. 16/529,461, Non Final Office Action dated May 21, 2020", 19 pgs.
"U.S. Appl. No. 16/529,461, Notice of Allowance dated Jun. 23, 2021", 9 pgs.
"U.S. Appl. No. 16/529,461, Notice of Allowance dated Oct. 1, 2021", 8 pgs.
"U.S. Appl. No. 16/529,461, Response filed Apr. 29, 2021 to Non Final Office Action dated Feb. 22, 2021", 12 pgs.
"U.S. Appl. No. 16/529,461, Response filed Jul. 29, 2020 to Non Final Office Action dated May 21, 2020", 11 pgs.
"U.S. Appl. No. 16/529,461, Response filed Dec. 18, 2020 to Final Office Action dated Oct. 20, 2020", 10 pgs.
"U.S. Appl. No. 16/541,919, Non Final Office Action dated Apr. 14, 2020", 18 pgs.
"U.S. Appl. No. 16/541,919, Notice of Allowance dated Jun. 30, 2020", 8 pgs.
"U.S. Appl. No. 16/541,919, Notice of Allowance dated Oct. 15, 2020", 8 pgs.
"U.S. Appl. No. 16/541,919, Response filed Jun. 12, 2020 to Non Final Office Action dated Apr. 14, 2020", 8 pgs.
"U.S. Appl. No. 16/662,956, Final Office Action dated Mar. 29, 2021", 17 pgs.
"U.S. Appl. No. 16/662,956, Final Office Action dated Oct. 27, 2021", 15 pgs.
"U.S. Appl. No. 16/662,956, Non Final Office Action dated Jul. 21, 2021", 12 pgs.
"U.S. Appl. No. 16/662,956, Non Final Office Action dated Oct. 6, 2020", 13 pgs.
"U.S. Appl. No. 16/662,956, Notice of Allowance dated Feb. 25, 2022", 12 pgs.
"U.S. Appl. No. 16/662,956, Preliminary Amendment filed Oct. 24, 2019", 8 pgs.
"U.S. Appl. No. 16/662,956, Response filed Jan. 25, 2022 to Final Office Action dated Oct. 27, 2021", 12 pgs.
"U.S. Appl. No. 16/662,956, Response filed Jun. 24, 2021 to Final Office Action dated Mar. 29, 2021", 10 pgs.
"U.S. Appl. No. 16/662,956, Response filed Oct. 5, 2021 to Non Final Office Action dated Jul. 21, 2021", 10 pgs.
"U.S. Appl. No. 16/662,956, Response filed Dec. 2, 2020 to Non Final Office Action dated Oct. 6, 2020", 11 pgs.
"U.S. Appl. No. 16/667,814, Corrected Notice of Allowability dated Mar. 2, 2021", 2 pgs.
"U.S. Appl. No. 16/667,814, Corrected Notice of Allowability dated Dec. 23, 2020", 2 pgs.
"U.S. Appl. No. 16/667,814, Non Final Office Action dated Aug. 17, 2020", 6 pgs.
"U.S. Appl. No. 16/667,814, Notice of Allowance dated Nov. 23, 2020", 8 pgs.
"U.S. Appl. No. 16/667,814, Preliminary Amendment filed Apr. 20, 2020", 6 pgs.
"U.S. Appl. No. 16/667,814, Response filed Oct. 29, 2020 to Non Final Office Action dated Aug. 17, 2020", 7 pgs.
"U.S. Appl. No. 16/703,526, Corrected Notice of Allowability dated Sep. 2, 2020", 2 pgs.
"U.S. Appl. No. 16/703,526, Notice of Allowance dated Jun. 19, 2020", 10 pgs.
"U.S. Appl. No. 16/703,526, Supplemental Notice of Allowability dated Aug. 10, 2020", 2 pgs.
"U.S. Appl. No. 16/709,092, Corrected Notice of Allowability dated Jun. 1, 2020", 2 pgs.
"U.S. Appl. No. 16/709,092, Corrected Notice of Allowability dated Jul. 22, 2020", 2 pgs.
"U.S. Appl. No. 16/709,092, Notice of Allowance dated Apr. 9, 2020", 9 pgs.
"U.S. Appl. No. 16/841,817, Corrected Notice of Allowability dated Mar. 23, 2022", 2 pgs.
"U.S. Appl. No. 16/841,817, Corrected Notice of Allowability dated Sep. 16, 2021", 2 pgs.
"U.S. Appl. No. 16/841,817, Corrected Notice of Allowability dated Dec. 30, 2021", 2 pgs.
"U.S. Appl. No. 16/841,817, Non Final Office Action dated May 26, 2021", 7 pgs.
"U.S. Appl. No. 16/841,817, Notice of Allowance dated Sep. 3, 2021", 7 pgs.
"U.S. Appl. No. 16/841,817, Notice of Allowance dated Dec. 16, 2021", 8 pgs.
"U.S. Appl. No. 16/841,817, Response filed Aug. 26, 2021 to Non Final Office Action dated May 26, 2021", 6 pgs.
"U.S. Appl. No. 16/911,854, Corrected Notice of Allowability dated Sep. 16, 2021", 2 pgs.
"U.S. Appl. No. 16/911,854, Corrected Notice of Allowability dated Oct. 6, 2021", 2 pgs.
"U.S. Appl. No. 16/911,854, Non Final Office Action dated Mar. 3, 2021", 12 pgs.
"U.S. Appl. No. 16/911,854, Notice of Allowance dated Jun. 17, 2021", 8 pgs.
"U.S. Appl. No. 16/911,854, Response filed May 28, 2021 to Non Final Office Action dated Mar. 3, 2021", 8 pgs.
"U.S. Appl. No. 16/933,205, Final Office Action dated Nov. 29, 2021", 21 pgs.
"U.S. Appl. No. 16/933,205, Non Final Office Action dated Apr. 16, 2021", 39 pgs.
"U.S. Appl. No. 16/933,205, Response filed Apr. 5, 2022 to Final Office Action dated Nov. 29, 2021", 13 pgs.
"U.S. Appl. No. 16/933,205, Response filed Oct. 18, 2021 to Non Final Office Action dated Apr. 16, 2021", 13 pgs.
"U.S. Appl. No. 16/933,279, Non Final Office Action dated Mar. 25, 2021", 41 pgs.
"U.S. Appl. No. 16/933,279, Response filed Aug. 25, 2021 to Non Final Office Action dated Mar. 25, 2021", 14 pgs.
"U.S. Appl. No. 16/933,366, Final Office Action dated Oct. 21, 2021", 18 pgs.
"U.S. Appl. No. 16/933,366, Non Final Office Action dated Apr. 27, 2021", 39 pgs.
"U.S. Appl. No. 16/933,366, Response filed Mar. 18, 2022 to Final Office Action dated Oct. 21, 2021", 12 pgs.
"U.S. Appl. No. 16/933,366, Response filed Aug. 27, 2021 to Non Final Office Action dated Apr. 27, 2021", 16 pgs.
"U.S. Appl. No. 17/023,175, Non Final Office Action dated Jun. 8, 2021", 8 pgs.
"U.S. Appl. No. 17/023,175, Notice of Allowance dated Oct. 5, 2021", 7 pgs.
"U.S. Appl. No. 17/023,175, Response filed Sep. 8, 2021 to Non Final Office Action dated Jun. 8, 2021", 6 pgs.
"U.S. Appl. No. 17/023,175, Supplemental Notice of Allowability dated Jan. 20, 2022", 2 pgs.
"BlogStomp", StompSoftware, [Online] Retrieved from the Internet: <URL: http://stompsoftware.com/blogstomp>, (accessed May 24, 2017), 12 pgs.
"Canadian Application Serial No. 2,894,332 Response filed Jan. 24, 2017 to Office Action dated Aug. 16, 2016", 15 pgs.
"Canadian Application Serial No. 2,894,332, Office Action dated Aug. 16, 2016", 4 pgs.
"Canadian Application Serial No. 2,894,332, Request for Reinstatement filed Jun. 11, 2018", w/ Amended Claims, 17 pgs.
"Canadian Application Serial No. 2,910,158, Office Action dated Jun. 6, 2018", 5 pgs.
"Canadian Application Serial No. 2,910,158, Office Action dated Dec. 15, 2016", 5 pgs.
"Canadian Application Serial No. 2,910,158, Response filed Dec. 6, 2018 to Office Action dated Jun. 6, 2018", w/ English Claims, 18 pgs.
"Canadian Application Serial No. 2,910,158, Response filed Apr. 11, 2017 to Office Action dated Dec. 15, 2016", 21 pgs.
"Canadian Application Serial No. 3,027,981, Non-Final Office Action dated Jan. 28, 2022", 3 pgs.
"Canadian Application Serial No. 3,027,981, Office Action dated Oct. 2, 2020", 5 pgs.

(56) References Cited

OTHER PUBLICATIONS

"Canadian Application Serial No. 3,027,981, Office Action dated Dec. 5, 2019", 4 pgs.
"Canadian Application Serial No. 3,027,981, Response filed Feb. 2, 2021 to Office Action dated Oct. 2, 2020", 15 pgs.
"Canadian Application Serial No. 3,027,981, Response filed Mar. 31, 2020 to Office Action dated Dec. 5, 2019", 12 pgs.
"Chinese Application Serial No. 10-2021-7017544, Response filed Nov. 22, 2021 to Office Action dated Sep. 26, 2021", w/ English Claims, 15 pgs.
"Chinese Application Serial No. 201580031616.8, Office Action dated Jul. 2, 2018", w/ English translation, 8 pgs.
"Chinese Application Serial No. 201580031616.8, Office Action dated Oct. 9, 2017", w/ English Translation, 18 pgs.
"Chinese Application Serial No. 201580031616.8, Response filed Feb. 26, 18 to Office Action dated Oct. 9, 2017", w/ English Translation, 8 pgs.
"Chinese Application Serial No. 201580076228.1, Decision of Reexamination—Revoking the Decision of Rejection dated Jan. 7, 2021", 12 pgs.
"Chinese Application Serial No. 201580076228.1, Decision of Rejection dated Jul. 9, 2019", w/ English Translation, 19 pgs.
"Chinese Application Serial No. 201580076228.1, Office Action dated Feb. 12, 2019", w/ English Translation, 18 pgs.
"Chinese Application Serial No. 201580076228.1, Office Action dated Jul. 19, 2018", w/ English translation, 19 pgs.
"Chinese Application Serial No. 201580076228.1, Response filed Apr. 11, 2019 to Office Action dated Feb. 12, 2019", w/ English Claims, 12 pgs.
"Chinese Application Serial No. 201580076228.1, Response filed Oct. 11, 2019 to Decision of Rejection dated Jul. 9, 2019", w/ English Claims, 13 pgs.
"Chinese Application Serial No. 201580076228.1, Response filed Nov. 26, 2018 to Office Action dated Jul. 19, 2018", w/ English Claims, 16 pgs.
"Connecting to Your Customers In the Triangle and Beyond", Newsobserver.com, (2013), 16 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"Demystifying Location Data Accuracy", Mobile Marketing Association, (Nov. 2015), 18 pgs.
"European Application Serial No. 14804343.3, Extended European Search Report dated Sep. 29, 2016", 12 pgs.
"European Application Serial No. 15733026.7, Communication Pursuant to Article 94(3) EPC dated Jul. 28, 2017", 6 pgs.
"European Application Serial No. 15733026.7, Response filed Jan. 30, 2018 to Communication Pursuant to Article 94(3) EPC dated Jul. 28, 2017", w/ Amended Claims, 37 pgs.
"European Application Serial No. 15733026.7, Response filed Aug. 9, 2019 to Summons to Attend Oral Proceedings mailed Jan. 10, 2019", w/ English Claims, 19 pgs.
"European Application Serial No. 15733026.7, Summons to Attend Oral Proceedings mailed Jan. 10, 2019", 7 pgs.
"European Application Serial No. 15782165.3, Communication Pursuant to Article 94(3) EPC dated Sep. 14, 2018", 7 pgs.
"European Application Serial No. 15782165.3, Response filed Jan. 24, 2019 to Communication Pursuant to Article 94(3) EPC dated Sep. 14, 2018", w/ English Claims, 54 pgs.
"European Application Serial No. 15782165.3, Response filed Oct. 17, 2017 to Communication pursuant to Rules 161(1) and 162 EPC dated May 10, 2017", 15 pgs.
"European Application Serial No. 15782165.3, Summons to Attend Oral Proceedings dated Sep. 18, 2019", 6 pgs.

"European Application Serial No. 15787854.7, Response filed Dec. 11, 2017 to Communication Pursuant to Rules 161(1) and 162 EPC dated Jun. 1, 2017", 16 pgs.
"European Application Serial No. 15870861.0, Communication Pursuant to Article 94(3) EPC dated Jul. 12, 2018", 5 pgs.
"European Application Serial No. 15870861.0, Extended European Search Report dated Jul. 3, 2018", 4 pgs.
"European Application Serial No. 15870861.0, Response filed May 31, 2019 to Summons to Attend Oral Proceedings mailed Dec. 21, 2018", w/ English Claims, 23 pgs.
"European Application Serial No. 15870861.0, Response filed Aug. 9, 2017 to Communication Pursuant to Rules 161(2) and 162 EPC dated Aug. 4, 2017", 10 pgs.
"European Application Serial No. 15870861.0, Response filed Nov. 14, 2018 to Communication Pursuant to Article 94(3) EPC dated Jul. 12, 2018", w/ English Claims, 27 pgs.
"European Application Serial No. 15870861.0, Summons to Attend Oral Proceedings mailed Dec. 21, 2018", 5 pgs.
"European Application Serial No. 15870874.3, Communication Pursuant to Article 94(3) EPC dated Feb. 22, 2021", 5 pgs.
"European Application Serial No. 15870874.3, Extended European Search Report dated Nov. 29, 2017", 7 pgs.
"European Application Serial No. 16716090.2, Response filed May 21, 2018 to Communication pursuant to Rules 161(1) and 162 EPC dated Nov. 10, 2017", w/ English Claims, 89 pgs.
"European Application Serial No. 16829020.3, Response filed Jan. 29, 2019 to Communication Pursuant to Rules 161(1) and 162 EPC dated Jul. 25, 2018", w/ English Claims, 17 pgs.
"European Application Serial No. 20173925.7, Communication Pursuant to Article 94(3) EPC dated Sep. 22, 2021", 7 pgs.
"European Application Serial No. 20173925.7, Extended European Search Report dated Aug. 20, 2020", 8 pgs.
"European Application Serial No. 20173925.7, Response Filed Jan. 24, 2022 to Communication Pursuant to Article 94(3) EPC dated Sep. 22, 2021", W/ English Claims, 50 pgs.
"European Application Serial No. 20173925.7, Response filed Mar. 23, 2021 to Extended European Search Report dated Aug. 20, 2020", 29 pgs.
"Geofencing and the event industry", Goodbarber Blog, [Online] Retrieved from the internet by the examiner on May 16, 2019: <URL: https://www.goodbarber.com/blog/geofencing-and-the-event-industry-a699/>, (Nov. 9, 2015), 7 pgs.
"How Snaps Are Stored and Deleted", Snapchat, [Online] Retrieved from the Internet: <URL: https://www.snap.com/en-US/news/post/how-snaps-are-stored-and-deleted/>, (May 9, 2013), 2 pgs.
"IAB Platform Status Report: A Mobile Advertising Review", Interactive Advertising Bureau, (Jul. 2008), 24 pgs.
"InstaPlace Photo App Tell the Whole Story", [Online] Retrieved from the Internet: <URL: youtu.be/uF_gFkg1hBM>, (Nov. 8, 2013), 113 pgs., 1:02 min.
"International Application Serial No. PCT/EP2008/063682, International Search Report dated Nov. 24, 2008", 3 pgs.
"International Application Serial No. PCT/US2014/040346, International Search Report dated Mar. 23, 2015", 2 pgs.
"International Application Serial No. PCT/US2014/040346, Written Opinion dated Mar. 23, 2015", 6 pgs.
"International Application Serial No. PCT/US2015/035591, International Preliminary Report on Patentability dated Dec. 22, 2016", 7 pgs.
"International Application Serial No. PCT/US2015/035591, International Search Report dated Aug. 11, 2015", 5 pgs.
"International Application Serial No. PCT/US2015/035591, International Written Opinion dated Aug. 11, 2015", 5 pgs.
"International Application Serial No. PCT/US2015/037251, International Search Report dated Sep. 29, 2015", 2 pgs.
"International Application Serial No. PCT/US2015/037251, Written Opinion dated Sep. 29, 2015", 4 pgs.
"International Application Serial No. PCT/US2015/050424, International Search Report dated Dec. 4, 2015", 2 pgs.
"International Application Serial No. PCT/US2015/050424, Written Opinion dated Dec. 4, 2015", 10 pgs.

(56) References Cited

OTHER PUBLICATIONS

"International Application Serial No. PCT/US2015/053811, International Preliminary Report on Patentability dated Apr. 13, 2017", 9 pgs.
"International Application Serial No. PCT/US2015/053811, International Search Report dated Nov. 23, 2015", 5 pgs.
"International Application Serial No. PCT/US2015/053811, Written Opinion dated Nov. 23, 2015", 8 pgs.
"International Application Serial No. PCT/US2015/056884, International Preliminary Report on Patentability dated May 4, 2017", 8 pgs.
"International Application Serial No. PCT/US2015/056884, International Search Report dated Dec. 22, 2015", 5 pgs.
"International Application Serial No. PCT/US2015/056884, Written Opinion dated Dec. 22, 2015", 6 pgs.
"International Application Serial No. PCT/US2015/065785, International Preliminary Report on Patentability dated Jun. 29, 2017", 7 pgs.
"International Application Serial No. PCT/US2015/065785, International Search Report dated Jul. 21, 2016", 5 pgs.
"International Application Serial No. PCT/US2015/065785, Written Opinion dated Jul. 21, 2016", 5 pgs.
"International Application Serial No. PCT/US2015/065821, International Preliminary Report on Patentability dated Jun. 29, 2017", 5 pgs.
"International Application Serial No. PCT/US2015/065821, International Search Report dated Mar. 3, 2016", 2 pgs.
"International Application Serial No. PCT/US2015/065821, Written Opinion dated Mar. 3, 2016", 3 pgs.
"International Application Serial No. PCT/US2016/023085, International Preliminary Report on Patentability dated Sep. 28, 2017", 8 pgs.
"International Application Serial No. PCT/US2016/023085, International Search Report dated Jun. 17, 2016", 5 pgs.
"International Application Serial No. PCT/US2016/023085, Written Opinion dated Jun. 17, 2016", 6 pgs.
"International Application Serial No. PCT/US2016/066976, International Preliminary Report on Patentability dated Jun. 28, 2018", 9 pgs.
"International Application Serial No. PCT/US2016/066976, International Search Report dated May 17, 2017", 7 pgs.
"International Application Serial No. PCT/US2016/066976, Invitation to Pay Add'l Fees and Partial Search Rpt dated Mar. 6, 2017", 8 pgs.
"International Application Serial No. PCT/US2016/066976, Written Opinion dated May 17, 2017", 7 pgs.
"International Application Serial No. PCT/US2018/016723, International Search Report dated Apr. 5, 2018", 2 pgs.
"International Application Serial No. PCT/US2018/016723, Written Opinion dated Apr. 5, 2018", 17 pgs.
"International Application Serial No. PCT/US2018/024093, International Preliminary Report on Patentability dated Oct. 10, 2019", 7 pgs.
"International Application Serial No. PCT/US2018/024093, International Search Report dated Jul. 19, 2018", 2 pgs.
"International Application Serial No. PCT/US2018/024093, Written Opinion dated Jul. 19, 2018", 5 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"iVisit Mobile: Getting Started", IVISIT, [Online] Retrieved from the Internet: <URL: http://web.archive.org/web/20140830174355/http://ivisit.com/support_mobile>, (Dec. 4, 2013), 16 pgs.
"Korean Application Serial No. 10-2017-7001104, Response filed Jul. 25, 2017 to Office Action dated Jun. 26, 2017", w/ Translation of Claims, 20 pgs.
"Korean Application Serial No. 10-2017-7014135, Final Office Action dated Feb. 28, 2019", w/ English Translation, 7 pgs.
"Korean Application Serial No. 10-2017-7014135, Notice of Preliminary Rejection dated Apr. 19, 2019", w/ English Translation, 14 pgs.
"Korean Application Serial No. 10-2017-7014135, Notice of Preliminary Rejection dated Jul. 20, 2018", w/ English Translation, 13 pgs.
"Korean Application Serial No. 10-2017-7014135, Response filed Mar. 29, 2019 to Final Office Action dated Feb. 28, 2019", w/ English Claims, 14 pgs.
"Korean Application Serial No. 10-2017-7014135, Response filed Jun. 19, 2019 to Notice of Preliminary Rejection dated Apr. 19, 2019", w/ English Claims, 16 pgs.
"Korean Application Serial No. 10-2017-7014135, Response filed Sep. 17, 2018 to Notice of Preliminary Rejection dated Jul. 20, 2018", w/ English Claims, 16 pgs.
"Korean Application Serial No. 10-2017-7020217, Final Office Action dated Jan. 31, 2018", w/ English Translation, 10 pgs.
"Korean Application Serial No. 10-2017-7020217, Office Action dated Sep. 15, 2017", w/ English Translation, 11 pgs.
"Korean Application Serial No. 10-2017-7020217, Response filed Feb. 23, 2018 to Final Office Action dated Jan. 31, 2018", w/ English Translation, 13 pgs.
"Korean Application Serial No. 10-2017-7020217, Response filed Nov. 2, 2017 to Office Action dated Sep. 15, 2017", w/ English Translation, 17 pgs.
"Korean Application Serial No. 10-2017-7029861, Notice of Preliminary Rejection dated Jan. 17, 2019", w/ English Translation, 9 pgs.
"Korean Application Serial No. 10-2017-7029861, Response filed Mar. 15, 2019 to Notice of Preliminary Rejection dated Jan. 17, 2019", w/ English Claims, 20 pgs.
"Korean Application Serial No. 10-2017-7035789, Notice of Preliminary Rejection dated Nov. 12, 2018", w/ English Translation, 12 pgs.
"Korean Application Serial No. 10-2017-7035789, Response filed Jan. 10, 2019 to Notice of Preliminary Rejection dated Nov. 12, 2018", w/ English Claims, 23 pgs.
"Korean Application Serial No. 10-2018-7002127, Notice of Preliminary Rejection dated Apr. 10, 2018", w/ English Translation, 4 pgs.
"Korean Application Serial No. 10-2018-7002127, Response filed May 16, 2018 to Notice of Preliminary Rejection dated Apr. 10, 2018", w/ English Claims, 14 pgs.
"Korean Application Serial No. 10-2018-7016881, Notice of Preliminary Rejection dated Oct. 19, 2018", w/ English translation, 9 pgs.
"Korean Application Serial No. 10-2018-7016881, Response filed Nov. 30, 2018 to Notice of Preliminary Rejection dated Oct. 19, 2018", w/ English Claims, 27 pgs.
"Korean Application Serial No. 10-2018-7037070, Notice of Final Rejection dated Sep. 30, 2019", w/ English Translation, 5 pgs.
"Korean Application Serial No. 10-2018-7037070, Notice of Preliminary Rejection dated Mar. 20, 2019", w/ English Translation, 10 pgs.
"Korean Application Serial No. 10-2018-7037070, Response filed May 14, 2019 to Notice of Preliminary Rejection dated Mar. 20, 2019", w/ English Translation, 10 pgs.
"Korean Application Serial No. 10-2019-7036962, Notice of Preliminary Rejection dated Jan. 3, 2020", w/ English Translation, 11 pgs.
"Korean Application Serial No. 10-2019-7036962, Response filed Feb. 17, 2020 to Notice of Preliminary Rejection dated Jan. 3, 2020", w/ English Claims, 25 pgs.
"Korean Application Serial No. 10-2021-7017544, Notice of Preliminary Rejection dated Mar. 28, 2022", w/ English Translation, 3 pgs.
"Korean Application Serial No. 10-2021-7017544, Notice of Preliminary Rejection dated Sep. 26, 2021", w/ English translation, 12 pgs.
"Korean Office Action Application Serial No. 10-2017-7001104, Office Action dated Jun. 26, 2017", w/ English Translation, 12 pgs.

(56) References Cited

OTHER PUBLICATIONS

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Mobile Location User Cases and Case Studies", Interactive Advertising Bureau, (Mar. 2014), 25 pgs.

"Pluraleyes by Red Giant", © 2002-2015 Red Giant LLC, [Online]. Retrieved from the Internet: <URL: http://www.redgiant.com/products/pluraleyes/, (Accessed Nov. 11, 2015), 5 pgs.

"Starbucks Cup Magic", [Online] Retrieved from the Internet: <URL: https://www.youtube.com/watch?v=RWwQXi9RG0w>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

"Surprise!", [Online] Retrieved from the Internet: <URL: https://www.snap.com/en-US/news/post/surprise>, (Oct. 3, 2013), 1 pg.

"To Err is Human. To Self Destruct Messages, There is iDelete for iOS", The Apple Google, [Online], Retrieved from the Internet on Mar. 21, 2018: <http://theapplegoogle.com/2013/04/err-human-destruct-messages-idelete-ios/>, (2013), 2 pgs.

"WIPO; International Preliminary Report; WO201776739", (dated Sep. 10, 2018), 5 pgs.

"WIPO; Search Strategy; WO201776739", (dated Dec. 10, 2017), 6 pgs.

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

Carr, Dale, "Mobile Ad Targeting: A Labor of Love", Ad Week, [Online] Retrieved from the Internet on Feb. 11, 2019: <URL: https://www.adweek.com/digital/mobile-ad-targeting-a-labor-of-love/>, (Feb. 12, 2016), 7 pgs.

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Castelluccia, Claude, et al., "EphPub: Toward robust Ephemeral Publishing", 19th IEEE International Conference on Network Protocols (ICNP), (Oct. 17, 2011), 18 pgs.

Chen, Datong, et al., "Protecting Personal Identification in Video", Protecting Privacy in Video Surveillance, Springer-Verlag London Ltd., (2009), 115-128.

Clarke, Tangier, "Automatically syncing multiple clips and lots of audio like PluralEyes possible?", [Online], Retrieved from the Internet: <URL: https://forums.creativecow.net/thread/344/20553, (May 21, 2013), 8 pgs.

Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Fajman, "An Extensible Message Format for Message Disposition Notifications", Request for Comments: 2298, National Institutes of Health, (Mar. 1998), 28 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

Isaac, Mike, "New Mobile App Vyclone Aims to Remix Social Video From Every Angle", All Things D, The Wallstreet Journal, [Online] Retrieved from the Internet: <URL: http://allthingsd.com/20120718/new-mobile-app-vyclone-aims-to-remix-social-video-from-every-angle/>, (Jul. 18, 2012), 4 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Kumar, S, "Optimization Issues in Web and Mobile Advertising", Chapter 2—Pricing Models in Web Advertising, SpringerBriefs in Operations Management, (2016), 6 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Naylor, Joseph, "Geo-Precise Targeting: It's time to Get off the Fence", Be in the Know Blog, [Online] Retrieved from the internet by the examiner on May 16, 2019: <URL: http://blog.cmglocalsolutions.com/geo-precise-targeting-its-time-to-get-off-the-fence>, (May 15, 2015), 6 pgs.

Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Palmer, Alex, "Geofencing at events: how to reach potential customers live and on-site", Streetfight Mag, [Online] Retrieved form the internet by the examiner on May 16, 2019: <URL: http://streetfightmag.com/2015/08/20/geofencing-at-events-how-to-reach-potential-customers-live-and-on-site>, (Aug. 20, 2015), 6 pgs.

Panzarino, Matthew, "Snapchat Adds Filters, A Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Peterson, Lisa, et al., "Location-Based Advertising", Peterson Mobility Solutions, (Dec. 2009), 39 pgs.

Quercia, Daniele, et al., "Mobile Phones and Outdoor Advertising: Measurable Advertising", IEEE Persuasive Computing, (2011), 9 pgs.

Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Simonite, Tom, "Mobile Data: A Gold Mine for Telcos", MIT Technology Review, (May 27, 2010), 6 pgs.

Trice, Andrew, "My Favorite New Feature: Multi-Clip Sync in Premiere Pro CC", [Online]. Retrieved from the Internet: <URL: http://www.tricedesigns.com/2013/06/18/my-favorite-new-feature-multi-cam-synch-in-premiere-pro-cc/, (Jun. 18, 2013), 5 pgs.

Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.

(56) References Cited

OTHER PUBLICATIONS

Virgillito, Dan, "Facebook Introduces Mobile Geo-Fencing With Local Awareness Ads", Adespresso, [Online] Retrieved from the internet by the examiner on May 16, 2019: <URL: https://adespresso.com/blog/facebook-local-business-ads-geo-fencing/>, (Oct. 8, 2014), 14 pgs.
Wagner, Kurt, "Snapchat Rolls Out Group-Sharing Feature for Concerts, Live Events", Mashable, [Online] Retrieved from the Internet on Sep. 12, 2019: <URL: https://mashable.com/2014/06/17/snapchat-our-story/?europe=true>, (Jun. 17, 2014), 16 pgs.
"U.S. Appl. No. 15/224,312, Appeal Decision mailed Apr. 5, 2023", 21 pgs.
"U.S. Appl. No. 15/224,355, 312 Amendment filed Sep. 15, 2022", 8 pgs.
"U.S. Appl. No. 15/224,355, PTO Response to Rule 312 Communication dated Oct. 28, 2022", 2 pgs.
"U.S. Appl. No. 15/224,365, Appeal Decision dated Mar. 31, 2023", 17 pgs.
"U.S. Appl. No. 15/947,350, Appeal Decision dated Apr. 5, 2023", 13 pgs.
"U.S. Appl. No. 16/933,205, Final Office Action dated Jan. 18, 2023", 21 pgs.
"U.S. Appl. No. 16/933,205, Response filed Feb. 23, 2023 to Final Office Action dated Jan. 18, 2023", 13 pgs.
"U.S. Appl. No. 16/933,366, Decision on Pre-Appeal Brief Request dated Apr. 14, 2023", 2 pgs.
"U.S. Appl. No. 16/933,366, Final Office Action dated Dec. 29, 2022", 21 pgs.
"U.S. Appl. No. 16/933,366, Pre-Appeal Brief Request filed Mar. 29, 2023", 4 pgs.
"U.S. Appl. No. 16/933,366, Response filed Nov. 23, 2022 to Non Final Office Action dated Jul. 25, 2022", 12 pgs.
"U.S. Appl. No. 17/035,575, Corrected Notice of Allowability dated Mar. 8, 2023", 4 pgs.
"U.S. Appl. No. 17/035,575, Notice of Allowance dated Oct. 17, 2022", 8 pgs.
"U.S. Appl. No. 17/234,012, Non Final Office Action dated Feb. 8, 2023", 15 pgs.
"U.S. Appl. No. 17/234,012, Preliminary Amendment filed Sep. 28, 2022", 6 pgs.
"U.S. Appl. No. 17/323,702, Final Office Action dated Mar. 10, 2023", 17 pgs.
"U.S. Appl. No. 17/323,702, Non Final Office Action dated Sep. 21, 2022", 36 pgs.
"U.S. Appl. No. 17/323,702, Response filed Jan. 23, 2023 to Non Final Office Action dated Sep. 21, 2022", 14 pgs.
"U.S. Appl. No. 17/567,397, Non Final Office Action dated Jan. 30, 2023", 33 pgs.
"U.S. Appl. No. 17/567,397, Response filed Apr. 27, 2023 to Non Final Office Action dated Jan. 30, 2023", 10 pgs.
"U.S. Appl. No. 17/567,397, Response filed Nov. 9, 2022 to Non Final Office Action dated Aug. 22, 2022", 10 pgs.
"U.S. Appl. No. 17/647,511, Final Office Action dated Dec. 8, 2022", 17 pgs.
"U.S. Appl. No. 17/647,511, Non Final Office Action dated Sep. 22, 2022", 12 pgs.
"U.S. Appl. No. 17/647,511, Response filed Oct. 28, 2022 to Non Final Office Action dated Sep. 22, 2022", 8 pgs.
"U.S. Appl. No. 17/647,511, Response filed Dec. 15, 2022 to Final Office Action dated Dec. 8, 2022", 12 pgs.
"European Application Serial No. 20173925.7, Summons to Attend Oral Proceedings mailed Mar. 13, 2023", 6 pgs.
"Microsoft Computer Dictionary", 5th ed., (2002), 3 pgs.
"Random House Webster's College Dictionary", 2nd Random House ed., (1999), 3 pgs.
"U.S. Appl. No. 17/234,012, Response filed May 8, 2023 to Non Final Office Action dated Feb. 8, 2023", 8 pgs.
"U.S. Appl. No. 16/933,366, Non Final Office Action dated May 18, 2023", 21 pgs.
"U.S. Appl. No. 17/234,012, Final Office Action dated May 24, 2023", 13 pgs.
"U.S. Appl. No. 17/647,511, Notice of Allowance dated May 25, 2023", 6 pgs.
"U.S. Appl. No. 16/933,205, Non Final Office Action dated May 25, 2023", 20 pgs.
"U.S. Appl. No. 18/162,404, Non Final Office Action dated Jun. 5, 2023", 29 pgs.
"Canadian Application Serial No. 3,158,965, Examiners Rule 86(2) Report dated Jun. 5, 2023", 6 pgs.

* cited by examiner

GALLERY OF MESSAGES FROM INDIVIDUALS WITH A SHARED INTEREST

CLAIM OF PRIORITY

This application is a continuation of U.S. patent application Ser. No. 16/662,956, filed Oct. 24, 2019, which is a continuation of U.S. patent application Ser. No. 15/137,608, filed Apr. 25, 2016, now issued as U.S. Pat. No. 10,514,876, which is a continuation of U.S. patent application Ser. No. 14/578,258, filed Dec. 19, 2014, now issued as U.S. Pat. No. 9,385,983, each of which are incorporated herein by reference in their entireties.

FIELD OF THE INVENTION

This invention relates generally to exchanging electronic messages in a computer network. More particularly, this invention relates to a gallery of messages associated with a shared interest.

BACKGROUND OF THE INVENTION

Mobile devices, such as smartphones, are used to generate messages. The messages may be text messages, photographs (with or without augmenting text) and videos. Users can share such messages with individuals in their social network. However, there is no mechanism for automatically routing a message with content related to a shared interest to a gallery of messages.

SUMMARY OF THE INVENTION

A machine includes a processor and a memory connected to the processor. The memory stores instructions executed by the processor to receive a message and a message parameter indicative of a characteristic of the message, where the message includes a photograph or a video. A determination is made that the message parameter corresponds to a selected gallery, where the selected gallery includes a sequence of photographs or videos. The message is posted to the selected gallery in response to the determination. The selected gallery is supplied in response to a request.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
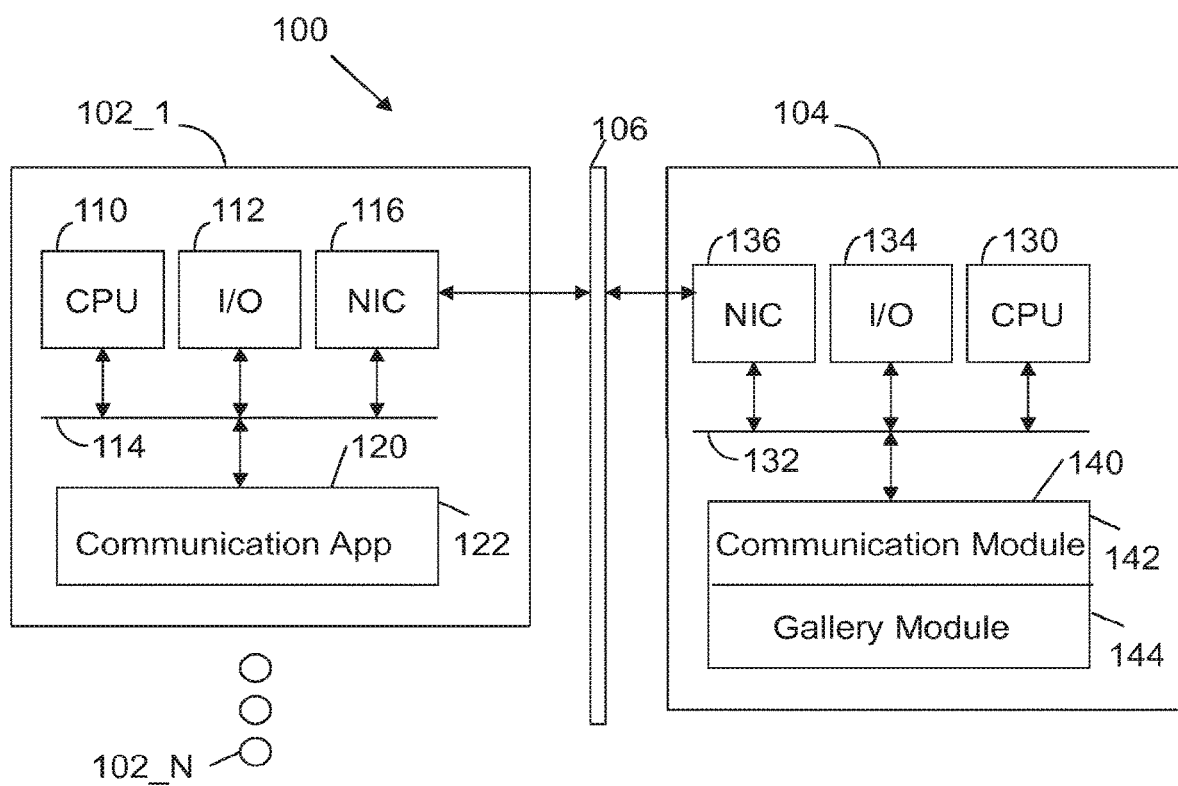
FIG. 1 illustrates a system configured in accordance with an embodiment of the invention.

FIG. 1 illustrates a system 100 configured in accordance with an embodiment of the invention. The system 100 includes a set of client devices 102_1 through 102_N and at least one server 104 connected via a network 106. The network 106 may be any combination of wired or wireless networks.

Each client device 102 has standard components, such as a central processing unit 110 and input/output devices 112 connected via a bust 14. The input/output devices 112 may include a touch display, dedicated control buttons, physical connectors, speakers and the like. A network interface circuit 116 is also connected to the bus 114 and provides connectivity to network 106. A memory 120 is also connected to the bus 114. The memory 120 stores a communication application 122. The communication application 122 includes instructions executed by CPU 110 to coordinate communications with server 104 and/or other client devices. In particular, the communication application 122 is operative with server 104 to exchange messages between client devices. The client device may be in the form in of a tablet, smartphone, wearable technology, laptop computer or desktop computer.

The server 104 also includes standard components, such as a central processing unit 130, a bus 132, input/output devices 134 and a network interface circuit 136. A memory 140 is connected to the bus 132. The memory 140 stores a communication module 142. The communication module 142 includes instructions executed by the CPU 130 to coordinate communications with client devices 102. More particularly, the communication module 142 coordinates the exchange of messages between client devices 102. The memory 140 also stores a gallery module 144. The gallery module 144 includes instructions executed by the CPU 130 to store messages from individuals with a shared interest or some other association. Examples of types of associations contemplated by embodiments of the invention include photos or videos taken by users that include the same or similar object(s), such as guitar from a particular manufacturer, a designer handbag, a soft drink or beer can, etc. The messages form a gallery, which may be supplied to a client device 102 in response to a request from a client device 102. The gallery may be a sequence of photographs and/or videos. Any of a text message, user drawings/annotations, animations, photo filters may be associated with a photograph or video as an overlay). In one embodiment, the gallery is available for a specified transitory period of time (e.g., a day, during an event, etc.).

Figure 2:
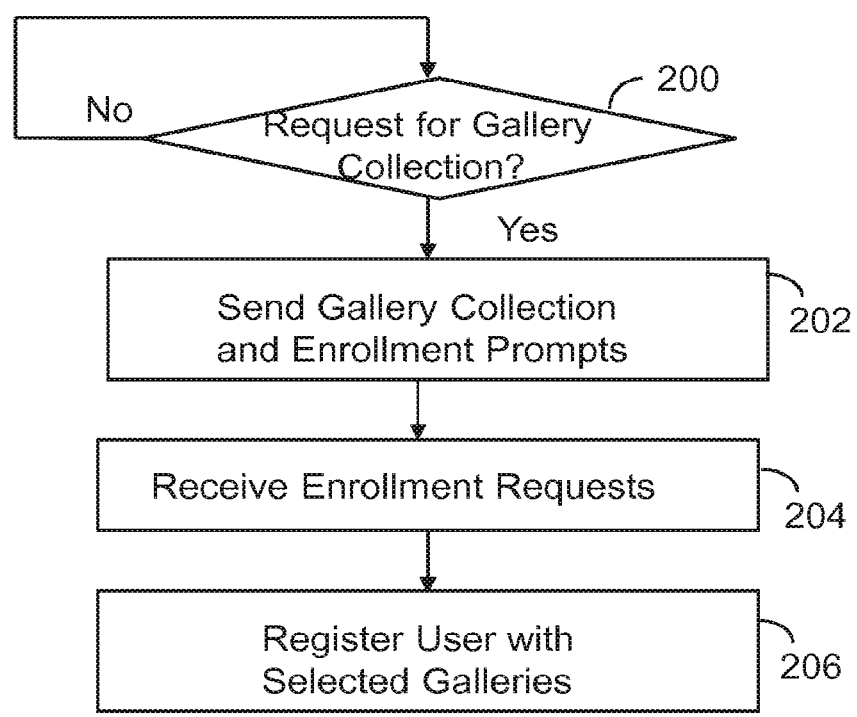
FIG. 2 illustrates a registration process utilized in accordance with an embodiment of the invention.

FIG. 2 illustrates a process for registering users with common interests that desire to participate in posting to a gallery. This process may be implemented by the gallery module 144. The gallery module 144 waits for a request for a gallery collection 200 from a client device 102. In the event of a request (200—Yes), a gallery collection and enrollment prompts 202 are sent from the server 104 to a client device 102.

Embodiments contemplate that a request could include an express request sent by a user. For example, a user may request to participate in a gallery by navigating to a 'request' screen from a user interface on the device display. In these examples, the user may select from any number of existing galleries or create a new gallery by keying in or otherwise describing the gallery. Another example of an express request to participate in a gallery may include an action on the part of the user from an annotation feature offered from an image. For instance, after a picture or image has been taken, some embodiments allow a user to add text, graphics, images, etc. to the picture/video. During this annotation process, the input and detection of a particular key or swipe may be used to indicate an intent to add that picture/video to a particular gallery. As an example, the use of a hashtag ("#") or swipe added to the text "Clippers" may be used to submit the picture/video to a Clippers gallery.

In addition to express user requests to submit content to a gallery, passive requests are also contemplated. For example, the detection of a particular object in a picture or video (detected using, e.g., object recognition processes to detect an object or audio fingerprinting technologies to detect a song, etc.) could be used to prompt a user to join a gallery associated with the object or even automatically post to an existing gallery (e.g., with the user's consent). For example, if a user takes a picture or video of a Coca Cola bottle upon detection of the bottle, the user may be asked if he or she wishes to participate in a Coca Cola gallery. Alternatively, the user may be asked if he or she wishes to post directly to a gallery without joining. In yet other embodiments, the user's video or picture may be posted directly to the gallery (perhaps after receiving a blanket authorization at some point earlier).

In additional embodiments, a revenue sharing process may be implemented to facilitate payments to the user for use of his or her image. For example, a user image may be added to a gallery sponsored by Coca Cola and in return for contributing to Coca Cola's gallery, a user may receive compensation on a flat-fee, per view or revenue share basis.

Figure 3:
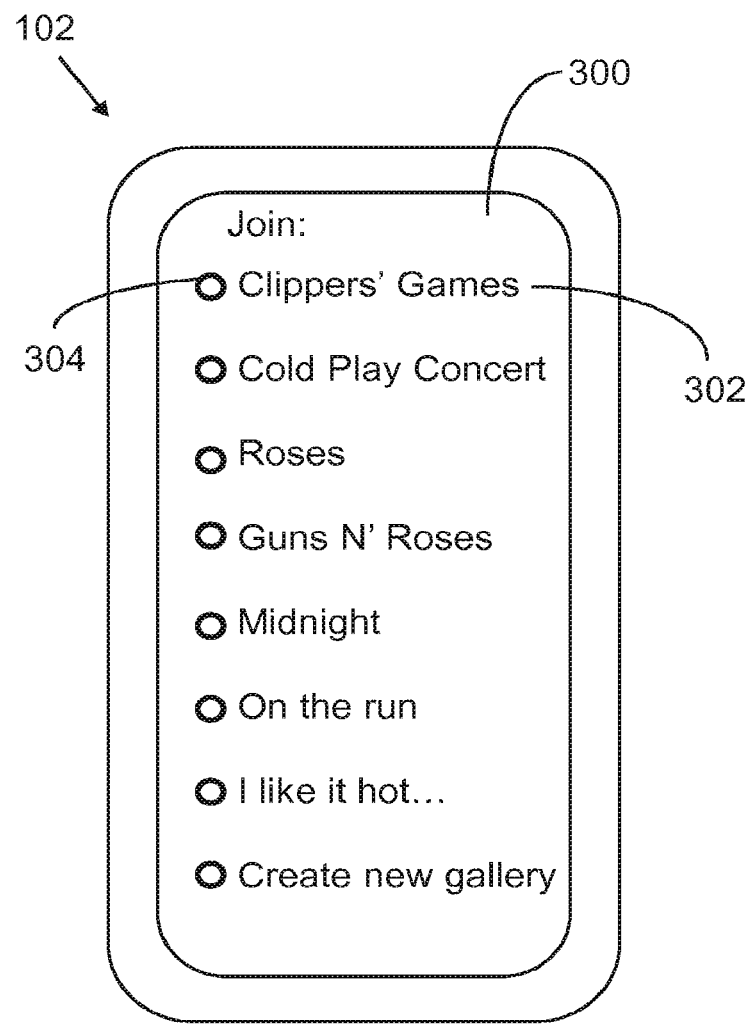
FIG. 3 illustrates a gallery collection with enrollment prompts utilized in accordance with an embodiment of the invention.

FIG. 3 illustrates an example of a gallery collection 300 displayed on a client device 102. The gallery collection 300 may be supplied by activating an icon (such as icon 402 of FIG. 4). Alternately, the gallery may be supplied in accordance with the examples provided above. The gallery collection 300 includes individually listed galleries, such as 302 and an associated prompt 304. In this example, the prompt 304 is a radio button, selection of which results in a selected gallery. Hovering over or tapping the text description 302 of the gallery may result in the display of additional information about the gallery. In the case of "Clippers' Games" a gallery is formed during the course of each basketball game played by the Clippers. Thus, the gallery is a recurring gallery. Messages associated with the Clippers are posted during the course of each basketball game. Thus, a collection of messages is available for the transitory duration of each basketball game. Of course, other examples are also possible including availability for a set amount of time after the event (e.g., twenty-four hours, one week, etc.).

The next example in the gallery collection 300 is a concert. This is a single event gallery that lasts for a set amount of time after the duration of the event. The next example in the gallery collection 300 is for a shared interest in an object, such as roses. This may be an ongoing gallery that is used by registrants to post photographs or videos of roses.

The next example in the gallery collection 300 is for the band Guns N' Roses. This gallery is constructed to receive messages from individuals with a shared interest in the band. In one embodiment, individual songs from the band may be selected. Thereafter, messages that reference or incorporate the individual songs may be posted to the gallery.

The collection may also include a theme such as midnight. Messages generated on or around midnight are posted to the gallery. The messages may be identified by a timestamp associated with the message.

The collection may also include a theme such as "on the run". This gallery is constructed to receive messages from client devices that are in motion (as measured by an accelerometer, gyroscope, GPS signal and the like associated with the client device). Messages from such devices are posted to the gallery.

The collection may also include a theme such as "I like it hot . . . " to post messages when the temperature in a geolocation associated with a message exceeds some threshold (e.g., 90° F.). The geolocation may be where the message is generated. The temperature may be obtained for the specified geolocation by any number of online weather information resources or from a thermometer device built into the device.

A final option shown in FIG. 3 is a request to create a new gallery. Activating the associated radio button 304 may result in a set of prompts that allows a user to define a new gallery. The definition may include a gallery name, keywords associated with the gallery, objects associated with the gallery, and the like.

Returning to FIG. 2, the gallery module 144 receives enrollment or participation requests 204. In response to such requests, a user is registered with one or more selected galleries. Thus, a user registers with one or more selected galleries 206. Thereafter, any message relevant to a selected gallery is automatically routed to the selected gallery. This may be accomplished without the user separately designating the gallery as a destination for the message. A single message may be automatically routed to several galleries if the message has indicia relevant to each of the several galleries.

Figure 4:
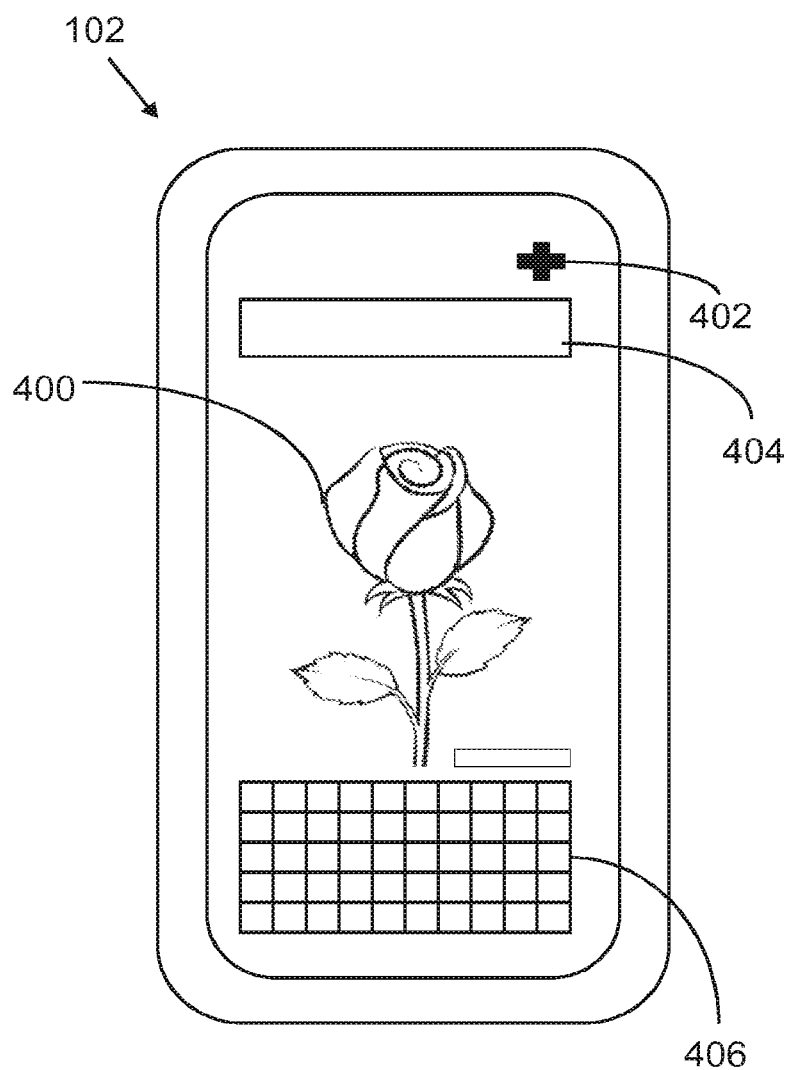
FIG. 4 illustrates a message generation interface utilized in accordance with an embodiment of the invention.

FIG. 4 illustrates a client device 102 that has taken a picture of a rose 400. The communication application 122 and/or gallery module 144 may be configured with instructions executed by the processor to recognize the rose (e.g., machine vision may be used to designate the object as a rose). If the user is registered with the rose gallery, the message is automatically routed to the rose gallery. An icon 402 may be supplied to annotate a message. Activation of the icon 402 may result in a text entry box 404 being supplied, along with a keyboard. The user may designate that the message includes a rose or may type in any other type of message. A message recipient list may be invoked through the icon 402 or through a swiping motion. The message recipient list is an existing list of contacts for the user. Each contact selected will receive a copy of the message via routing through the communication module 142. Thus, for this message there are intentionally designated message recipients. However, depending upon the number of galleries that a user is registered with, the message may be automatically forwarded to relevant galleries without the user designating such galleries for the message.

Figure 5:
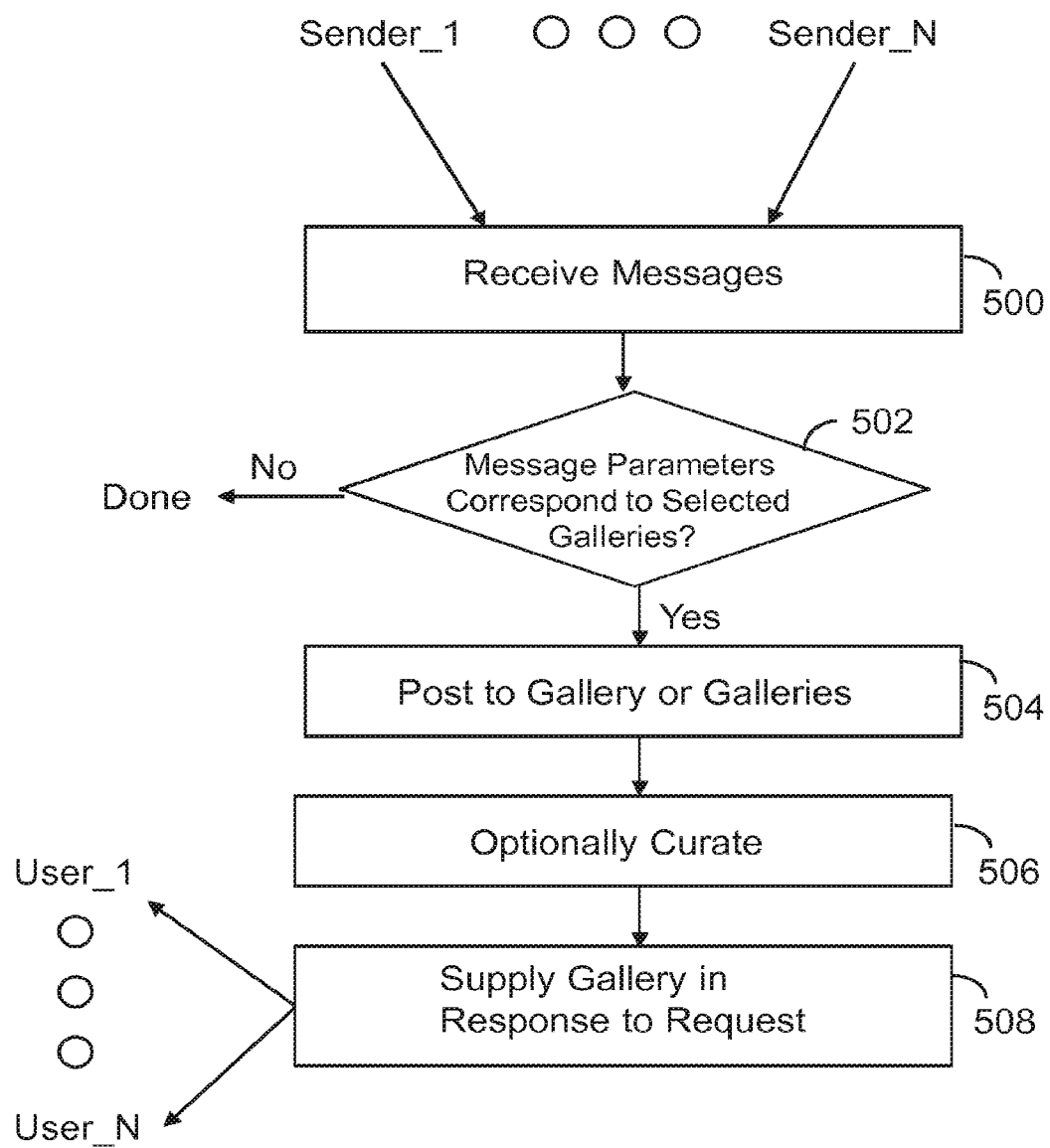
FIG. 5 illustrates server side processing performed in accordance with an embodiment of the invention.

FIG. 5 illustrates operations associated with an embodiment of the gallery module 144. The top of the figure illustrates a set of message senders, i.e., Sender_1 through Sender_N. Each message sender is associated with a client device 102.

The server 104 receives messages 500 from any number of senders. Each message is evaluated to determine whether message parameters correspond to selected galleries 502. For example, if the user has registered for the roses gallery and generates the message shown in FIG. 4, then the message corresponds to a selected gallery (502—Yes). Any number of message parameters may be used. For example, in the case of the rose picture in FIG. 4, the rose may be a designated object from machine vision operations performed by the gallery module. Alternately, or in addition, text associated with the message may be a parameter that is evaluated for relevance to a selected gallery. For example, optical character recognition or word matching techniques may be used to link a message with a gallery. Each gallery may have an associated collection of key words and/or designated objects that are used to determine correspondence between a message and a gallery. Other message parameters may include a time stamp (relevant to the midnight gallery), speed indicia (relevant to the "on the run" gallery) and temperature (relevant to the "I like it hot . . . " gallery).

If the message does not have a parameter relevant to a selected gallery (502—No), then processing by the gallery module 144 is completed. The message is then routed in a standard manner by the communication module 142. If the message does have a parameter corresponding to a selected gallery (502— Yes), the message is posted to one or more galleries 504.

The gallery module 144 may include a curation interface that allows a gallery administrator to optionally curate the gallery 506. For example, the curation interface may allow the administrator to delete inappropriate or redundant messages. Alternately, machine vision and content rules may be used to automatically curate the gallery. In embodiments that include compensation to be paid to a user, the curation interface may be configured to make automatic payments to the users for the use of their pictures or videos. The final operation of FIG. 5 is to supply the gallery in response to requests 508 from any number of users.

Embodiments of the invention utilize galleries with specified transitory periods of time (e.g., a day, or during an event). Each gallery may include individual messages shown in sequence, where the individual messages are photographs or videos. Text may accompany a photograph or video, as shown in connection with FIG. 4.

An embodiment of the invention has a gallery with content set to an audio time line. In some embodiments, the audio time line could be a song or a video clip. As discussed in connection with FIG. 3, a band may have a designated gallery with a selectable song. If a user registers with a song then a message that incorporates the song may be posted to the gallery. Embodiments of the invention utilize short (e.g., 3-6 seconds) video messages. Therefore, a collection of messages can be constructed for different segments of the audio tune line associated with a song. As a result, a single song may have an associated mash-up of video segments. Observe here that the audio time line determines the video content. Typically, video content is used to establish a sequence of videos. The use of the audio time line as a guiding factor results in interesting and artistic combinations of videos.

Instead of a song, the audio time line may be a narrative, such as a speech or a dialogue. For example, a "Gettysburg Address" gallery may be formed with a voice over of the famous speech by Abraham Lincoln. Video segments that include words front the speech may be combined to populate a complete audio time line for the speech. Consequently, a voice over of the speech may have an associated mash-up of video segments.

There are known techniques for evaluating audio content. In particular, there are online services, such as Shazam® and Soundhound®, which provide real-time identification of songs and other audio tracks. The gallery module 144 may be configured to access such online services and/or incorporate its own audio fingerprint identification techniques. The object recognition and fingerprinting operations disclosed herein may be performed on any of client device 102, server 104 or a third-party device (not shown).

As described above, embodiments contemplate that a user could be compensated by e.g., the audio time line owner or rights holder for helping to create and promote a particular song or content. Thus, a user that contributes to an audio time line could be compensated by some amount for each viewing of the time line.

Figure 6:
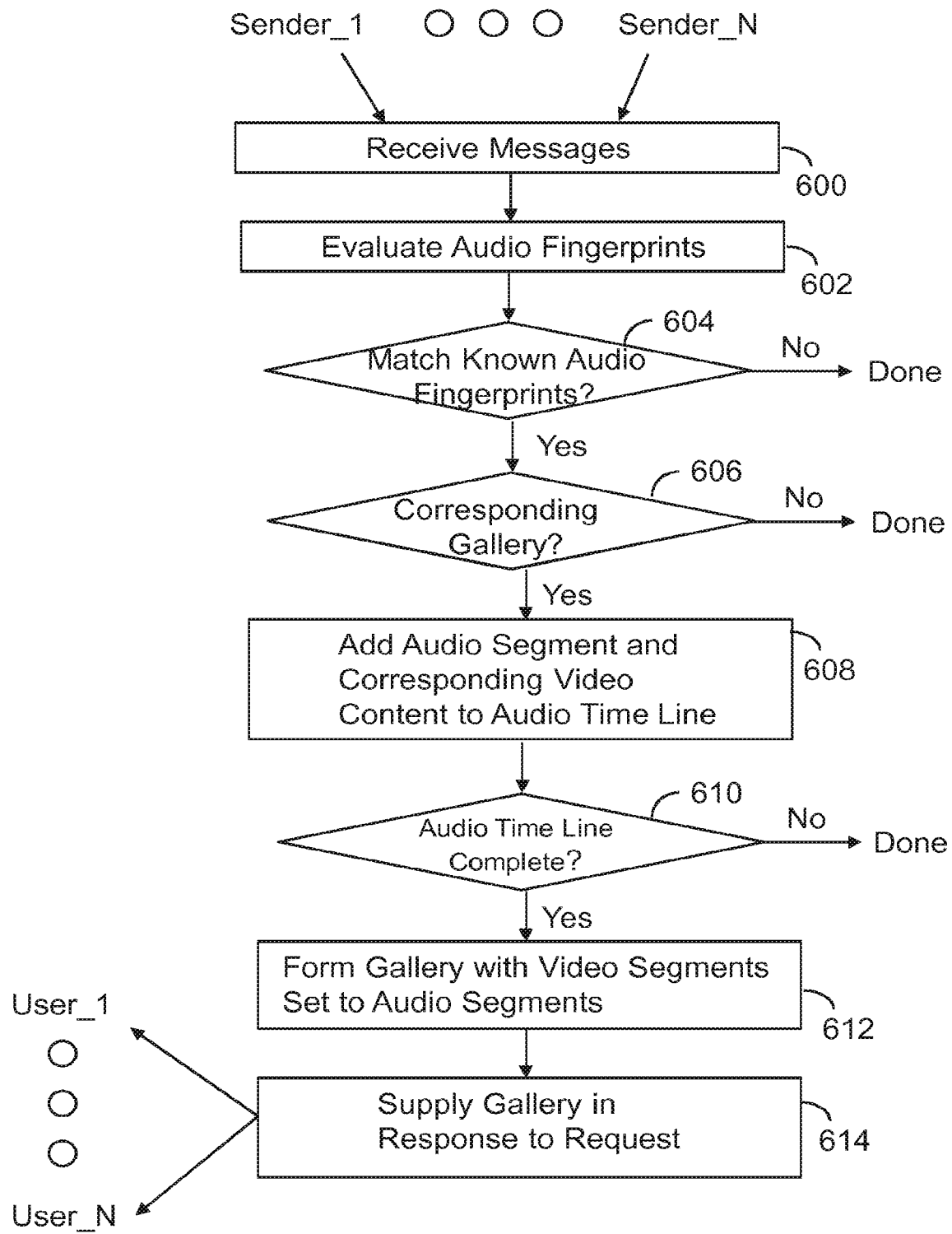
FIG. 6 illustrates server side processing associated with another embodiment of the invention.

FIG. 6 illustrates audio time line processing performed in accordance with an embodiment of the invention. The gallery module 144 receives messages 600 from any number of message senders (Sender_1 through Sender_N). Each message is evaluated for audio fingerprints 602. If there are no matches to known audio fingerprints (604— No), then the gallery module 144 processing is completed and the message is routed in a standard manner using communication module 142.

If matches with known audio fingerprints are established (604— Yes), a determination is made whether there is a selected gallery with the same audio fingerprint. That is, has the message sender registered with a gallery with the same audio fingerprint. It not (606— No), processing is complete. If so (606— Yes), the audio segment and corresponding video content are added to the audio time line 608. For example, the video message may have audio fingerprints for seconds 58 through 66 of a video time line. The video message is then positioned at that location on the video time line.

It is then determined whether the audio time line is complete 610. If not (610— No), the processing of the message is completed and the process may wait for the submission of additional segments for possible inclusion into the audio time line. If so (610— Yes), a gallery is formed with video segments set to audio segments 612. The audio segments may be a master track of a song or narrative. Alternately, the audio segments from the videos themselves may be used. Different criteria may be used to determine whether and audio time line is complete. All time slots in the audio time line need not be filled.

The resultant gallery is then supplied to users in response to requests 614. Thus, users may obtain crowd sourced video mash-ups set to an audio time line.

Those skilled in the art will appreciate that the disclosed techniques provide improved technical results in the field of message combining and sharing. Messages are automatically shared with others that have a common interest, as expressed through a registration process. After the registration process, collections of messages are automatically generated based upon automated evaluation of message content. This automatic process may or may not be executed without a user interface and user input at the server. Thus, an autonomous message combining and sharing system is disclosed that omits the cost of a human operator and is able to operate as fast as a processor operates.

Embodiments of the invention include ephemeral galleries that reduce power consumption and administrative overhead. The ephemeral galleries may be configured for self-execution, for example, by setting message parameters that will establish inclusion in a gallery and setting a transitory gallery period defined by an open time and a close time. The gallery may be associated with a single ephemeral time period (e.g., in the case of a concert) or a recurring ephemeral time period (e.g., in the event of galleries for each basketball game played).

The crowd sourced galleries provide content from many perspectives. An embodiment of the invention establishes innovative video mash-ups set to an audio time line as opposed to a flow of video images. Thus, establishing a novel technique for message combining.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer-implemented method comprising:
   detecting annotations overlaid on a photograph or video of each message of a plurality of messages received from a plurality of computing devices;
   determining that the detected annotations overlaid on a photograph or video for a subset of messages correspond to a first predetermined media collection of a plurality of predetermined media collections;
   providing a curation interface for the subset of messages that correspond to the first predetermined media collection of the plurality of predetermined media collections;
   receiving, via the curation interface, a selection of messages of the subset of messages; and
   posting the selection of messages to the first predetermined media collection comprising a plurality of existing messages.

2. The computer-implemented method of claim 1, further comprising:
   receiving a request for the first predetermined media collection; and
   supplying the first predetermined media collection in response to the request.

3. The computer-implemented method of claim 1, wherein the first predetermined media collection is associated with at least one of: a particular object, a sports team, a sports event, a concert, a band, a time of day, a motion, a temperature, or a geolocation.

4. The computer-implemented method of claim 1, wherein the message comprises a time stamp associated with the message and at least one of: a speed indicia associated with the message, or a temperature associated with the location at which the message was generated.

5. The computer-implemented method of claim 1, wherein the first predetermined media collection is available for a specified transitory period of time.

6. The computer-implemented of claim 5 wherein the specified transitory period of time is a set amount of time after the duration of an event.

7. The computer-implemented method of claim 1, further comprising:
   automatically providing compensation to a message sender when a message from the sender is posted to the first predetermined media collection.

8. The computer-implemented method of claim 1, wherein before determining that annotations overlaid on a photograph or video for the subset of messages received from the plurality of computing devices correspond to the first predetermined media collection of a plurality of predetermined media collections, the method comprises:
   receiving a request to generate the first media collection; and
   generating the first media collection.

9. The computer-implemented method of claim 8, wherein the first media collection is associated with a first media collection name and at least one associated keyword or object.

10. The computer-implemented method of claim 9, wherein the subset of messages of the plurality of messages corresponding to the first media collection each comprise a message parameter indicative of the message that corresponds to the at least one associated keyword or object of the first media collection or other parameter corresponding to the first media collection.

11. The computer-implemented method of claim 1, wherein the selection of messages excludes messages deleted via the curation interface.

12. A computing device comprising:
   a memory that stored instructions; and
   one or more processors configured by the instructions to perform operations comprising:
   detecting annotations overlaid on a photograph or video of each message of a plurality of messages received from a plurality of computing devices;
   determining that the detected annotations overlaid on a photograph or video for a subset of messages correspond to a first predetermined media collection of a plurality of predetermined media collections;
   providing a curation interface for the subset of messages that correspond to the first predetermined media collection of the plurality of predetermined media collections;
   receiving, via the curation interface, a selection of messages of the subset of messages; and
   posting the selection of messages to the first predetermined media collection comprising a plurality of existing messages.

13. The computing device of claim 12, the operations further comprising:

receiving a request for the first predetermined media collection; and supplying the first predetermined media collection in response to the request.

14. The computing device of claim 12, wherein the first predetermined media collection is associated with at least one of: a particular object, a sports team, a sports event, a concert, a band, a time of day, a motion, a temperature, or a geolocation.

15. The computing device of claim 12, wherein the message comprises a time stamp associated with the message and at least one of: a speed indicia associated with the message, or a temperature associated with the location at which the message was generated.

16. The computing device of claim 12, wherein the first predetermined media collection is available for a specified transitory period of time and the specified transitory period of time is a set amount of time after the duration of an event.

17. The computing device of claim 12, the operations further comprising:

automatically providing compensation to a message sender when a message from the sender is posted to the first predetermined media collection.

18. The computing device of claim 12, wherein the first media collection is associated with a first media collection name and at least one associated keyword or object and wherein the subset of messages of the plurality of messages corresponding to the first media collection each comprise a message parameter indicative of the message that corresponds to the at least one associated keyword or object of the first media collection or other parameter corresponding to the first media collection.

19. The computing device of claim 12, wherein the selection of messages excludes messages deleted via the curation interface.

20. A non-transitory computer readable medium comprising instructions stored thereon that are executable by at least one processor to cause a computing device to perform operations comprising:

detecting annotations overlaid on a photograph or video of each message of a plurality of messages received from a plurality of computing devices;

determining that the detected annotations overlaid on a photograph or video for a subset of messages correspond to a first predetermined media collection of a plurality of predetermined media collections;

providing a curation interface for the subset of messages that correspond to the first predetermined media collection of the plurality of predetermined media collections;

receiving, via the curation interface, a selection of messages of the subset of messages; and posting the selection of messages to the first predetermined media collection comprising a plurality of existing messages.

* * * * *